(12) United States Patent
Yamauchi et al.

(10) Patent No.: US 6,791,609 B2
(45) Date of Patent: Sep. 14, 2004

(54) DIGITAL STILL CAMERA SYSTEM AND METHOD

(75) Inventors: Satoru Yamauchi, Ibaraki (JP); Osamu Koshiba, Tsukuba (JP)

(73) Assignee: Texas Instruments Incorporated, Dallas, TX (US)

( * ) Notice: Subject to any disclaimer, the term of this patent is extended or adjusted under 35 U.S.C. 154(b) by 805 days.

(21) Appl. No.: 09/745,135

(22) Filed: Dec. 20, 2000

(65) Prior Publication Data

US 2001/0045988 A1 Nov. 29, 2001

Related U.S. Application Data

(63) Continuation of application No. 09/632,543, filed on Aug. 4, 2000.
(60) Provisional application No. 60/176,272, filed on Jan. 14, 2000, provisional application No. 60/177,432, filed on Jan. 21, 2000, provisional application No. 60/214,951, filed on Jun. 29, 2000, provisional application No. 60/215,000, filed on Jun. 29, 2000, and provisional application No. 60/172,780, filed on Dec. 20, 1999.

(51) Int. Cl.[7] ............................................. H04N 3/14
(52) U.S. Cl. ...................................... 348/273; 348/280
(58) Field of Search ............................. 382/300, 162, 382/164, 165, 166, 167; 348/273, 272, 280, 223.1, 225.1, 230.1, 237, 234, 260, 263, 268, 661, 655, 668, 242

(56) References Cited

U.S. PATENT DOCUMENTS

| 5,412,425 A | * | 5/1995 | Nagano ...................... 348/372 |
| 5,528,293 A | * | 6/1996 | Watanabe ................ 348/231.2 |
| 6,181,376 B1 | * | 1/2001 | Rashkovskiy et al. ...... 348/273 |
| 6,724,932 B1 | * | 4/2004 | Ito ............... 382/162 |
| 2002/0054229 A1 | * | 5/2002 | Sasaki ........................ 348/312 |
| 2002/0101434 A1 | * | 8/2002 | Abe ........................... 345/606 |
| 2003/0021474 A1 | * | 1/2003 | Hunter et al. ............... 382/167 |
| 2003/0053684 A1 | * | 3/2003 | Acharya ..................... 382/164 |

OTHER PUBLICATIONS

Shyam Venkataraman, Ken Peters and Richard Hecht, "Next Generation Digital Camera Integration and Software Developmen Issues" Digital Solid State Cameras: Designs and Applications, 3302 Proc. SPIE, pp. 76–82.*

* cited by examiner

*Primary Examiner*—Vu Le
*Assistant Examiner*—Nelson D. Hernandez
(74) *Attorney, Agent, or Firm*—Carlton H. Hoel; W. James Brady; Frederick J. Telecky, Jr.

(57) ABSTRACT

A combination interpolation and lowpass filtering for Bayer color-filtered arrays with the green high frequency used as an estimate for red and blue high frequency.

3 Claims, 37 Drawing Sheets

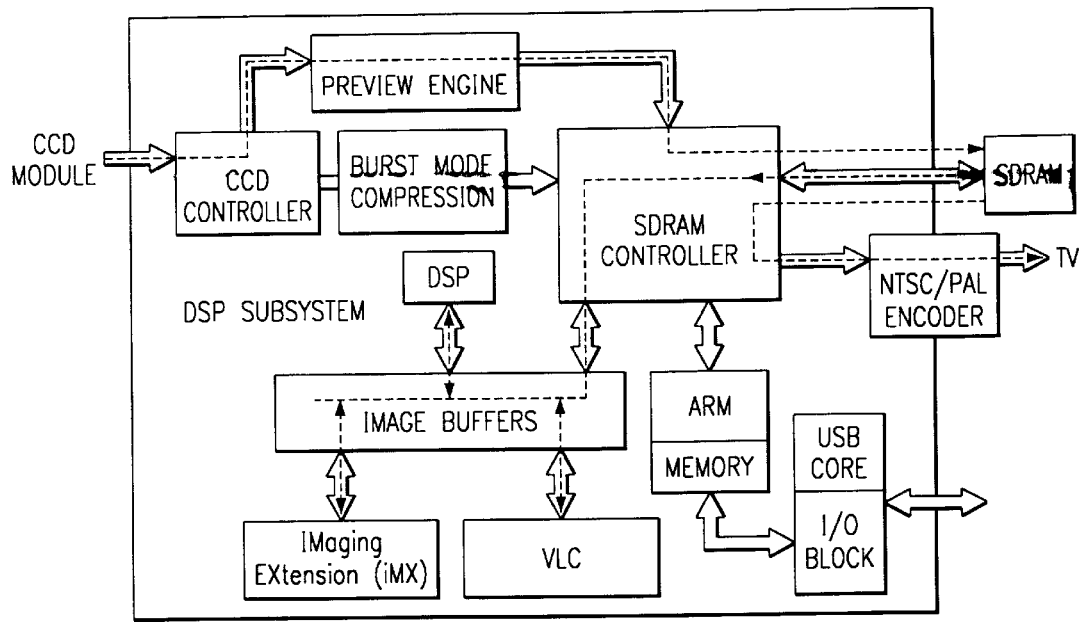
FIG. 6
FIG. 7a    FIG. 7b
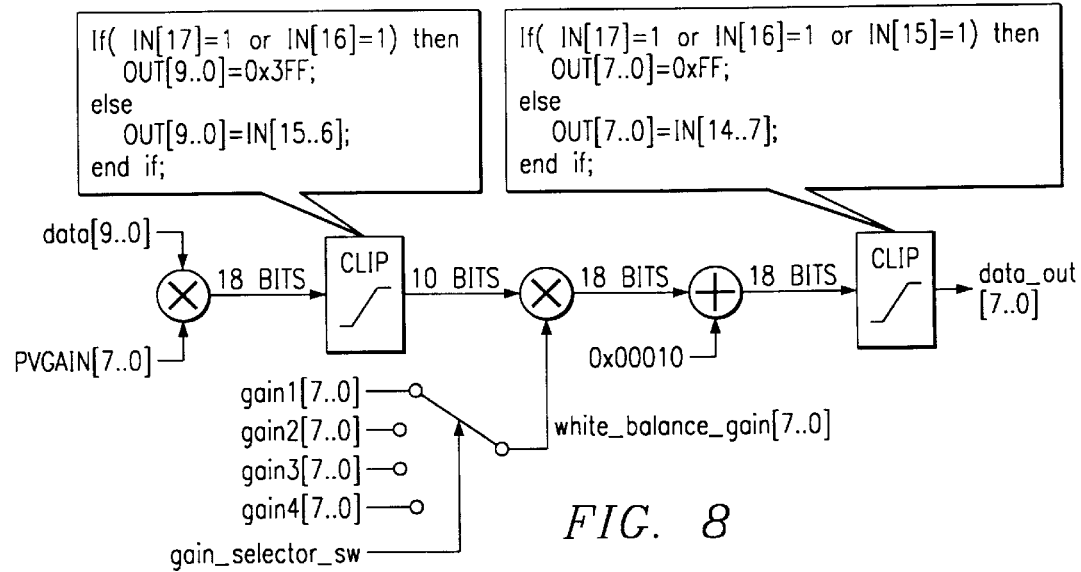
FIG. 8

OUTPUT OF HORIZONTAL INTERPOLATION $$ye_{11} = \frac{ye_{01} + ye_{21}}{2}$$

$$cy_{11} = \frac{Cy_{01} + Cy_{21}}{2}$$

VERTICAL INTERPOLATION ⇩

SIMPLE MODE →

COLOR ADJUSTMENT (NORMAL MODE) ⇩

$$a = g_{11} + Mg_{11} - ye_{11} - cy_{11}$$

$$\begin{cases} \overline{ye_{11}} = ye_{11} + \dfrac{a}{4} \\ \overline{cy_{11}} = cy_{11} + \dfrac{a}{4} \\ \overline{g_{11}} = g_{11} - \dfrac{a}{4} \\ \overline{mg_{11}} = Mg_{11} - \dfrac{a}{4} \end{cases}$$

*FIG. 10f*

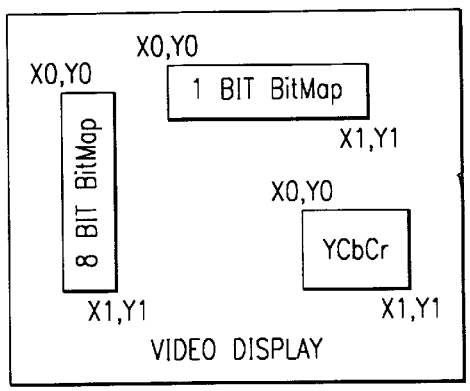
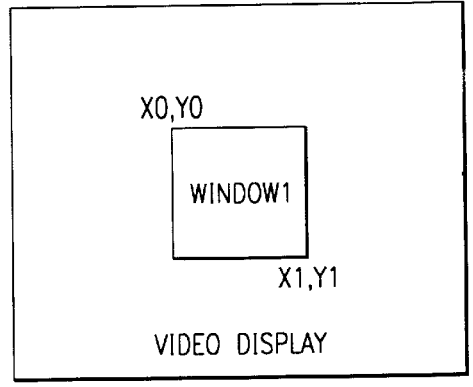
FIG. 16  FIG. 17
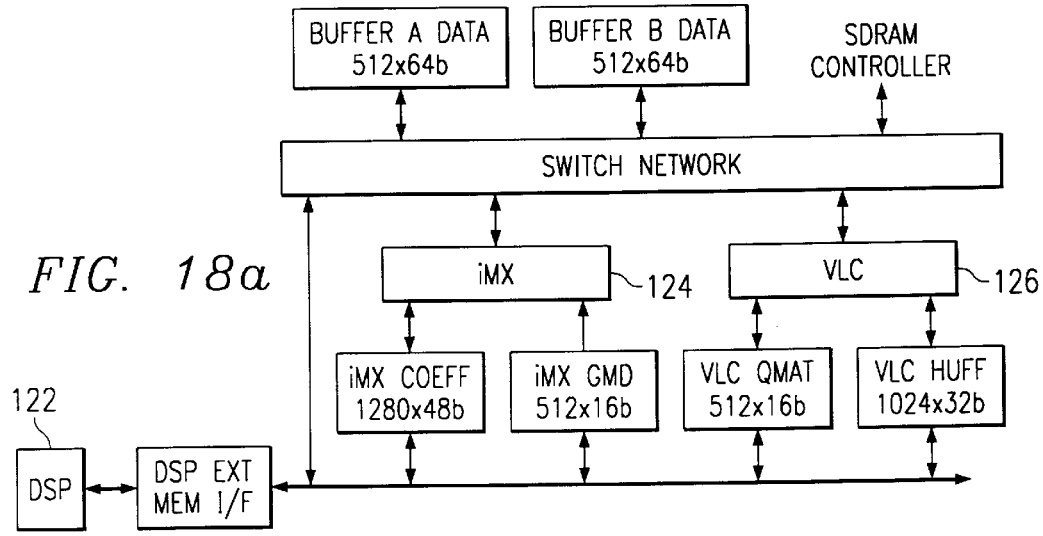
FIG. 18a
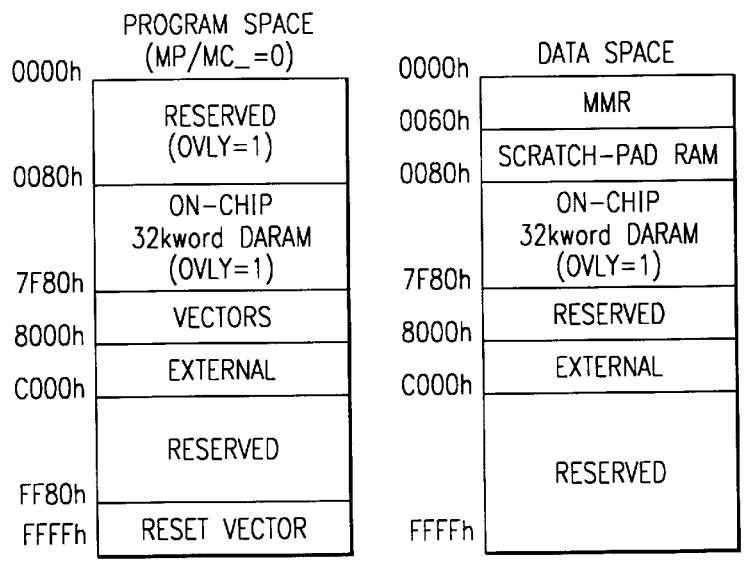
FIG. 18b

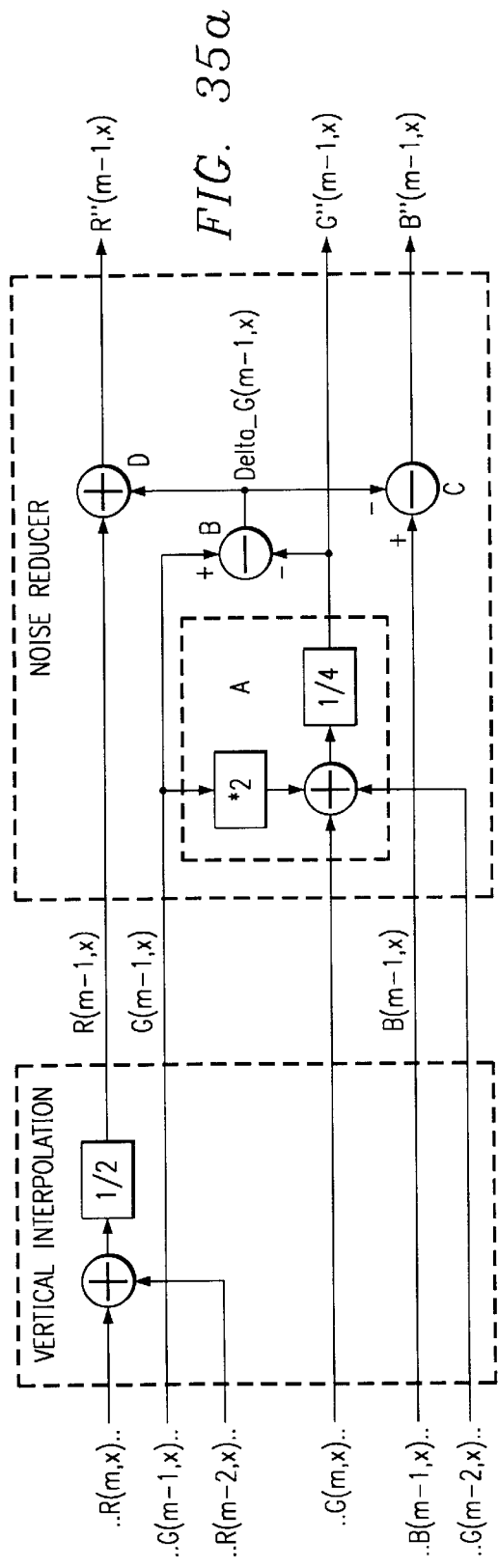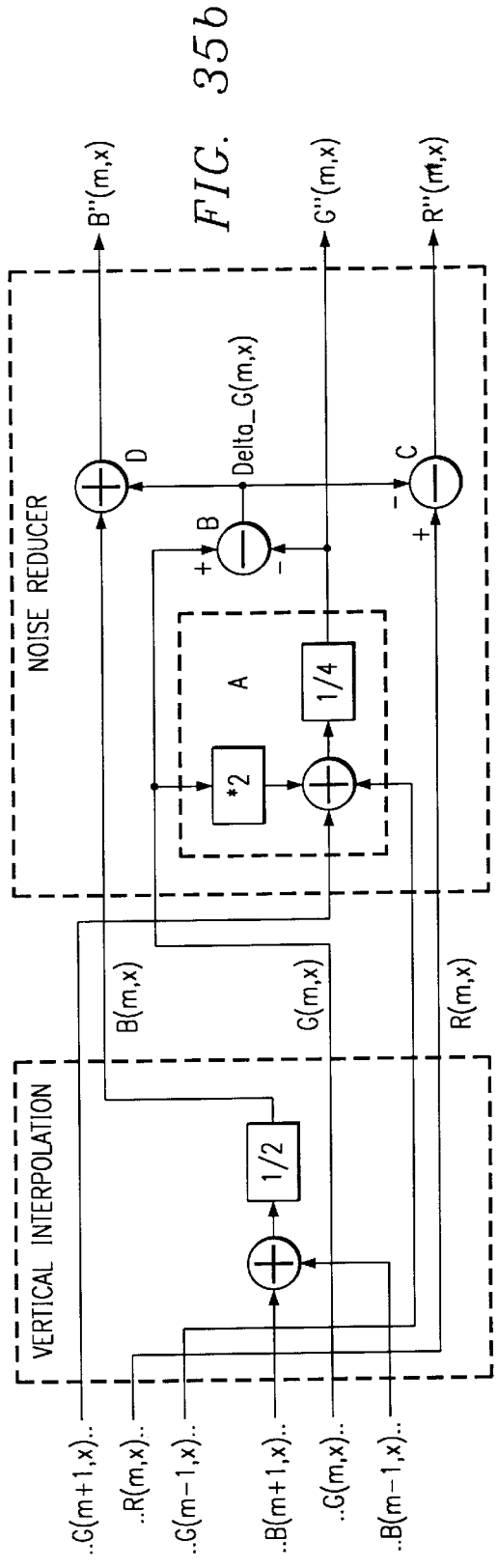
FIG. 35a
FIG. 35b

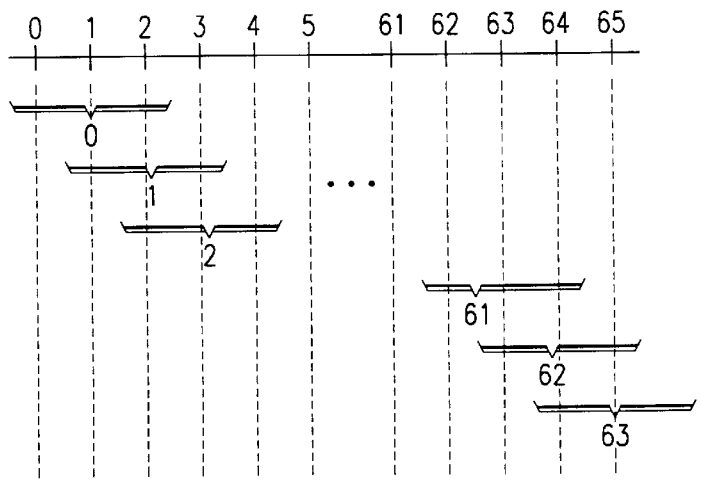
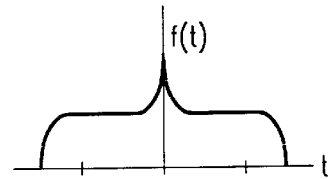
FIG. 41b
FIG. 41a
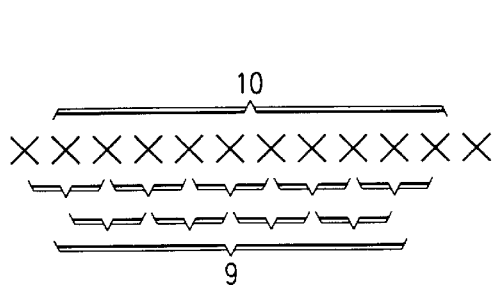
FIG. 42a
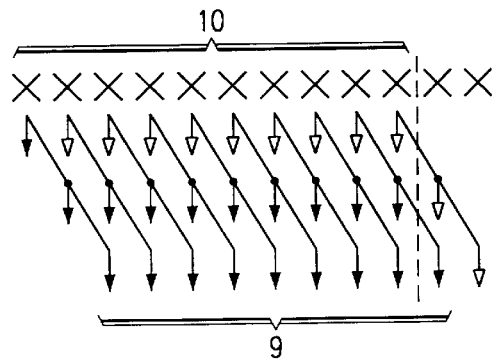
FIG. 42b
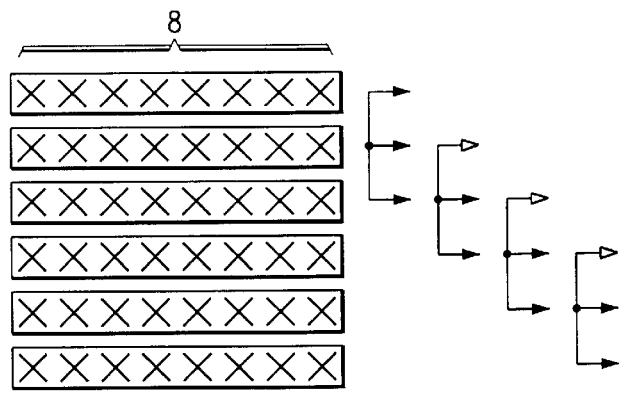
FIG. 42e

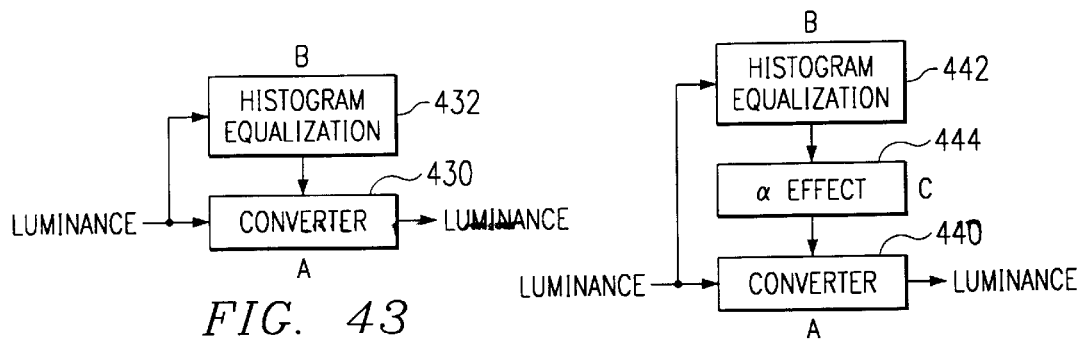
FIG. 43
FIG. 44
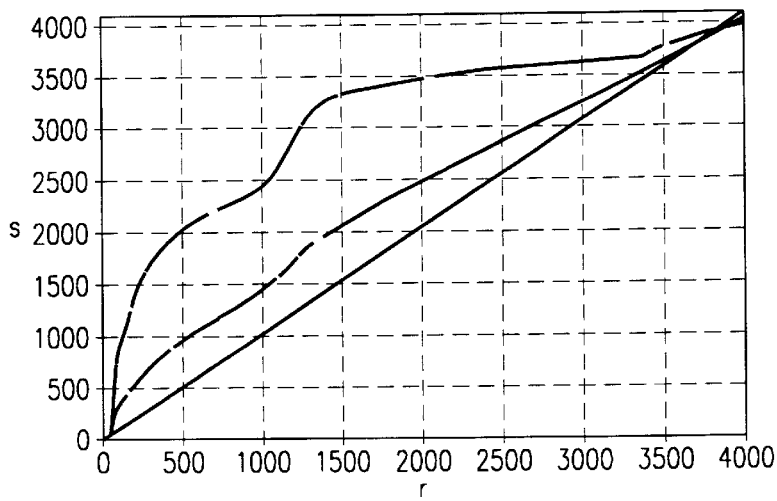
FIG. 45
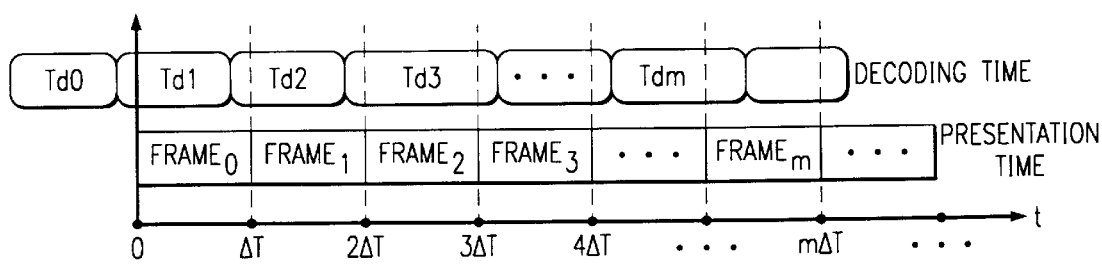
FIG. 46a
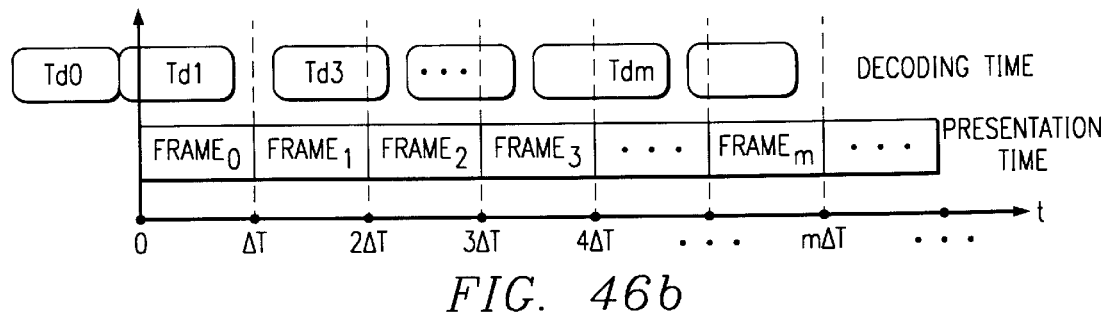
FIG. 46b

DIGITAL STILL CAMERA SYSTEM AND METHOD

CROSS REFERENCE TO RELATED APPLICATIONS

This application claims priority from provisional applications Ser. Nos. 60/172,780, filed Dec. 20, 1999; 60/176,272, filed Jan. 14, 2000; 60/177,432, filed Jan. 21, 2000; 60/214,951, filed Jun. 29, 2000; and 60/215,000, filed Jun. 29, 2000, plus application Ser. No. 09/632,543, filed Aug. 4, 2000. The following pending U.S. patent applications disclose related subject matter and have a common assignee with the present application: Ser. No. 09/490,813, filed Jan. 26, 2000.

BACKGROUND OF THE INVENTION

This invention relates to integrated circuits, and more particularly, to integrated circuits and methods for use with digital cameras.

Recently, Digital Still Cameras (DSCs) have become a very popular consumer appliance appealing to a wide variety of users ranging from photo hobbyists, web developers, real estate agents, insurance adjusters, photo-journalists to everyday photography enthusiasts. Recent advances in large resolution CCD arrays coupled with the availability of low-power digital signal processors (DSPs) has led to the development of DSCs that come quite close to the resolution and quality offered by traditional film cameras. These DSCs offer several additional advantages compared to traditional film cameras in terms of data storage, manipulation, and transmission. The digital representation of captured images enables the user to easily incorporate the images into any type of electronic media and transmit them over any type of network. The ability to instantly view and selectively store captured images provides the flexibility to minimize film waste and instantly determine if the image needs to be captured again. With its digital representation the image can be corrected, altered, or modified after its capture. See for example, Venkataraman et al, "Next Generation Digital Camera Integration and Software Development Issues" in Digital Solid State Cameras: Design and Applications, 3302 Proc. SPIE (1998). Similarly, U.S. Pat. No. 5,528,293 and U.S. Pat. No. 5,412,425 disclose aspects of digital still camera systems including storage of images on memory cards and power conservation for battery-powered cameras.

SUMMARY OF THE INVENTION

The invention provides a digital still camera architecture with a color-filtered array interpolation combined with low pass filtering for noise reduction.

This has advantages including interpolation by simple processing.

BRIEF DESCRIPTION OF THE DRAWINGS

FIGS. 1a–c show a preferred embodiment system in functional block format and image processing steps.

FIGS. 2–6 illustrate data flows.

FIGS. 7a–7b show CFA arrangements.

FIG. 8 is a functional diagram for white balance.

FIG. 16 is an on screen display window.

FIG. 17 shows a hardware cursor.

FIGS. 18a–18b illustrate a DSP subsystem.

FIGS. 28–38 illustrate color filter array interpolations.

FIGS. 41a–41b and 42a–42e indicate image resizing.

FIGS. 43–45 illustrate tone-scaling.

FIGS. 46a–46b and 47–48 show frame synchronization.

DESCRIPTION OF THE PREFERRED EMBODIMENTS

System Overview

Figure 1A:
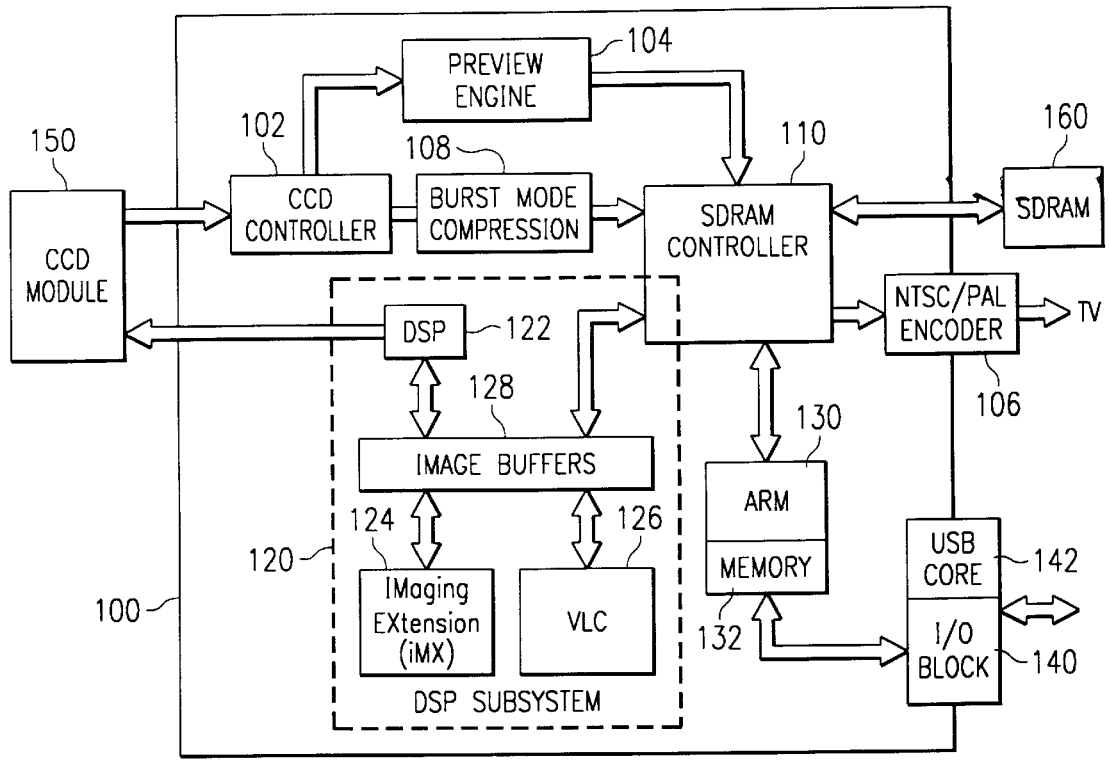
Figure 1B:
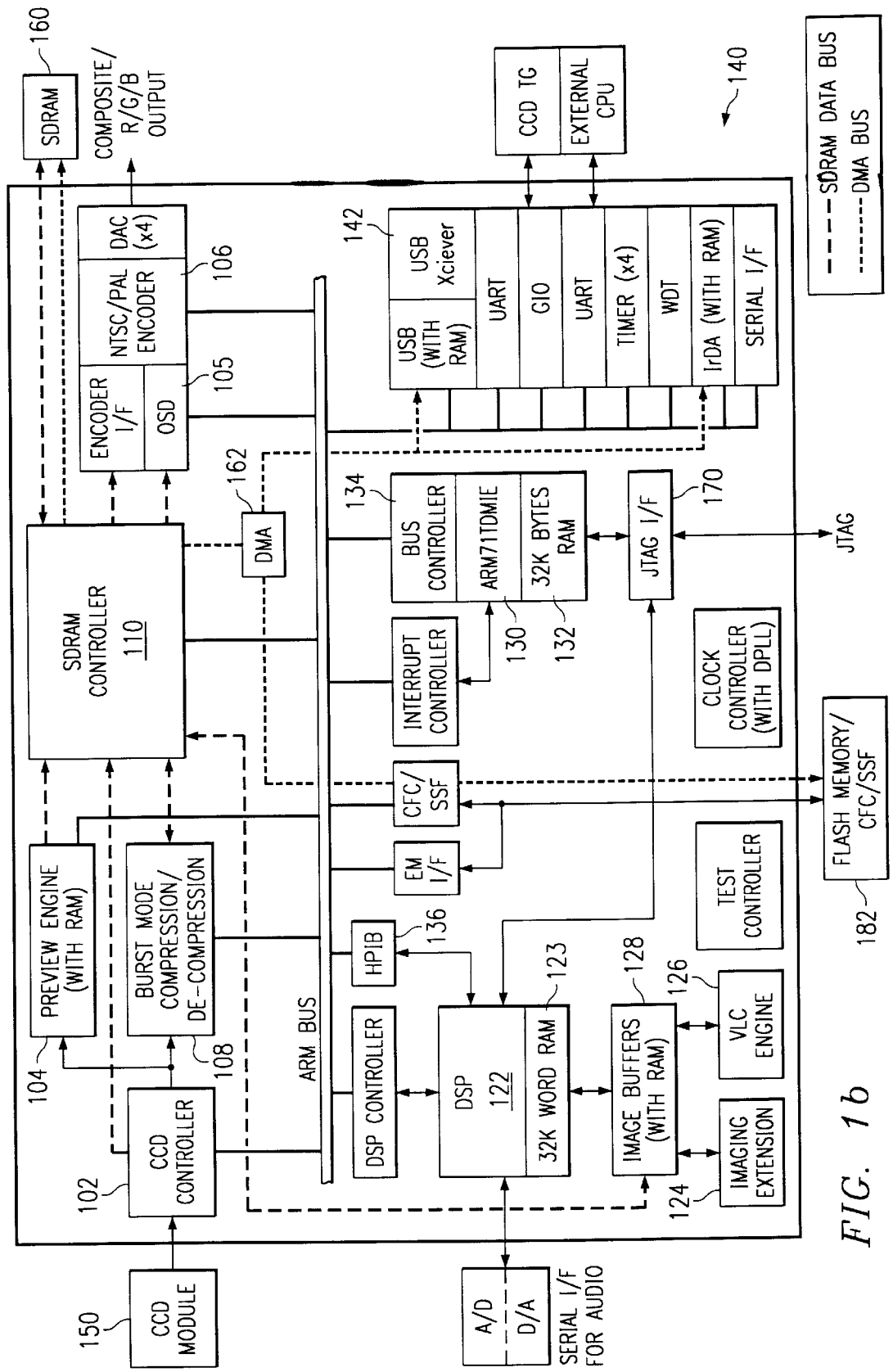

FIGS. 1a–1b show the various high-level functional blocks in a preferred embodiment digital still camera (DSC) and systems with FIG. 1b providing more detail than FIG. 1a. In particular, preferred embodiment integrated circuit 100 includes the following items: CCD Controller 102 interfaced with either CCD or CMOS imager 150; preview engine block 104 to convert the data from CCD controller 102 into a format suitable for display using NTSC encoder 106 or a digital LCD interface; burst mode compression-decompression engine 108 to compress the raw image data from CCD controller 102 using a lossless (or lossy, as selected by the user) compression and to write the compressed data to external SDRAM 160 via SDRAM controller 110. This data can then be decompressed by the decompression engine under DSP 122 control, processed, and displayed or stored back to SDRAM 160. DSP subsystem block 120 (DSP 122 and iMX 124 plus Variable Length Coder 126 and buffers 128) performs all the processing of the image data in the capture mode. The data is fetched from SDRAM 160 into image buffer 128 by DSP 122 through requests to SDRAM controller 110, and DSP 122 performs all the image processing and compression required in the capture mode. The Image Extension processor (iMX) 124 acts as a dedicated accelerator to DSP 122 to increase the performance of DSP 122 for the imaging applications.

RISC microprocessor subsystem (ARM 130 plus memory 132) supports the in-camera Operating Systems (OS). Various OSes and other real-time kernels such as VxWorks, Microitron, Nucleus, and PSOS may be supported on circuit 100.

SDRAM controller block 110 acts as the main interface between SDRAM 160 and all the function blocks such as the processors (ARM 130, DSP 122), CCD controller 102, TV encoder 106, preview engine 104, etc. SDRAM controller 110 may support up to 80 MHz SDRAM timing and also provide a low overhead for continuous data accesses. It also has the ability to prioritize the access units to support the real-time data stream of CCD data in and TV display data out.

Camera shot-to-shot delay is the time it takes for DSC engine 100 to read the data from CCD 150, process it and write it to SDRAM 160. The processing includes the image pipeline stages and also JPEG compression.

In order to support real-time preview, DSC engine 100 will set CCD 150 in "fast readout" mode, process the data, convert the data to NTSC format, and display the data on a built-in LCD screen (not shown in FIG. 1) or TV monitor as the case may be.

Auto focus, auto exposure and auto white balance (the 3A functions) are performed by DSP 122 while DSC 100 is in the preview mode of operation. DSP 122 reads the image data from SDRAM 160, performs the 3A functions in real-time. The algorithms for the 3A functions are programmable.

Both interlace and progressive CCD and CMOS imagers 150 interface directly to DSC engine 100 using the built-in CCD/CMOS controller 102.

In-camera operating systems such as Microitron will be supported efficiently on ARM processor 130 in DSC engine 100. DSC engine 100 also has the capability to support capturing of a rapid sequence of images in the "burst mode" of operation. Bursts at up to 10 frames/sec of 2 Megapixel images will be supported. The duration of the burst sequence is only limited by the size of SDRAM 160 of the DSC system. Also, MPEG compression may be used for short clips. And capabilities for playback of audio-video include circular buffering.

DSC circuit 100 also includes I/O block 140 with USB core 142 for programming and interrupt processing with ARM 130.

CCD module 150 includes a CCD imager to sense the images, driver electronics and a timing generator for the necessary signals to clock the CCD, correlated double sampling and automatic gain control electronics. This CCD data is then digitized and fed into the DSC Engine 100.

SDRAM 160 may be any convenient size and speed SDRAM.

DSC systems may be even more versatile with the ability to annotate images with text/speech. The preferred embodiment programmable DSP allows easy inclusion of a modem and/or a TCP/IP interface for direct connection to the Internet. DSCs may run complex multi-tasking operating systems to schedule the various real-time tasks.

Thus the preferred embodiments provide platforms for programmable camera functions, dual processors (ARM and DSP) plus an image coprocessor, burst mode compression/decompression engine, programmable preview engine, and integration of all camera peripherals including IrDA, USB, NTSC/PAL encoder, DACs for RGB, UART, and compact flash card/smart media card interface. Further, the platforms can provide both camera functions and digital audio playback on the same integrated circuit.

The following sections provide more detail of the functions and modules.

DSC Operating Modes

The preferred embodiment systems have (1) Preview mode, (2) Capture mode, (3) Playback mode, and (4) Burst mode of operation as follows.

Figure 2:
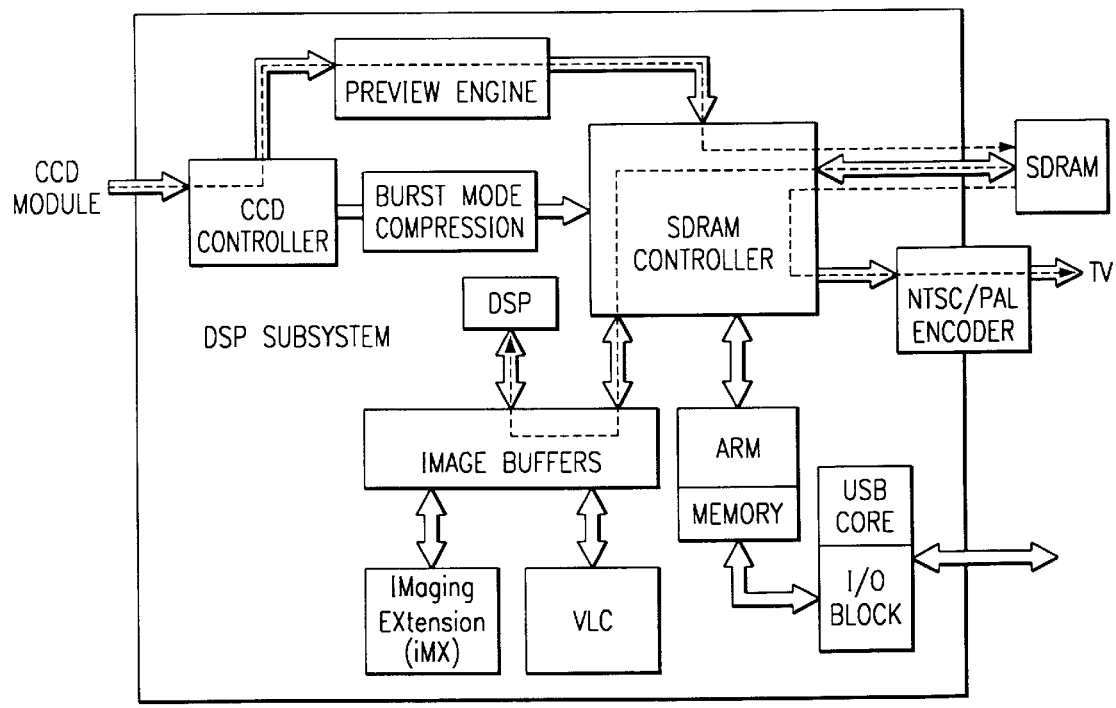

(1) Preview mode has data flow as illustrated in FIG. 2. ARM 130 sets CCD 150 into high-frame-rate readout mode (reduced vertical resolution). ARM 130 enables preview engine 104 and sets the appropriate registers for the default parameters. The raw CCD data is streamed into preview engine 104 and, after preview engine processing, is streamed into SDRAM 160. ARM 130 enables TV encoder 106 to display the preview engine output. Preview engine 104 processing (hardware) includes gain control, white balance, CFA interpolation, down-sampling, gamma correction, and RGB to YUV conversion. ARM 130 commands DSP 122 to perform auto exposure and auto white balance whenever required. DSP 122 processing includes auto exposure, auto white balance, and auto focus. ARM 130 receives new parameters for preview engine 104 and loads the preview engine hardware with these parameters. The output is full resolution CCIR 601 NTSC/PAL and real-time updating of gain, white balance, and auto focus.

Figure 3:
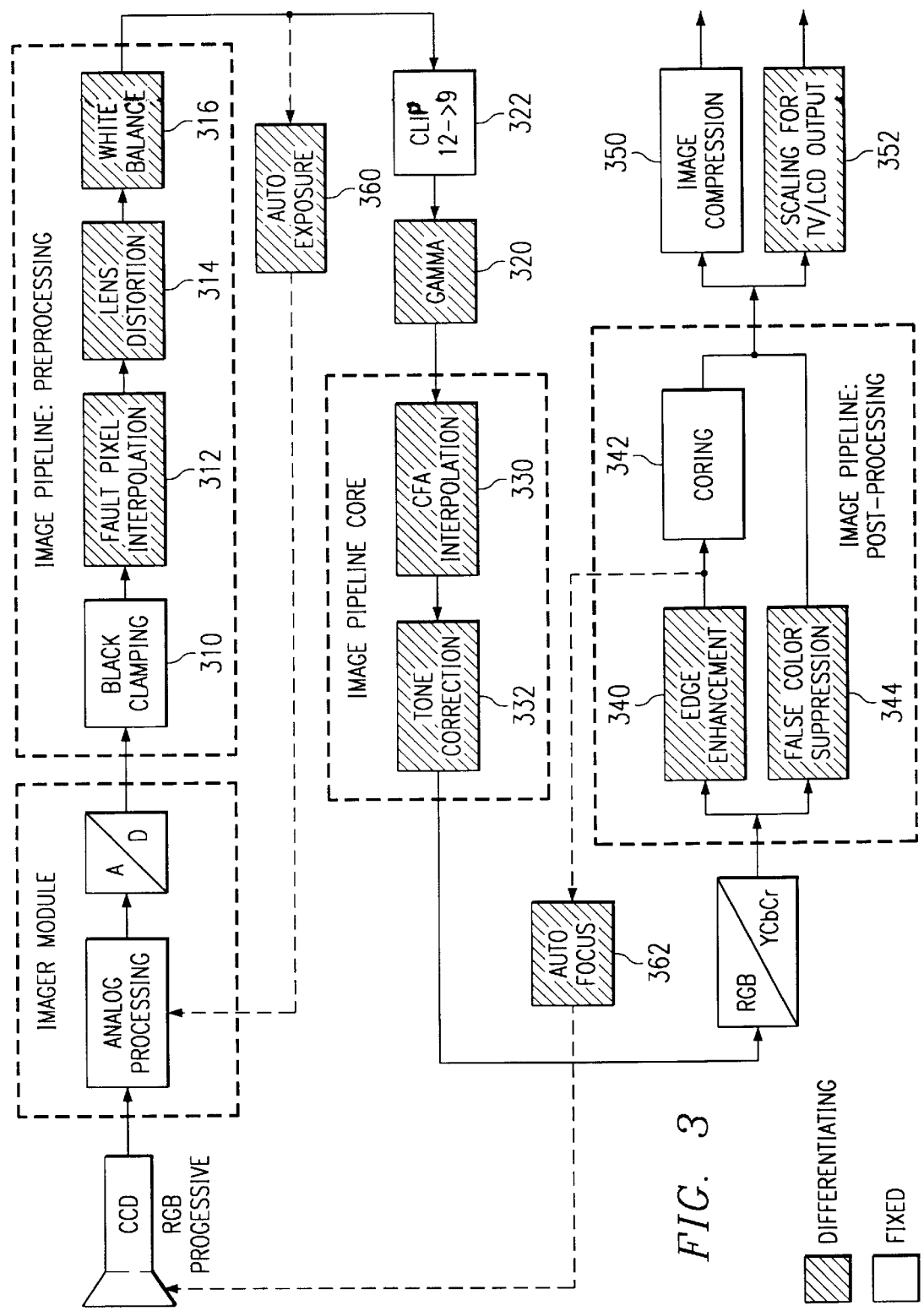
Figure 3A:
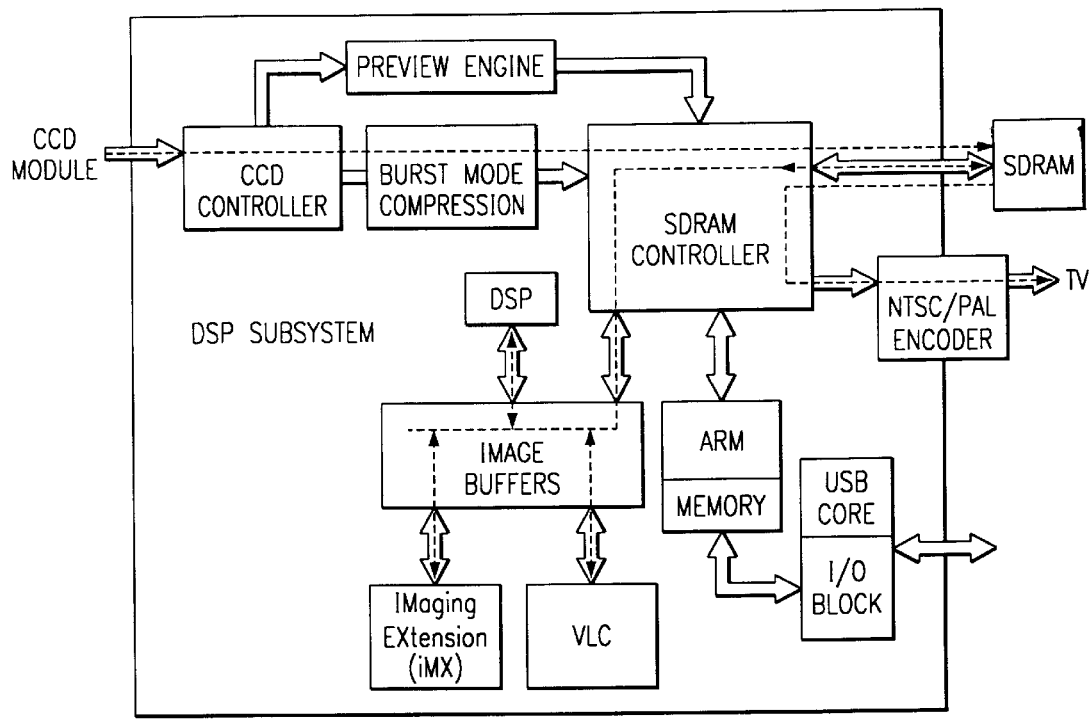

(2) Capture mode has data flow as illustrated in FIG. 3a. ARM 130 sets CCD 150 in "fine" readout mode, full resolution. The CCD data is read directly into SDRAM 160 through SDRAM controller 110. ARM 130 commands DSP 122 (plus IMX 124 and VLC engine 126) perform capture processing: black clamp, fault pixel correction, shading compensation, white balancing, gamma correction, CFA interpolation, color space conversion, edge enhancement, false color suppression, 4:2:0 down-sampling, and JPEG compression. The DSP stores compressed data in the SDRAM. ARM 130 writes the compressed data to compact flash/smart media 182.

Figure 3B:
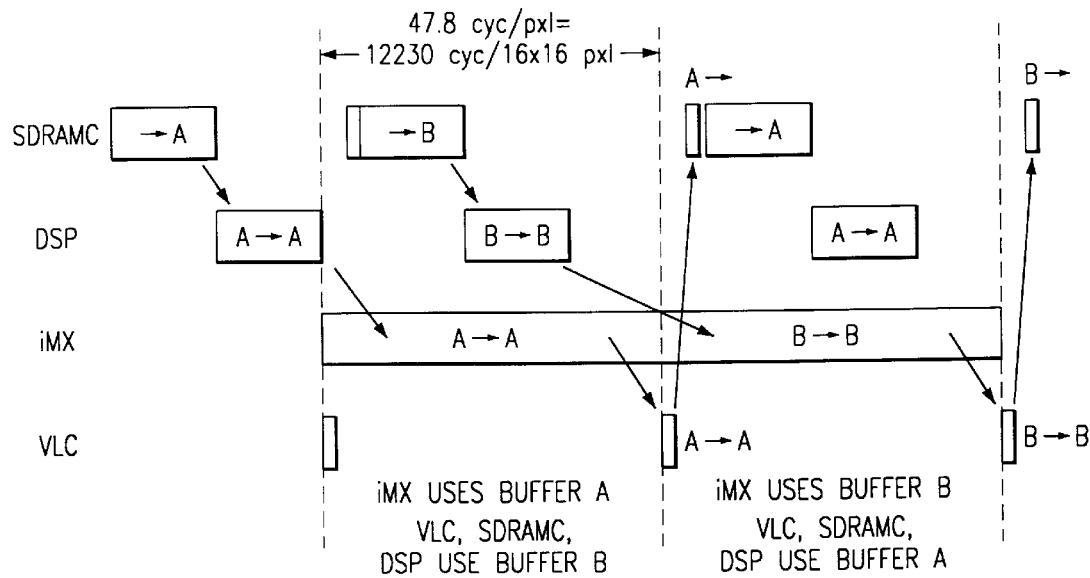

The computation is scheduled as two threads: iMX on one thread, the other units on the other thread. FIG. 3b shows timing and data flow with threads related to buffers A and B.

Figure 4:
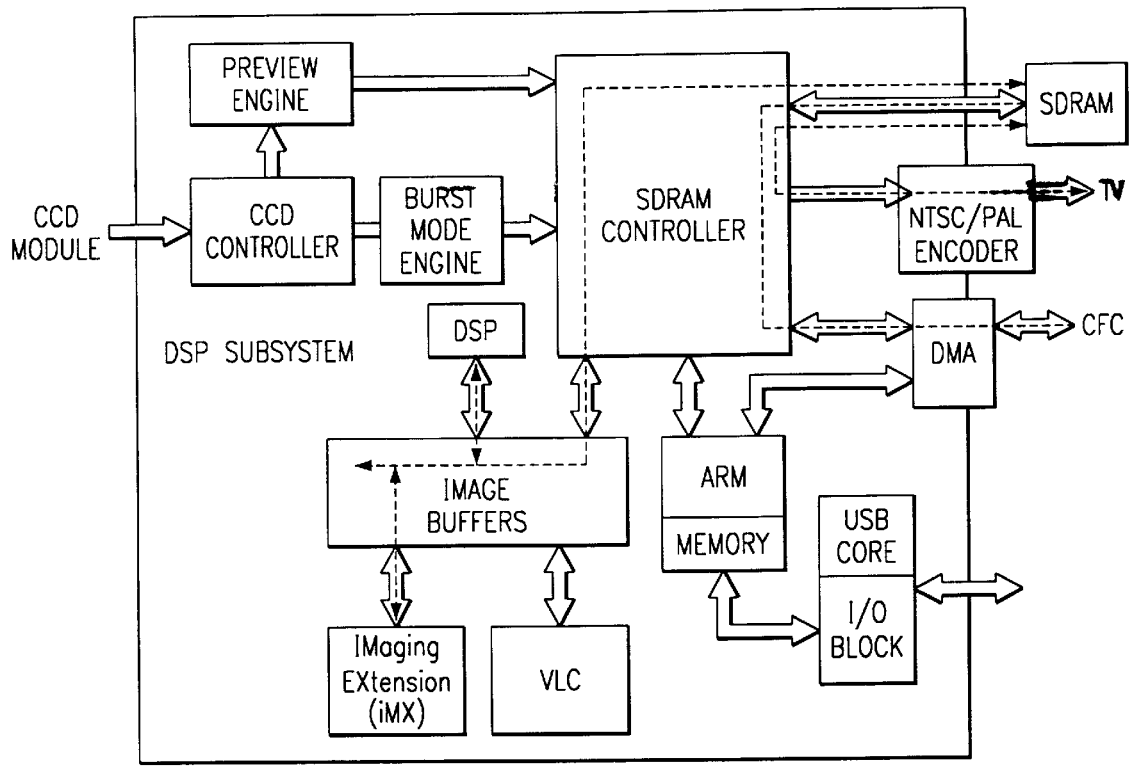

(3) Playback mode has data flow as illustrated in FIG. 4. ARM 130 reads the compressed data from CFC/Smartmeda 182 into SDRAM 160 through the SDRAM controller 110 using DMA 162. ARM commands DSP 122 to do "playback". DSP processing (DSP 122 plus IMX 124 and VLC engine 126) includes JPEG decode (bitstream parsing, IDCT, VLD, and down-sampling for aspect ratio) and store uncompressed image data in SDRAM. ARM enables TV encoder 106 to display the image on TV/LCD display. Note that also audio plus video (e.g., MPEG compressed) clips may be played back.

Figure 5:
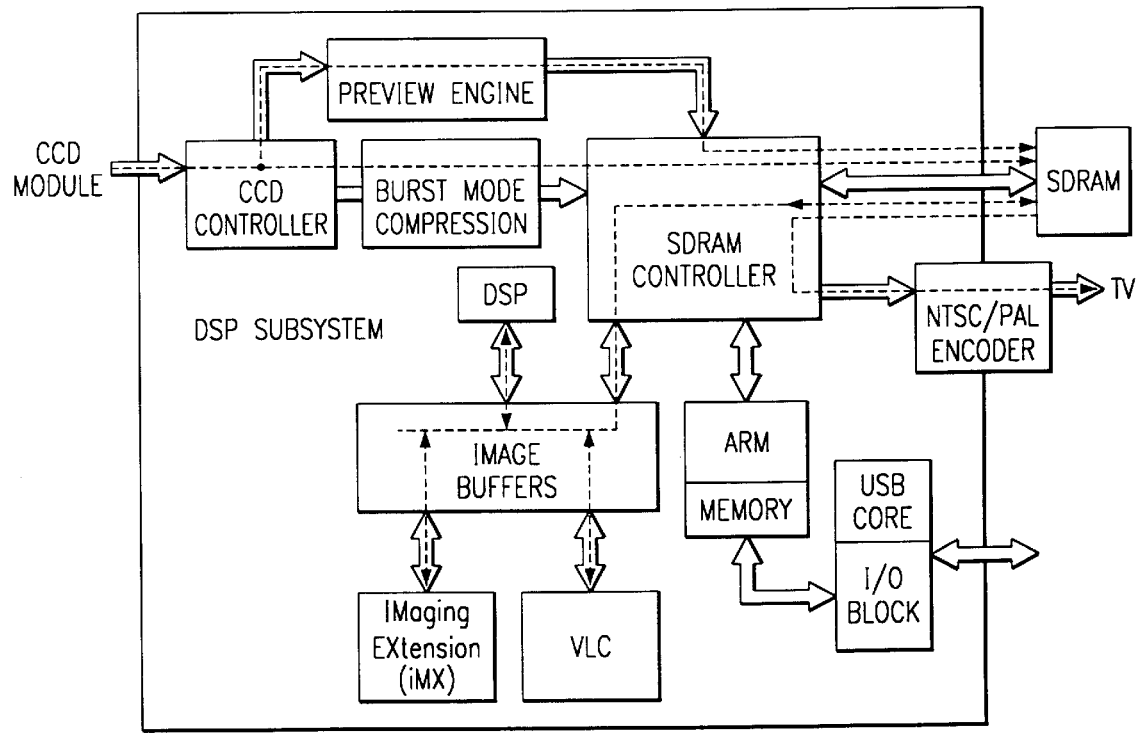

(4) Burst capture mode has data flow as illustrated in FIG. 5, and FIG. 6 shows offline data processing. ARM 130 sets CCD 150 into fine resolution mode. ARM sets up the burst compression parameters, burst length, number of frames/second, compression ratio (lossy, lossless), etc. ARM enables burst compression engine 108 to write the raw CCD data to SDRAM 160. ARM signals DSP to process each of the stored raw CCD images in the burst. Burst mode decompression engine 108 decompresses each of the burst captured images. DSP processes each of the images as in normal capture and writes the JPEG bitstream to SDRAM 160.

Burst capture mode is achieved by repeated calls to the regular playback routine with a different JPEG bitstream each time by ARM 130.

The preferred embodiment also has MPEG1 capture mode and playback mode.

Image Acquisition

A DSC usually has to perform multiple processing steps before a high quality image can be stored. The first step is the image acquisition. The intensity distribution reflected from the scene is mapped by an optical system onto the imager. The preferred embodiments use CCDs, but a shift to CMOS does not alter the image processing principles. To provide a color image the imager (CCD or CMOS) has each pixel masked by a color filter (such as a deposited dye on each CCD photosite). This raw imager data is normally referred as a Color-Filtered Array (CFA). The masking pattern of the array of pixels in the CCD as well as the filter color primaries vary between different manufactures. In DSC applications, the CFA pattern that is most commonly used is an RGB Bayer pattern that consists of 2×2 cell elements which are tiled across the entire CCD-array. FIG. 7a depicts a subset of this Bayer pattern in the matrix block following the CCD camera. Note that half of the pixels are sensitive to green and that the red and blue are balanced to green. FIG. 7b shows a subset of the alternative complementary color CFA pattern with yellow, cyan, green, and magenta pixels. Each pixel in the final color image has three (or four) color values, such as a red, a green, and a blue value for RGB images. The red values alone could be called the "red plane" or "red channel" or "red array", and the raw data from the CFA (where each pixel has only one color value) may be separated into the "red subarray", "green subarray", and "blue subarray" with the subarray either considered alone or as embedded in a full array (or plane or channel) with the other pixels' values as 0s.

Image Pipeline

CFA data needs to undergo a significant amount of image processing before the image can be finally presented in a usable format for compression or display. All these processing stages are collectively called the "image pipeline". The preferred embodiment DSC may perform multiple processing steps before a high quality image can be stored, and FIG. 1c illustrates a possible set of processing steps. Most of the image pipeline processing tasks are multiply-accumulate (MAC) intensive operations, making a DSP a preferred platform. The various image pipeline processing stages are described in the following sections.

A/D Converters

The A/D converter digitizing the CCD imager data may have a resolution of 10 to 12 bits. This allows for a good dynamic range in representing the input image values. Of course, higher resolution implies higher quality images but more computations and slower processing; and lower resolution implies the converse. The A/D converter may be part of the CCD module.

Black Clamp

After A/D conversion the "black" pixels do not necessarily have a 0 value due to a CCD which may still record some current (charge accumulation) at these pixel locations. In order to optimize the dynamic range of the pixel values represented by the CCD imager, the pixels representing black should have a 0 value. The black clamp function adjusts for this by subtracting an offset from each pixel value. Note that there is only one color channel per pixel at this stage of the processing.

Fault Pixel Interpolation

CCD-arrays may have defective (missing) pixels, especially arrays with more than 500,000 elements. The missing pixel values are filled by simple interpolation. A high order interpolation may not be necessary because an interpolation is also performed in the CFA interpolation stage. Therefore, the main reason for this preliminary interpolation step is to make the image processing regular by eliminating missing data.

Typically, the locations of the missing pixels are obtained from the CCD manufacturer. The faulty pixel locations can also be computed by the DSC engine offline. For example, during camera initialization operation, an image with the lens cap closed is captured. The faulty pixels appear as "white spots" while the rest of the image is dark. The faulty pixel locations can then be identified with a simple threshold detector and stored in memory as a bitmap.

During the normal operation of the DSC the image values at the faulty pixel locations are filled by a simple bilinear interpolation technique.

Lens Distortion Compensation

Due to non-linearities introduced by imperfections in lenses, the brightness of the image decreases from the center of the image to the borders of the image. The effects of these lens distortions are compensated by adjustment of the brightness of each pixel as a function fo its spatial location. The parameters describing the lens distortions need to be measured with the final system, supported by information supplied by the lens manufacturer.

The lens adjustment can be accomplished by multiplying the pixel intensity with a constant, where the value of the constant varies with the pixel location. The adjustment needs to be done for both horizontal and vertical directions.

White Balance

White balancing tries to transform the tristimulus values sensed under a certain light condition such that if displayed white appears again as white. In general the colors as captured by the camera do not appear on an output device as they were seen when capturing the scene. A couple of reasons account for that.

First, the sensitivity of the color filters over the spectral range are slightly different. If exposed with a perfect white light source (constant light spectrum) the tristimulus values sensed by the CCD are slightly different.

Second, the design of the entire CCD module and the optical system add to the imbalance of the tristimulus values.

Third, typical illuminants present while recording a scene are not constant. The illuminants have a certain "color", which is typically characterised as "color temperature" (or correlated color temperature). If an image captured under illuminant 1 is displayed under a different illuminant the color appearance changes. This causes a white area to turn a little bit red or a little bit blue.

Several different approaches for white balancing are known. Most of them multiply the red and blue channels with a factor such that the resulting tristimuls value for a white patch has identical values:

$$\begin{bmatrix} R' \\ G' \\ B' \end{bmatrix} = \begin{bmatrix} a1 & 0 & 0 \\ 0 & 1 & 0 \\ 0 & 0 & a2 \end{bmatrix} \begin{bmatrix} R \\ G \\ B \end{bmatrix},$$

$R' = G' = B'$ for a neutral (gray) patch

However, as explained later, this approach does not provide correction for changes of the illuminant. Therefore, the white balancing implementation in preferred embodiment system corrects imbalances of the sensor module. The illumination correction is handled at a later stage in the color correction section.

Typical techniques to calculate the gain factors are (1) equal energy $$a1 = \Sigma_{(x,y)} g^2(x,y) / \Sigma_{(x,y)} r^2(x,y)$$

(2) gray world assumption $$a1 = \Sigma_{(x,y)} g(x,y) / \Sigma_{(x,y)} r(x,y)$$

(3) maximum value in an image is white $$a1 = \max_{(x,y)} g(x,y) / \max_{(x,y)} r(x,y)$$

All of them do not hold in every case. Therefore, by defining the white balancing mainly as a correction of imager module characteristics, the algorithms to obtain the correction values can be made almost scene independent.

The FIG. 8 depicts the simplified realization of the preview engine, giving good results as long as the CCD sensor operates in the linear range. The white balance section below discusses a more sophisticated method.

Gamma Correction

Display devices (TV monitors) used to display images and printers used to print images have a non-linear mapping between the image gray value and the actual displayed pixel intensities. Hence, in the preferred embodiment DSC Gamma correction stage compensates the CCD images to adjust them for eventual display/printing.

Gamma correction is a non-linear operation. The preferred embodiments implement the corrections as table look ups. The advantages of table look up are high speed and high flexibility. The look-up table data might even be provided by the camera manufacturer.

With 12-bit data, a full look-up table would have 4 K entries, with each entry 8 to 12 bits. For a smaller look-up table, a piecewise linear approximation to the correction curves could be used. For example, the 6 most significant bits could address a 64-entry look-up table whose entries are pairs of values: a base value (8 to 12 bits) and a slope (6 bits). Then the product of the 6 least significant bits and the slope is added to the base value to yield the final corrected value of 8 to 12 bits. FIG. 9b illustrates a piecewise linear approximation curve, and FIG. 9c the corresponding operations.

Note that LCD displays can be considered to be linear, making gamma compensation unnecessary. However, LCD display modules usually expect an NTSC input (which is already gamma compensated) and hence perform some "gamma uncorrection" (inverse gamma correction) to compensate for this expected gamma correction. So in the preferred embodiment DSCs using such LCD preview modules, still perform Gamma correction and then NTSC encode the signal before feeding it to the LCD module.

Gamma correction may be performed at the end of the all the stages of the image pipeline processing and just before going to the display. Alternatively, the image pipeline could perform the Gamma correction earlier in the pipeline: before the CFA interpolation stage.

CFA Interpolation

Due to the use of a color-filtered array (CFA), the effective resolution of each of the color planes is reduced. At any given pixel location there is only one color pixel information (either of R, G, or B in the case of RGB color primaries). However, it is required to generate a full color resolution (R, G, and B) at each pixel in the DSC. To be able to do this, the missing pixel values (R and B at the G location, etc.) are reconstructed by interpolation from the values in a local neighborhood in the CFA interpolation. To take advantage of the DSP in this system a FIR-kernel is employed as interpolation filter. The length of the filter and the weights vary from one implementation to the other. Also the interband relationship has to be considered. FIG. 10 describes the realization of the CFA interpolation in the hardwired preview engine module. It basically employs a 1D FIR kernel for horizontal followed by vertical interpolation.

The implementation in the DSP subsystem for high quality image processing is different in that it is fully programmable and able to utilize 2D filter kernels. Some background information and a proposal for an improved CFA interpolation technique is given in subsequent sections.

Color Correction

Changes in the color appearance caused by differing illuminants between capture and playback/print cannot be corrected just by balancing the red, green and blue channels independently. To compensate for this, a tone (color) correction matrix maps the RGB pixel values to corrected RGB pixel values that take the illuminant into account.

The principle is as follows. Let I1 denote an N×N diagonal matrix describing the recording illuminant, S the N×3 matrix denoting the spectral characteristics of the imager module with one column vector for each color, and R the 1×N column vector describing the reflectance of the scene. The measured tristimulus value X1 at a pixel location is given by:

$$X1^T = R^T * I1 * S$$

Denoting $$SS = S * S^T$$

we can transform the measured tristimulus value X1 into X2, we would have been measured if the scene would have been illuminated by I2:

$$X2^T = X1^T * S^T * SS^{-1} * I1^{-1} * I2 * S$$

The 3×3 transform matrix $S^T * SS^{-1} * I1^{-1} * I2 * S$ can be calculated offline, assuming that the spectral response of the sensor can be measured. Thus it is sufficient to store a set of color correction matrices for different illuminants in the camera.

Since the subjective preferences of the color appearance changes among users, it is easily possible to include these into the color correction matrix or add a separate step to the image processing pipeline (e.g. "tone scale").

Color Space Conversion

Figure 11A:
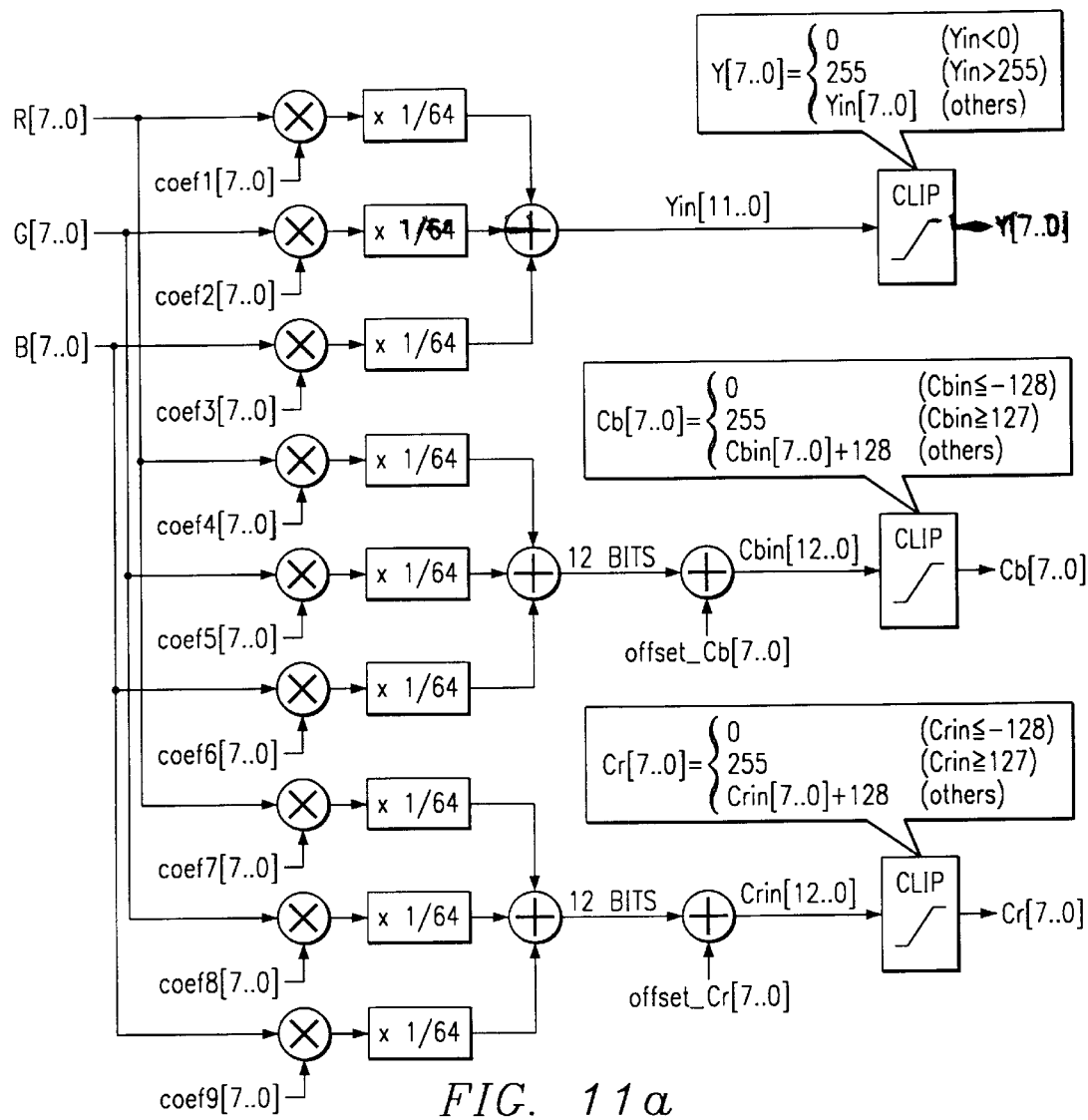
FIGS. 11a–11b show color conversion.

After the CFA interpolation and color correction, the pixels are typically in the RGB color space. Since the compression algorithm (JPEG) is based on the YCbCr color space, a color space transformation must be carried out. Also the preferred embodiment DSC generates a NTSC signal output for display on the TV and also to feed into the LCD preview. Hence an RGB to YCbCr color space conversion needs to be carried out. This is a linear transformation and each Y, Cb, Cr value is a weighted sum of the R, G, B values at that pixel location. FIG. 11a illustrates the color conversion as realized in the hardwired preview engine. The DSP (playback) implementation is similar in principle but allows a higher precision conversion:

$$\begin{bmatrix} Y \\ Cb \\ Cr \end{bmatrix} = \begin{bmatrix} \alpha 1 & \alpha 2 & \alpha 3 \\ \alpha 4 & \alpha 5 & \alpha 6 \\ \alpha 7 & \alpha 8 & \alpha 9 \end{bmatrix} \begin{bmatrix} R \\ G \\ B \end{bmatrix}$$

Edge Enhancement

After CFA interpolation the images appear a little "smooth" due to the low pass filtering effect of the interpolation filters. To sharpen the images it is sufficient to operate on the Y-component only. At each pixel location we compute the edge magnitude using an edge detector, which is typically a two-dimensional FIR filter. The preferred embodiment uses a 3×3 Laplace-Operator. The edge magnitude is thresholded and scaled and before being added to the original luminance (Y) image to enhance the sharpness of the image.

Figure 11B:
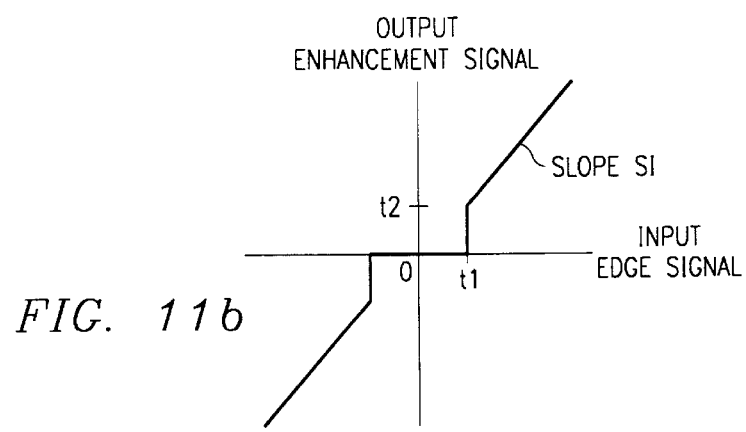

The edge enhancement is a high pass filter; this high pass filter also amplifies the noise. To avoid this amplified noise, a threshold mechanism is used to only enhance those portion of the image lying on an edge. The amplitude of the amplified edge may vary. The threshold operation is necessary to reduce amplification of noise. Therefore, only those pixels get enhanced which are an element of an edge. The enhancement signal added to the luminance channel can be represented graphically as in FIG. 11b; the parameters t1, t2, and the slope s1 can be chosen as seen necessary to obtain the best quality.

False Color Suppression

Note that the edge enhancement is only performed in the Y image. At edges the interpolated images of the color channels may not be aligned well. This causes annoying rainbow-like artifacts at sharp edges. Therefore, by suppressing the color components Cb and Cr at edges in the Y-component, these artifacts can be reduced. Depending on the output of the edge detector, the color components Cb and Cr are multiplied by a factor less than 1 on a per pixel basis to suppress the false color artifacts.

Image Compression

The image compression step compresses the image, typically by about 10:1 to 15:1. The preferred embodiment DSC uses JPEG compression. This is a DCT-based image compression technique that gives good performance.

Auto Exposure

Due to the varying scene brightness, to get a good overall image quality, it is necessary to control the exposure of the CCD to maximize the dynamic range of the digitized image. The main task of exposure control is to keep the sensor operating in the linear range by controling the shutter speed, and if possible the aperture of the optical system. Since closing the iris and slowing down the shutter speed compensates each other, there exists a certain parameter range in which the exposure remains unchanged. It is obvious that this can be accomplished only to a certain extent as other constraints as capturing fast moving scenes may be desired by the user.

Besides trying to keep the sensor operating in the linear range it is desirable to maximize the dynamic range of the ADC and hence the digitized image. This is done by controlling the PGA in the AFE. The processing necessary to obtain the relevant control parameters is performed on the DSP.

Auto Focus

It is also possible to automatically adjust the lens focus in a DSC through image processing. Similar to Auto Exposure, these auto focus mechanisms operate also in a feed back loop. They perform image processing to detect the quality of lens focus and move the lens motor iteratively till the image comes sharply into focus. Auto focus may rely on edge measurements from the edge enhancement previously described.

Playback

The preferred embodiment DSCs also provide the ability for the user to view the captured images on LCD screen on the camera or on an external TV monitor. Since the captured images are stored in SDRAM (or on compact flash memory) as JPEG bitstreams, playback mode software is also provided on the DSP. This playback mode software decodes the JPEG bitstream, scales the decoded image to the appropriate spatial resolution, and displays it on the LCD screen and/or the external TV monitor.

Down-sampling

In the preferred embodiment DSC system the image during the playback mode after decoding the JPEG data is at the resolution of the CCD sensor, e.g. 2 Megapixels (1600× 1200). This image can even be larger depending on the resolution of the CCD sensor. However, for the display purposes, this decoded data has to be down-sampled to NTSC resolution (720×480) before it can be fed into the NTSC encoder. Hence, the DSC should implement a down-sampling filter at the tail end of the playback mode thereby requiring additional DSP computation.

The preferred embodiment solves this problem of additional DSP computations by a DCT-domain down-sampling scheme that is included as part of the JPEG decompression module. Note that the JPEG decompression essentially involves three stages: first an entropy decoding stage, followed by an inverse quantization stage, and finally an IDCT stage. In JPEG the IDCT is performed on a block of 8×8 pixels. The preferred embodiments down sample a 2 Megapixel image to NTSC resolution (a 4/8 down-sampling) in the IDCT domain by employing a 4×4 IDCT to the top left 4×4 DCT coefficients (out of a 8×8 DCT coefficient block) and hence effectively achieving both the IDCT and the 4/8 down-sampling in one step. The sampling ratio can be varied between 1/8 (smallest image) to 8/8 (full resolution image).

A separable two-dimensional 4-point IDCT is applied to obtain a 4×4 block of image pixels from the top-left (low spatial frequency) 4×4 DCT coefficients. By this low-order IDCT we effectively combine anti-aliasing filtering and 8-to-4 decimation. The employed anti-aliasing filter corresponds to a simple operation of preserving only the 16 lowest frequency components in the DCT domain without scaling the preserved DCT coefficients. Though this simple filter is effective in reducing aliasing effect, the preferred embodiments may have a lowpass filter with better frequency response to further reduce aliasing. The use of other lowpass filters will lead to scaling of the preserved coefficients where the scaling factor is the location of each DCT coefficient.

Note that the DCT domain down-sampling technique does not increase the computational complexity. In fact, it reduces the computation since the JPEG decoding stages after entropy decoding does not need to deal with the whole 8×8 DCT coefficients except the top-left 4×4 coefficients. Use of other anti-aliasing filters also does not add any complexity since the coefficient scaling operation can be merged into the low-order IDCT operation. Also note that this DCT domain down-sampling idea technique can offer n/8 down-sampling ratios, n=1, . . . , 7, for other CCD sensor resolutions.

Up-Sampling

Displaying cropped images for zooming of images also uses an up-sampling scheme. The inverse approach to the down-sampling provides an elegant tool. In the first case the 8×8 DCT coefficients are (virtually) vertically and horizontally extended with zeroes to form a block of N×M coefficients (N,M>8). On this block an IDCT of size N×M is executed yielding N×M samples in the spatial domain.

Currently, most image pipeline operations are non-standardized. Having a programmable DSC engine offers the ability to upgrade the software to conform to new standards or improve image pipeline quality. Unused performance can be dedicated to other tasks, such as human interface, voice annotation, audio recording/compression, modem, wireless communication, etc.

Figure 27:
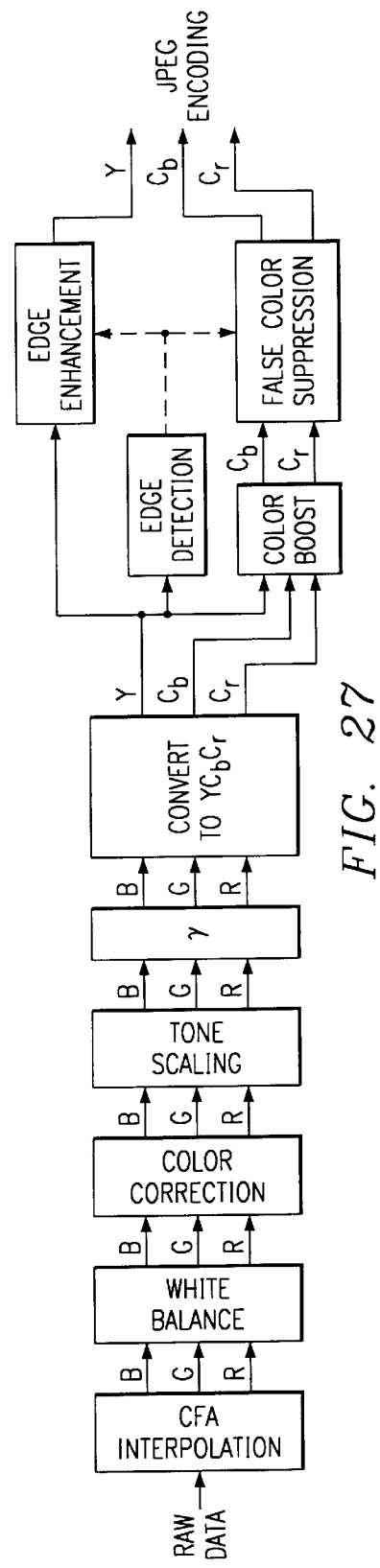
FIG. 27 shows image pipeline processing blocks.

FIG. 27 shows a preprocessing functional block diagram including CFA interpolation, white balance, color correction, tone scaling, gamma correction, conversion of RGB to YCrCb, edge enhancement, edge detection, color boost, and false color suppression in preparation of JPEG compression. The following sections describe preferred embodiments relating to CFA interpolations.

CFA Interpolation with Reduced Aliasing

A preferred embodiment CFA interpolation for a Bayer pattern (FIG. 7a) uses the high-frequency from the green channel to modify the red and blue channel interpolations to reduce the aliasing components at edges within the image by utilizing the signal of the other color channels. By this means artifacts are reduced, sharpness improved, and additional post-processing avoided. Indeed, proceed as follows.

(1) apply interpolation to green channel (any interpolation method); this yields the green plane.

(2) detect edges in the green channel (by gradient or other method).

(3) compute high-pass component of the green channel (filter with any high-pass filter).

(4) apply interpolation to the red channel (any interpolation method); this yields the red plane.

(5) add high-pass component of (3) (with a weighting factor) to red channel.

(6) apply interpolation to the blue channel (any interpolation method); this yields the blue plane.

(7) add high-pass component of (3) (with a weighting factor) to the blue channel.

So the final image consists of three color planes: the green plane from step (1), the red plane from step (5), and the blue plane from step (7). That is, for a pixel in the final image the green intensity is taken to be the value of the corresponding pixel of the green plane from step (3), the red intensity is taken to be the value of the corresponding pixel of the modified red plane from step (5), and the blue intensity is taken to be the value of the corresponding pixel of the modified blue plane from step (7)

Theoretical analysis of the foregoing: Each CCD pixel averages the incident optical signal over the spatial extent of the pixel; thus the CCD effectively provides a low-pass filtering of the incident optical signal with a cutoff frequency the reciprocal of the pixel size. Further, the subsampling of the pixel array by the color filters on the pixels leads to aliasing in each color plane. Indeed, for red and blue the subsampling is by a factor of 2 in each direction; so the frequency spectrum folds at half the maximum frequency in each direction. Thus the red and blue baseband spectra areas are each one-quarter of the original array spectrum area (reflecting that the red and blue samplings are each one-quarter of the original array). For green the subsampling is only half as bad in that the spectrum folding is in the diagonal directions and at a distance $\sqrt{2}$ as large as for the red and blue. The green baseband spectrum is one-half the area of the original array spectrum.

Color fringing at edges is an aliasing problem. In addition, dissimilar baseband spectra lead to color fringing as well, even if no aliasing is present. Indeed, aliasing is not necessarily visible in a single color band image, but the effect becomes obvious upon combination of the three color components into one color image. The shift of the sampling grids between red, green, and blue causes a phase shift of the aliasing signal components. A one-dimensional example clarifies this: presume a one-dimensional discrete signal f(n) and two subsamplings, each by a factor of 2 but one of even-numbered samples and one of odd-numbered samples (so there is a shift of the sampling grids by one sample):

$f_{even}(2m)=f(2m)$ $f_{even}(2m+1)=0$ $f_{odd}(2m)=0$ $f_{odd}(2m+1)=f(2m+1)$

Of course, $f(n)=f_{even}(n)+f_{odd}(n)$. Let $F(z)$ be the z-transform of $f(n)$, $F_{even}(z)$ the z-transform of $f_{even}(n)$, and $F_{odd}(z)$ the z-transform of $f_{odd}(n)$. Then noting that $F_{even}(z)$ is an even function of z (only even powers of z) and $F_{odd}(z)$ an odd function of z (only odd powers of z):

$F_{even}(z)=\{F(z)+F(-z)\}/2$ $F_{odd}(z)=\{F(z)-F(-z)\}/2$

The $F(-z)$ corresponds to the aliasing and appears with opposite signs; that is, a phase shift of $\pi$.

The color fringing can be reduced by a phase shift of $\pi$ of the aliased components. However, this is very difficult to achieve, because the only available signal is the sum of the original signal with the aliasing signal. Therefore, the preferred embodiments have another approach.

As long as two (or more) subsampled signals (i.e., red, green, and blue) have identical characteristics (such as for a gray scale image), a perfect reconstruction of the original image can be achieved by just adding the subsampled signals. However, in CFA interpolation generally the subsampled signals stem from different color bands. Aliasing errors become visible especially at edges where the interpolated signals of the different color bands are misaligned. Therefore, the preferred embodiments counter color fringing at edges by reducing the aliasing components only at edges through utilization of other ones of the subsampled signals. This reduces artifacts, improves sharpness, and avoids additional postprocessing.

In particular, for Bayer pattern CFA the green channel has a higher cutoff frequency than that of the red and blue channels; thus the green channel has less significant aliasing. The aliasing signal to be compensated is a high-pass signal, which is now estimated as the high-pass component of the green channel; and this is added (rather than subtracted due to the phase shift due to the offset of the red and blue subsampling grids relative to the green subsampling grid) to the red and blue channels. The high-pass green component could be multiplied by a scale factor prior to addition to the red and blue subsamplings. The signals are added while interpolating red, blue or afterwards.

CFA Interpolation with Inter-hue Adaptation

Alternative CFA interpolation preferred embodiments first interpolate Bayer pattern greens using a 5×5 FIR filter, and then use the interpolated green to interpolate red and blue each with two steps: first interpolate diagonally to form a pattern analogous to the original green pattern (this interpolation uses a normalization by the green to estimate high frequencies), and then apply a four-nearest neighbor interpolation (again using green normalization to estimate high frequencies) to complete the red or blue plane.

More explicitly, denote the CFA value for pixel location (y,x), where y is the row number and x the column number of the array, as follows: red values R(y,x) at pixel locations (y,x) where y and x are both even integers, blue values B(y,x) where y and x are both odd integers, and green values g(y,x) elsewhere, that is, where y+x is an odd integer.

First, let G^(y,x) denote the green value at pixel location (y,x) resulting from the green plane interpolation; this is defined for all pixel locations (y,x). This interpolation can be done by various methods, including the edge preservation interpolation of the following section. Note that many interpolations do not change the original green values; that is, G^(y,x)=G(y,x) may be true for (y,x) where G was originally defined (i.e., y+x is an odd integer).

Figure 28:
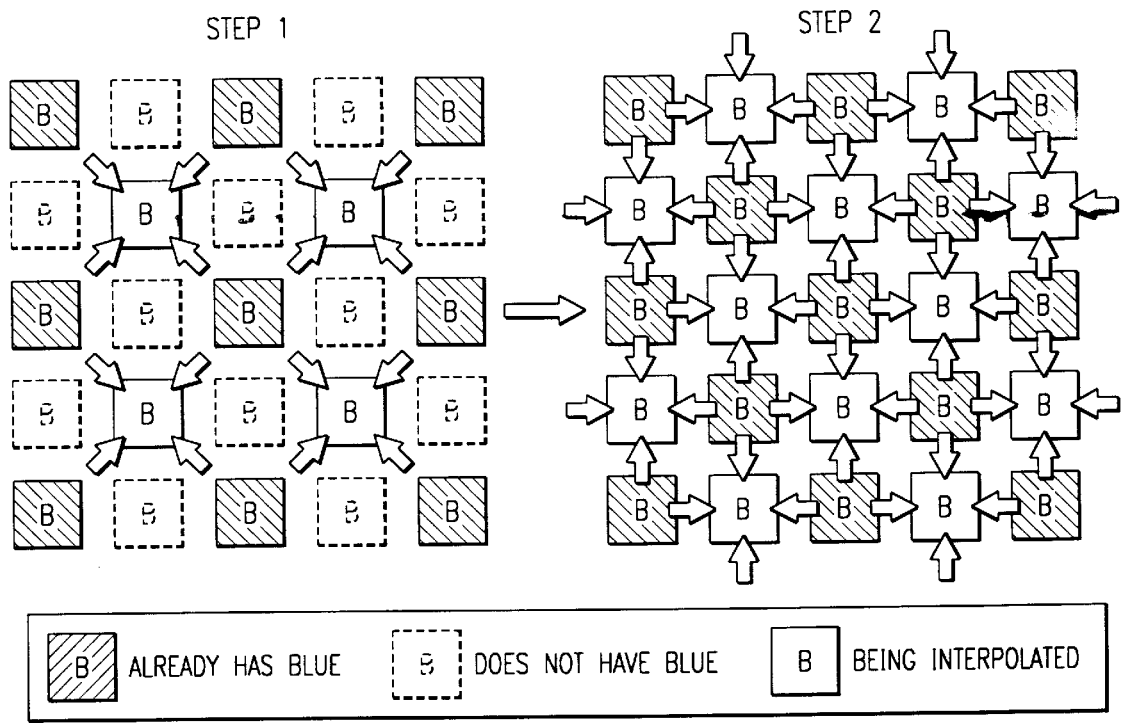

Next, define the red and blue interpolations each in two steps as illustrated in FIG. 28 which is labeled for blue and uses arrows to show interpolation contributions.

First red step: R(y,x) is already defined for pixel locations (y,x) with y=2 m, and x=2 n with m and n integers; so first for y=2 m+1 and x=2 n+1, define R^(y,x):

R^(y,x)=G^(y,x){R (y−1, x−1)/G^

(y−1, x−1)+R(y+1, x−1)/G $\hat{\ }(y+1, x-1)+R$ $(y+1, x-1)/G\hat{\ }$ $(y+1, x-1)+R$ $(y+1, x+1)/G\hat{\ }$ $(y+1, x+1)\}/4$ This interpolates the red plane to the pixels where B(y,x) was defined. (FIG. 28 illustrates the analogous interpolation for blue.) Note that the this interpolation essentially averages the red values at the four corners of the 3×3 square about (y,x) with the values normalized at each location by the corresponding green values. If any of the green values are below a threshold, then omit the normalization and just average the red values.

Perform the first blue step in parallel with the first red step because the same green values are being used.

First blue step: B(y,x) is already defined for pixel locations (y,x) with y=2 m+1, and x=2 n+1 with m and n integers, so first for y=2 m and x=2 n, define B^(y,x):

$B\hat{\ }(y,x)=G\hat{\ }(y,x)\{B(y-1, x-1)/G$ $\hat{\ }(y-1, x-1)+B(y-1, x+1)/G\hat{\ }$ $(y-1, x+1)+B$ $(y+1, x-1)/G\hat{\ }$ $(y+1, x-1)+B$ $(y+1,x+1)/G\hat{\ }$ $(y+1, x+1)\}/4$ This interpolates the blue plane to the pixels where R(y,x) was defined as illustrated in the lefthand portion of FIG. 28. Again, this interpolation essentially averages the blue values at the four corners of the 3×3 square about (y,x) with the values normalized at each location by the corresponding green values.

Second red step: define R^(y,x) where y+x is an odd integer (either y=2 m and x=2 n+1 or y=2 m+1 and x=2n)

$R\hat{\ }(y,x)=G\hat{\ }(y,x)[R\hat{\ }$ $(y-1, x)/G\hat{\ }(y-1, x)+$ $R\hat{\ }(y,x+1)/G\hat{\ }(y,x+1)+R$ $\hat{\ }(y+1, x)/G\hat{\ }$ $(y+1, x)+R\hat{\ }(y,x+1)/G\hat{\ }$ $(y,x+1)]/4$ This second step interpolates the red plane portion defined by the first step to the pixels where G(y,x) is defined. Again, this interpolation essentially averages the red values at four neighboring pixels of (y,x) with the values normalized at each location by the corresponding green values.

Second blue step: define for y+x an odd integer (either y=2 m and x=2 n+1 or y=2 m+1 and x=2 n)

$B\hat{\ }(y,x)=G\hat{\ }(y,x)\{B\hat{\ }$ $(y-1, x)/G\hat{\ }(y-1, x)+$ $B\hat{\ }(y,x+1)/G\hat{\ }(y,x+1)+B$ $\hat{\ }(y+1, x)/G\hat{\ }$ $(y+1, x)+B\hat{\ }(y,x+1)/G$ $\hat{\ }(y,x+1)\}/4$ This second step interpolates the blue plane portion defined by the first step to the pixels where G(y,x) is defined. Again, this interpolation essentially averages the blue values at four neighboring pixels of (y,x) with the values normalized at each location by the corresponding green values.

The final color image is defined by the three interpolated color planes: G^(y,x), R^(y,x), and B^(y,x) The particular interpolation used for G^(y,x) will be reflected in the normalizations for the two-step interpolations used for R^(y,x) and B^(y,x).

CFA Interpolation with Edge Preservation

Figure 29:
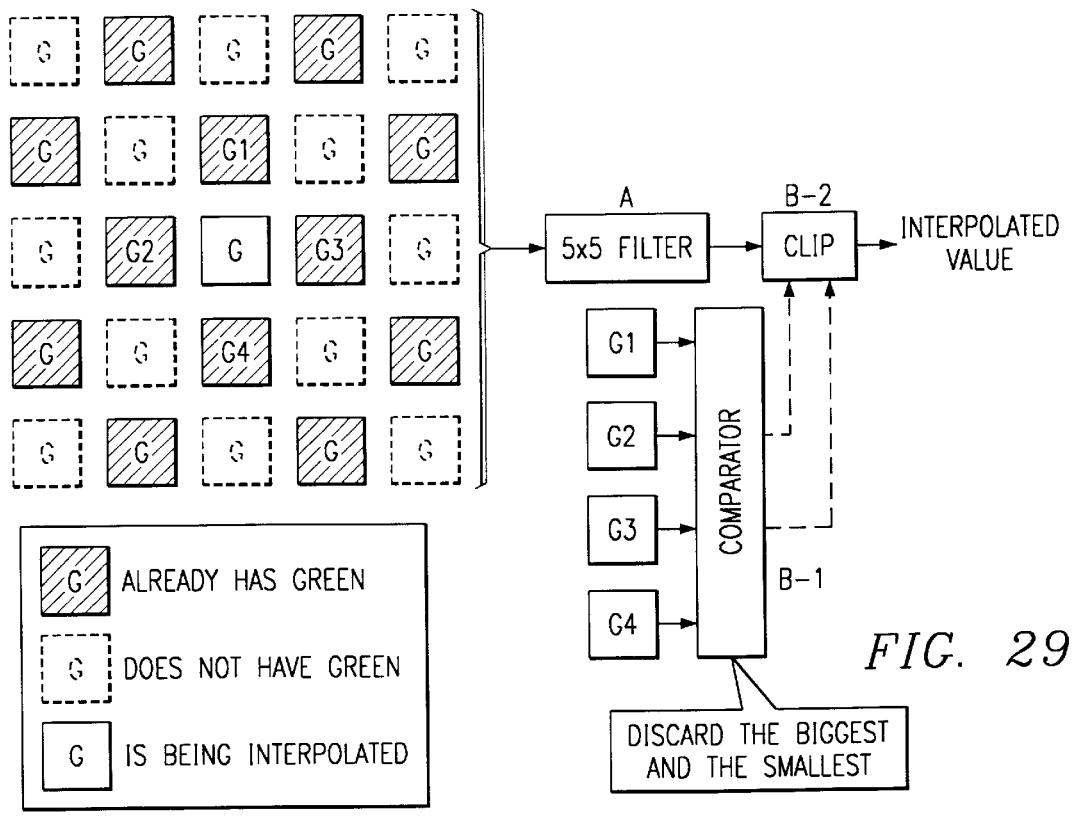

Alternative CFA interpolation preferred embodiments interpolate Bayer pattern greens by a (small) FIR filter plus preserve edges by a comparison of an interpolated pixel green value with the nearest-neighbor pixel green values and a replacement of the interpolated value with a neighbor value if the interpolated value is out of range. FIG. 29 illustrates the green interpolation. After this green interpolation, interpolate the red and blue planes.

In particular, first at each pixel (y,x) apply the following 5×5 FIR filter to G(y,x) defined on the pixels (y,x) where x+y is odd to yield G1(y,x) defined for all (y,x):

$$1/200 \begin{vmatrix} 0 & -11 & 0 & -11 & 0 \\ -11 & 0 & 72 & 0 & -11 \\ 0 & 72 & 200 & 72 & 0 \\ -11 & 0 & 72 & 0 & -11 \\ 0 & -11 & 0 & -11 & 0 \end{vmatrix}$$

The 200 center entry just implies for (y,x) where G(y,x) is defined in the CFA, G1(y,x)=G(y,x). Note that green values are in the range of 0–255, and negative values are truncated to 0. Of course, other FIR filters could be used, but this one is simple and effective.

Next, for the (y,x) where G1(y,x) is interpolated, consider the four nearest neighbors' values G(y±1,x), G(y,x±1) and discard the largest and smallest values. Let A and B be the remaining two nearest-neighbor values with B greater than or equal to A. Then define the final interpolated green value G^(y,x) as follows:

$$G\hat{\ }(y, x) = \begin{cases} A & \text{if } G1(y, x) < A \\ G1(y, x) & \text{if } A \leq G1(y, x) \leq B \\ B & \text{if } B < G1(y, x) \end{cases}$$

This clamps the interpolated value td midrange of the neighboring pixel values and prevents a single beyond-the-edge nearest-neighbor pixel from diluting the interpolated pixel value. FIG. 29 shows the overall green interpolation.

Complete the image by red and blue interpolations. The red and blue interpolations may each be a single step interpolation, or each be a two-step interpolation as described in the foregoing section which uses the edge-preserved green values, or each be some other type of interpolation.

CFA Interpolation Plus Noise Filtering

Figure 30:
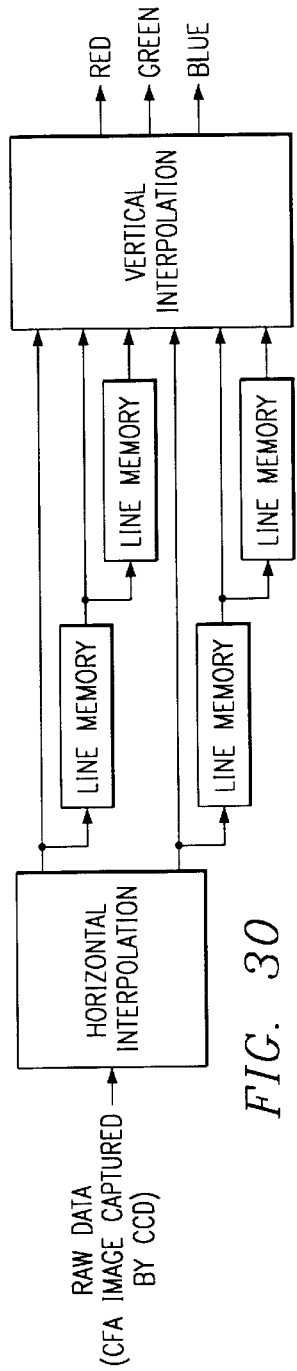
Figure 31:
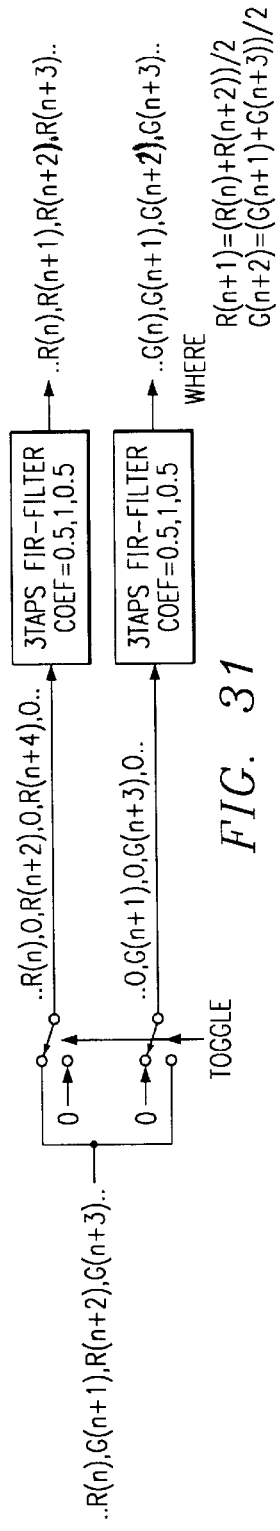

Preferred embodiments save on line memory required for CFA interpolation followed by lowpass filtering to limit noise with an integrated approach. In particular, CFA interpolation typically contains a horizontal interpolation block and a vertical interpolation block with line memories in between as illustrated in FIG. 30. The horizontal interpolation block has an input of a row of CFA signals, two toggle switches, two zero insertion subblocks, two three-tap FIR filters (coefficients 0.5, 1.0, 0.5), and two outputs: one output for each color. Each of the FIR filters just reproduces the input color values and puts the average of successive input color values in place of the inserted zeros. The zero-insertion and toggle timing of two subblocks alternate with each other. The block diagram of the horizontal interpolation block is shown in FIG. 31 with a row of raw data R/G/R/G/R . . . ; in this block row-interpolated Red and Green signals are output. In case the row of raw data input is B/G/B/G/B . . . interpolated Blue and Green signals are output.

Figure 32:
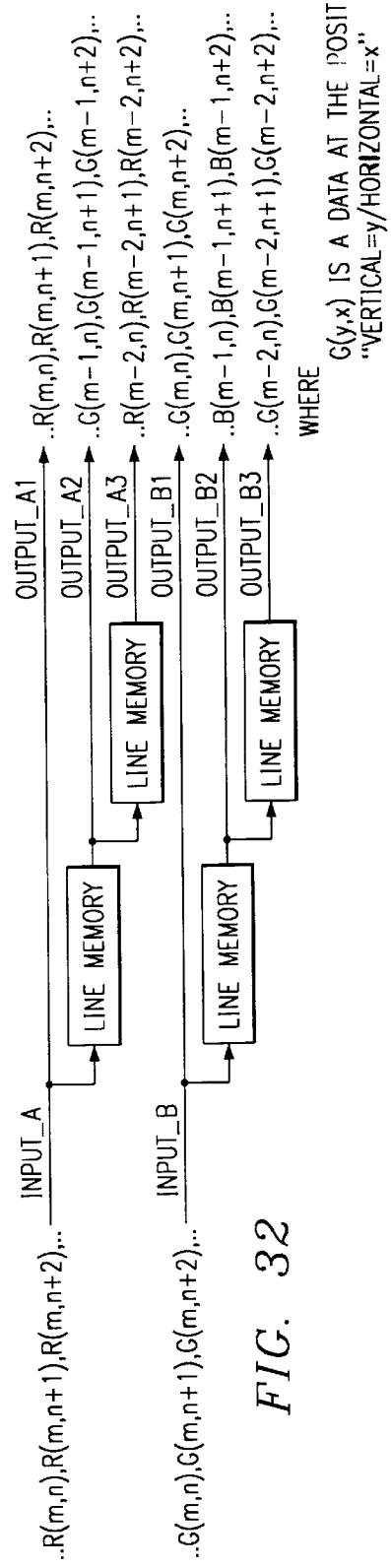

A line (row) memory delays the data by one CFA line (row) period in order to interpolate the data in the vertical interpolation block. FIG. 32 shows the four line memories and the input/output data of the memories. In the case of an input row of R/G/R/G/ . . . raw data with m indicating the (even) row number and n the column number which increments as the row data enters, the input and output data are:

Input_A=R(m,n)

Output_A1=Input_A=R(m,n)

Output_A2=G(m−1,n) which was the interpolated green from the previous row of raw data, a G/B/G/B . . . row Output_A3=R(m−2,n) which was the interpolated red from the second previous row of raw data, a R/G/R/G/ . . . row Input_B=G(m,n)

Output_B1=Input_B=G(m,n)

Output_B2=B(m−1,n) which was the interpolated blue from the previous row of raw data, a G/B/G/B/ . . . row Output_B3=G(m−2,n) which was the interpolated green from the second previous row of raw data, a R/G/R/G/ . . . row This provides the two rows of red, R(m,n) and R(m−2,n), for vertical interpolation to create the m−1row of red and also provides the green rows G(m,n), G(m−1,n), and G(m−2,n) which do not need vertical interpolation.

The next input row (row m+1) of G/B/G/B/ . . . raw data leads to the following input and output data:

Input_A=G(m+1,n)

Output_A1=Input_A=G(m+1,n)

Output_A2=R(m,n) which was the interpolated red from the previous row of raw data, a R/G/R/G/ . . . row Output_A3=G(m−1,n) which was the interpolated green from the second previous row of raw data, a G/B/G/B/ . . . row Input_B=B(m+1,n)

Output_B1=Input_B=B(m+1,n)

Output_B2=G(m,n) which was the interpolated green from the previous row of raw data, a R/G/R/G/ . . . row Output_B3=B(m−1,n) which was the interpolated blue from the second previous row of raw data, a G/B/G/B/ . . . row This provides the two rows of blue, B(m+1,n) and B(m−1,n), for vertical interpolation to define the m row blue and also provides the green rows G(m+1,n), G(m,n), and G(m−1,n) which do not need vertical interpolation.

Figure 33A:
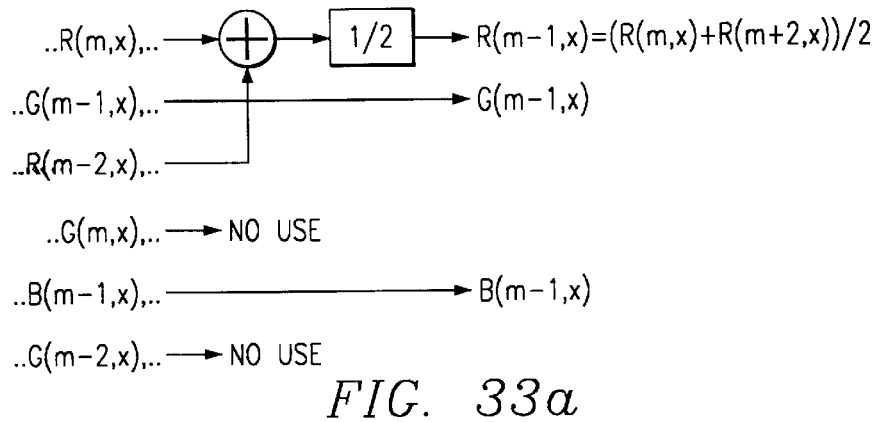
Figure 33B:
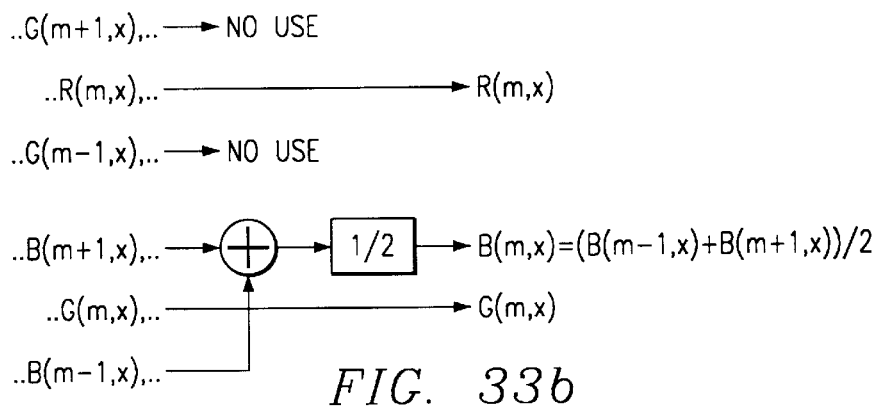

FIG. 33 shows the combinations for vertical interpolations. In particular, for row m output (row m+1input) the combinations are (FIG. 33b):

green is G(m,n)

red is R(m,n)

blue is (B(m−1,n)+B(m+1,n))/2

And for row m−1output (row m input) the combinations are (FIG. 33a):

green is G(m−1,n)

red is (R(m,n)+R(m−2,n))/2 blue is B(m−1,n)

As FIG. 33 illustrates, a vertical low-pass noise filter can be applied directly to the three green outputs (G(m−2,n), G(m−1,n), and G(m,n) for row m input and G(m−1,n), G(m,n), and G(m+1,n) for row m+1input), but red and blue cannot be vertically filtered because the four line memories of FIG. 32 do not output enough lines (rows). Rather, eight line memories are needed as illustrated in FIG. 34.

FIGS. 35a–35b illustrate the preferred embodiment combination vertical interpolation and low-pass noise filtering including green vertical noise reduction filter block A, green-noise block B, blue/red green-noise difference block C, and red/blue green-noise sum block D. The six inputs for the preferred embodiments of FIGS. 35a–35b are the outputs of the horizontal interpolations and four line memories of FIGS. 30–32 and thus the same as the inputs to the known vertical interpolation filter of FIG. 34.

Figure 34:
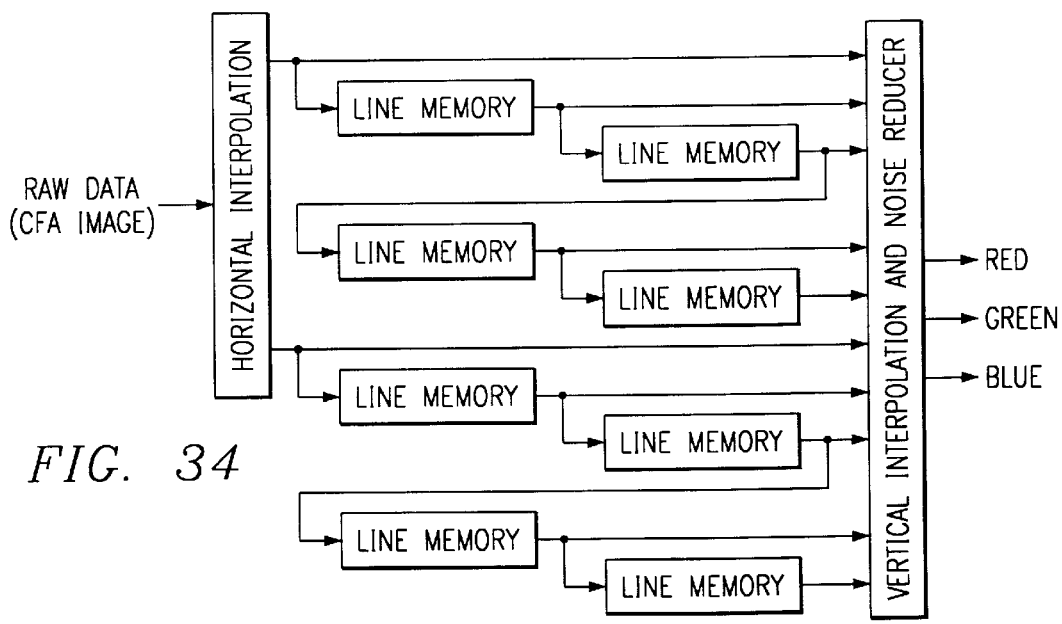
Figure 36A:
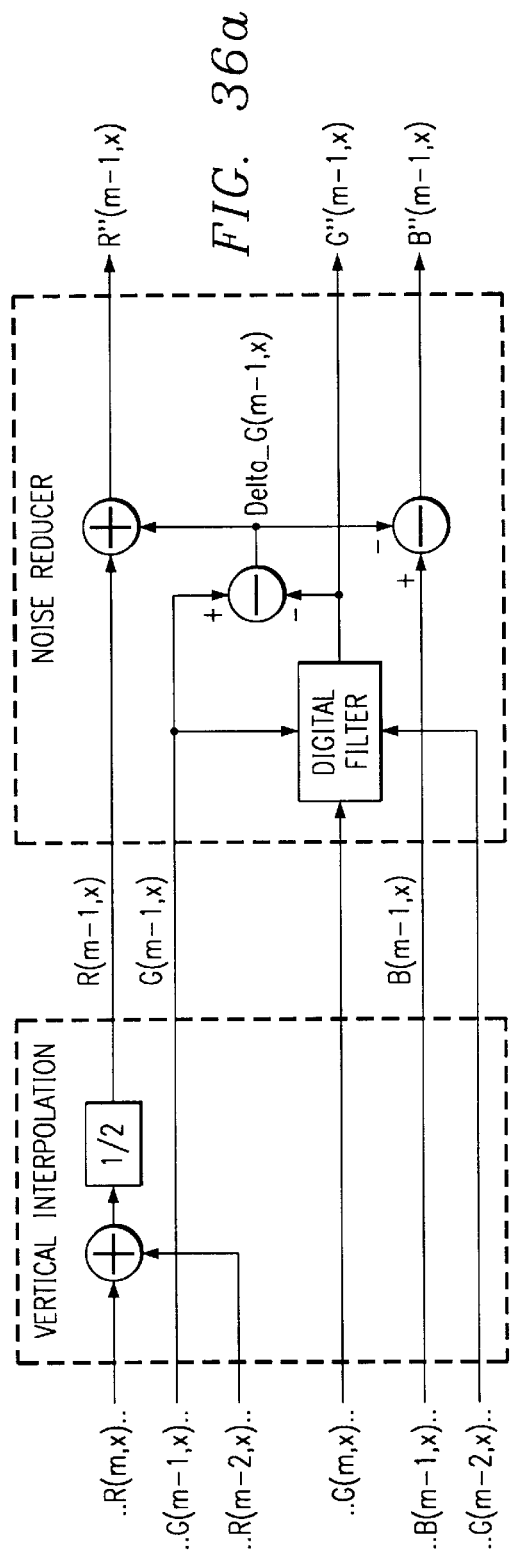
Figure 36B:
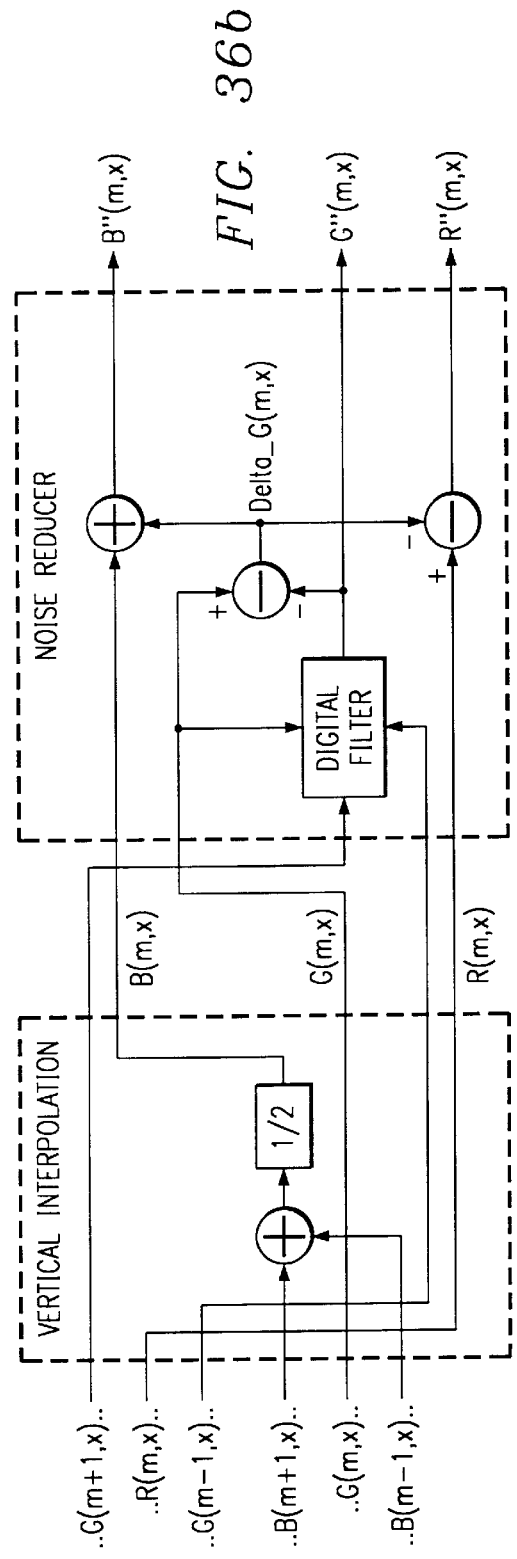
Figure 37A:
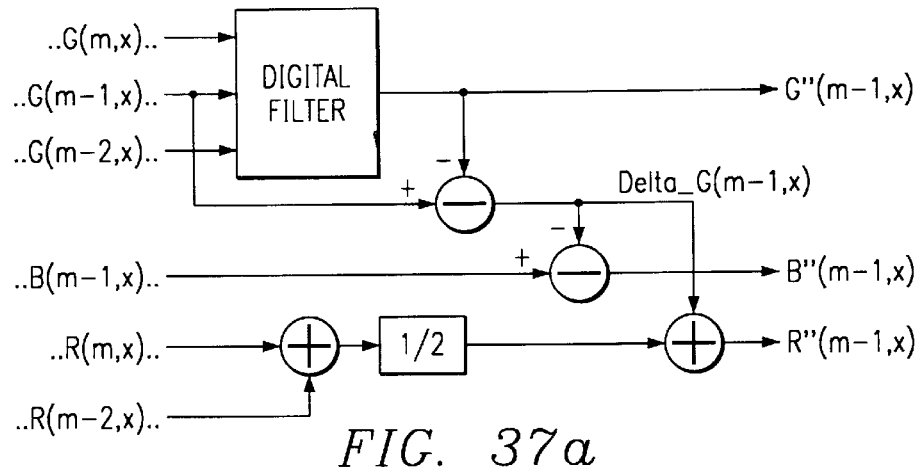
Figure 37B:
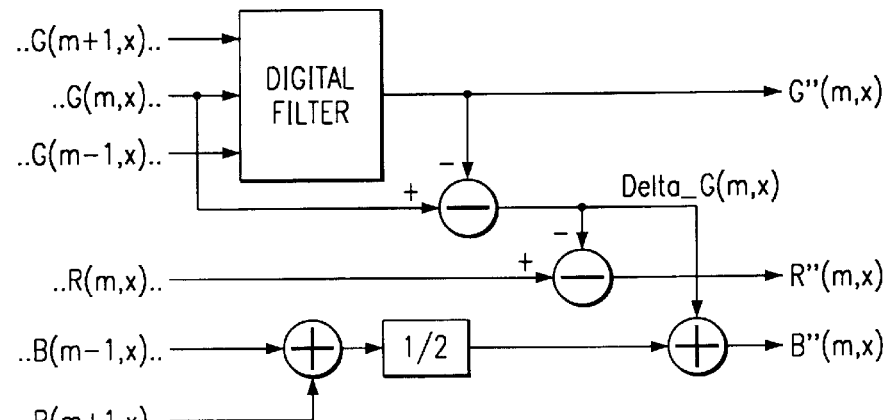

For an implementation of this interpolation plus noise filtering on a programmable processor the eight line memories in FIG. 34 would take up twice as much processor memory space as the four line memories of FIGS. 30–32, and this can be significant memory space. For a large CFA such as a 2 megapixel (1920 by 1080 pixels) CCD, a line memory would be 1–2 kbytes, so the difference would be 4–8 kbytes of processor memory.

In more detail, FIG. 35a illustrates the noise reduction and vertical interpolation for the case of input row m with m an even integer (raw CFA data R/G/R/G/ . . . ) into the horizontal interpolator plus four line memories of FIG. 32: the six (horizontally interpolated) inputs at the lefthand edge of FIG. 35a are R(m,n), G(m−1,n), R(m−2,n), G(m,n), B(m−1,n), and G(m−2,n) (i.e., the outputs in FIG. 32); and the output will be noise-reduced colors for row m−1: R"(m−1,n), G"(m−1,n), and B"(m−1,n). First, the vertical interpolation (lefthand portion of FIG. 35a) averages R(m,n) and R(m−2,n) to create R(m−1,n); G(m−1,n) and B(m−1,n) already exist as inputs.

Then the noise reduction filter (block A in the righthand portion of FIG. 35a) creates and outputs the vertically low-pass filtered green G"(m−1,n) as:

$$G"(m-1,n)=[G(m,n)+2*G(m-1,n)+G(m-2,n)]/4$$

Next, block B creates Delta_G as the difference between G and G"; that is, Delta_G is the vertical high-frequency part of G:

$$\text{Delta}\_G(m-1,n)=G(m-1,n)-G"(m-1,n)$$

Because G is sampled twice as frequently as B and R in the Bayer CFA, direct high-frequency estimation of G will likely be better than that of B and R, and thus the preferred embodiment uses Delta_G to subtract for noise reduction. Note that the difference between the vertical average [G(m+1,n)−G(m−1,n)]/2 and G"(m,n) equals—Delta_G(m,n), so for R and B which are to be vertically interpolated (averaged) plus low-pass filtered, the high-frequency estimate provided by G which is to be subtracted from R and B will have opposite sign.

Thus block C subtracts Delta_G from B to create B" for row m−1 because B is not vertically interpolated for m−1:

$$B"(m-1, n)=B(m-1, n)-\text{Delta}\_G(m-1, n)$$

Essentially, the vertical high-frequency part of G is used as an estimate for the vertical high-frequency part of B, and no direct vertical low-pass filtering of B is applied.

Then block D adds Delta_G to R to create R" for row m−1 because R was vertically interpolated:

$$R''(m-1, n) = R(m-1, n) + \text{Delta\_}G(m-1, n)$$

Again, the vertical high-frequency part of G is used in lieu of the high-frequency part of R, and because an vertical averaging creates R(m−1, n), the opposite sign of Delta_G is used to subtract the high-frequency estimate.

Thus the noise-reduced filtered three color output row m−1 are the foregoing G"(m−1, n), R"(m−1, n), and B"(m−1, n).

Similarly, for output row m from input row m+1 (again with m an even integer) and raw CFA data G/B/G/B/ . . . the six (horizontally interpolated) inputs are G(m+1, n), R(m,n), G(m−1, n), B(m+1, n), G(m,n), and B(m−1, n), and the output will be noise-reduced colors for row m: R"(m,n), G"(m,n), and B"(m,n). The vertical interpolation (lefthand portion of FIG. 35b) averages B(m+1, n) and B(m−1, n) to create B(m,n); G(m,n) and R(m,n) already exist as inputs. Then the noise reduction filter (righthand portion of FIG. 35b) block A again creates vertically low-pass filtered green G"(m,n) as:

$$G''(m,n) = \{G(m+1, n) + 2*G(m,n) + G(m-1, n)\}/4$$

Next, block B again creates the vertical high-frequency portion of G, called Delta_G, as the difference between G and G":

$$\text{Delta\_}G(m,n) = G(m,n) - G''(m,n)$$

Then block C again subtracts Delta_G but from R (rather than B as for row m−1 outputs) to create R":

$$R''(m,n) = R(m,n) - \text{Delta\_}G(m,n)$$

Thus the high-frequency part of G is again used as an estimate for the noisy part of R, and no direct noise filtering of R is applied, but for row m the Delta_G is subtracted rather than added as for row m−1. Indeed, for R even rows have Delta_G subtracted and odd rows have Delta_G added because the odd rows have R defined as a vertical average.

Lastly, block D adds Delta_G to B to create B":

$$B''(m,n) = B(m,n) + \text{Delta\_}G(m,n)$$

Thus as with R, the Delta_G vertical high-frequency estimate is row-by-row alternately added to and subtracted from B instead of a direct vertical low-pass filtering of B. Note that for a given row the Delta_G terms for R and B have opposite signs because one of R and B will be an average of preceding and succeeding rows.

In short, the preferred embodiments are able to emulate the CFA horizontal interpolation, vertical interpolation, and low-pass filtering with only four line memories by using a high-frequency estimate based on G.

FIGS. 36a–36b and 37a–37b illustrate an alternative embodiment in which the vertical low-pass filtering of G differs from the ¼, ½, ¼ weighting of the preferred embodiments of FIGS. 35a–35b.

CFA Interpolation for Complementary Color CCD

Preferred embodiment CFA interpolations for a complementary color pattern CFA (illustrated in FIG. 7b) combine a simple interpolation followed by an image quality enhancement by detection and adjustment for color imbalance. In particular, presume initial interpolation as defined at each pixel all four complementary color values, and denote the color values as Ye (yellow), Cy (cyan), Mg (magneta), and G (green).

First, at each pixel compute an imbalance factor $\mu$:

$$\mu = Ye + Cy - 2*G - Mg$$

This imbalance factor represents the difference between ideal and actual pixel color values. Indeed, the definitions of the complementary color values in terms of red value (R), green value (G), and blue value (B) are Ye=R+G, Cy=G+B, and Mg=B+G. Hence, the following relation always holds for a pixel's color values:

$$Ye + Cy = 2*G + Mg$$

Thus the imbalance factor $\mu$ ideally vanishes. When an edge is near a pixel, imbalance can arise due to the spatial difference of each of the four color samples in the CFA. The preferred embodiments detect the imbalance and adjust by modifying each color value:

$$Ye' = Ye - \mu/4$$

$$Cy' = Cy - \mu/4$$

$$Mg' = Mg + \mu/4$$

$$G' = G + \mu/8$$

Then these modified complementary colors are used to form the final image.

Figure 38:
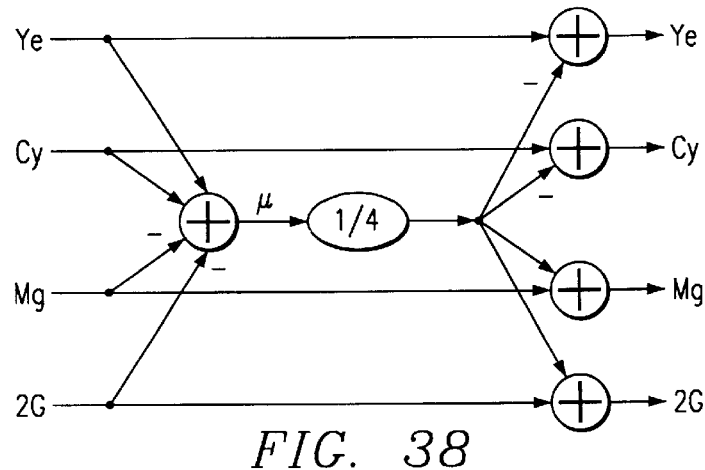

FIG. 38 illustrates the overall flow for the enhancement using the imbalance factor. Of course, scale factors other than −¼, −¼, ¼, and ⅛ could be applied to the imbalance factor provided that Ye'+Cy'=2*G'+Mg'.

White Balance

The term "white balancing" is typically used to describe algorithms, which correct the white point of the camera with respect to the light source under which the camera currently operates. Since the estimation of the true light spectrum is very difficult, the aim of most approaches is to correct the output of the red and blue channel (assuming CCDs based on the RGB color filters), such that for a gray object the pixel intensities for all color channels are almost identical. The most common technique basically calculates the average energy or simply the mean for each channel. The calculation of averages may be carried out in N local windows $W_j, j=1, 2, \ldots, N$, as for red:

$$R_j = \Sigma_{k \in W_j} r(k)$$

with r(k) denoting the digital signal for the red channel. Similar averages $B_j$ and $G_j$ are calculated for the blue and green color channels. The imbalance between the channels, given by the green-to-red and green-to-blue ratios $$WBR = \Sigma_j G_j / \Sigma_j R_j$$

$$WBB = \Sigma_j G_j / \Sigma_j B_j$$

are used as correction multiplier for the red and blue channels, respectively $$r'(k) = WBR \, r(k)$$

$$b'(k) = WBB \, b(k)$$

There exist many different flavors of this approach, which all calculate intensity-independent multiplication factors WBR and WBB.

This approach works only if several assumptions are valid. First, it is assumed that the sensor responses are well aligned over the input intensity range; in other words, the green response curve equals the red (blue) response curve multiplied by a factor. Looking at sensor (CCD) characteristics indicates that this assumption does not hold. For high light intensities, the sensor saturates; while at very low light intensities, the sensor response (especially for the blue channel) is very small. Furthermore, non-linearities of the sensor, as well as imbalances of the color channels related to the sensor response and the light source, are handled simultaneously. Resulting artifacts include magenta colors in very bright areas, where the "color" should turn white, or wrong colors in dark areas.

The pixel intensity at the sensor output, e.g. for the red color channel, can be modeled as $$r(k)=\int I(\lambda)\beta(k,\lambda)f_R(\lambda)\alpha(I,\lambda)d\lambda$$

where $\lambda$ denotes the wavelength, $I(\lambda)$ the spectrum of the light source, $\beta(x,\lambda)$ the reflectance of the object under observation, $f_R(\lambda)$ the spectral sensitivity of the red color filter covering the CCD pixels, and $\alpha(I,\lambda)$ the intensity- and wavelength-dependent efficiency of the CCD in converting photons into electrons.

Regarding only the spectral response curves of the color filters $f_R(\lambda)$ (and also $f_G(\lambda)$ and $f_B(\lambda)$) of a typical CCD sensor, the output signals differ:

$$WBR=\int f_G(\lambda)d\lambda/\int f_R(\lambda)d\lambda=1.09$$

$$WBB=\int f_G(\lambda)d\lambda/\int f_B(\lambda)d\lambda=1.34$$

Figure 39A:
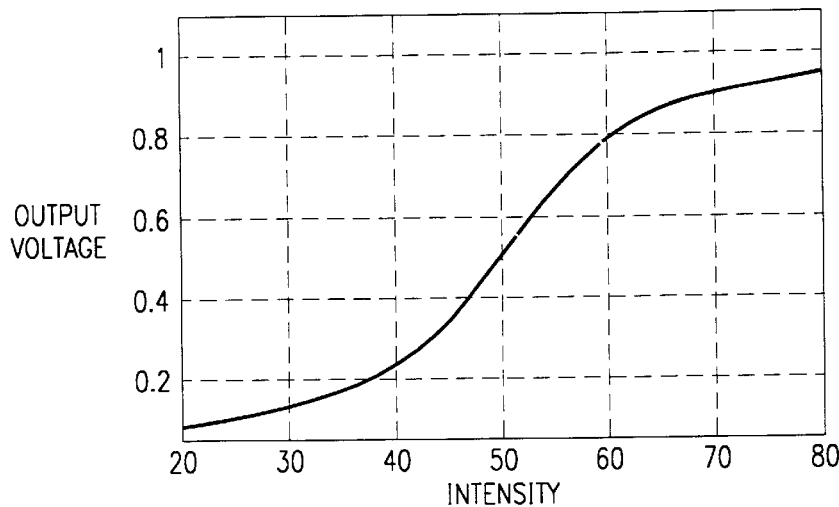
FIGS. 39a–39b and 40 show white balancing.
Figure 39B:
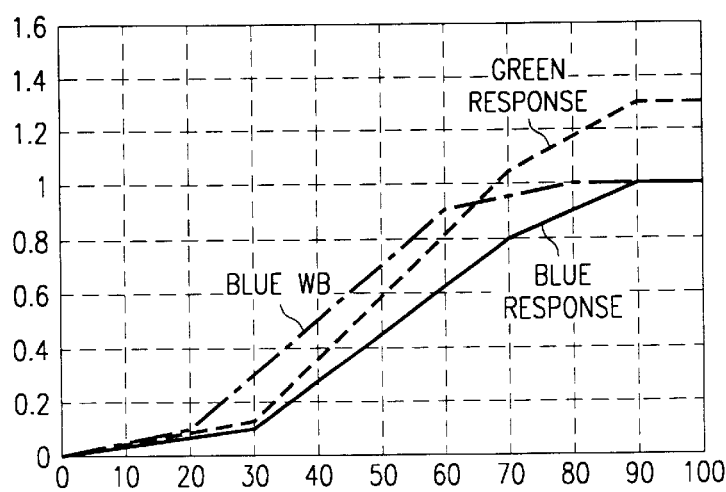

The values are obtained using the response of a typical CCD and assuming perfect white light source (the spectrum $I(\lambda)$ is flat), a perfectly white object (the spectrum of the reflected light is identical to the spectrum of the illuminating light which means $\beta(k,\lambda)=1$), and neglecting $\alpha(I,\lambda)$ (no wavelength dependent quantum efficiency). Especially the blue channel shows a smaller response than green or red at the same intensity. The non-linear quantum efficiency of the sensor is another effect. A typical s-shaped sensor response over the input intensity is shown in FIG. 39$a$. Furthermore, the sensor response in each channel depends on spectrum of the light source.

Thus, preferred embodiment white balancing takes into account the misalignment as well as the non-linearity. Typical light sources are not flat over the visible spectrum but tend to have a higher energy in certain spectral bands. This effect influences the observed sensor response; ideally it should be corrected by white point compensation, which may be based on a correction matrix. An independent balancing of the channels cannot handle this effect as previously outlined. For ease of mathematical description, approximate the s-shaped response curve in FIG. 39$a$ by piecewise linear segments. Three segments separate the light conditions into three categories: very low intensity, normal intensity, and very bright light. FIG. 39$b$ shows the effect of applying a single multiplier. With respect to the green signal, the amplification of the blue signal is too small in low light conditions, whereas in very bright conditions the multiplier is too large. Reducing the factor leaves an offset between the components, visible as wrong colors. Therefore, the correction terms for aligning all three response curves must look different and reflect the sensor characteristics.

The preferred embodiment white balancing splits into two separate schemes, one accounts for imager dependent adjustments, while the other one is related to light sources.

Without any restrictions on generality, the s-shape response curve is approximated in the following by three piecewise linear segments. More segments increase the accuracy but do not change the basic concept. For the first region (very low intensity) and the blue channel, the model reads with s the response and x the input intensity:

$$s_{B,1}=a_{B,1}x$$

Modeling the second region requires a multiplier and an offset $$s_{B,2}=a_{B,2}x+b_{B,2}$$

The offset term is determined by the constraint that the response curve needs to be contiguous at the transition point $x_1$ from region 1 to region 2:

$$s_{B,1}(x_1)=s_{B,2}(x_1)$$

$$\text{so } b_{B,2}=(a_{B,1}-a_{B,2})x_1$$

The parameters for the linear model of region 3

$$s_{B,3}=a_{B,3}x+b_{B,3}$$

are completely determined because the maximum output has to be identical to the maximum input $x_{max}$, and the the response curve needs to be contiguous at the joint point $x_2$:

$$x_{max}=a_{B,3}x_{max}+b_{B,3}$$

$$s_{B,2}(x_2)=s_{B,3}(x_2)$$

$$a_{B,3}=(s_{B,2}(x_2)-X_{max})/(X_2-X_{max})$$

$$b_{B,3}=(1-a_{B,3})x_{max}$$

Thus the parameters to specify the approximation of the response curve for each color component are $a_1$, $a_2$, $x_1$, and $x_2$. $x_{max}$ is not a free parameter, because it is specified by the bit resolution of the input signal.

The preferred embodiment white balancing now applies different multipliers for each region. For continuous transition from one region to the next, an additional offset is required. Although the number of regions is arbitrary, without loss of generality only three regions are considered in the following equations. The correction term for blue with respect to green for region 1 has to be:

$$WBB_1=a_{G,1}/a_{B,1}\approx G_1/B_1$$

where window 1 (for $G_1$ and $B_1$) has pixels with intensities in region 1. Thus, an input intensity value lying in region 1 gets the corrected output $$b'(k)=WBB_1 b(k)$$

Based on the balancing multiplier for region 2

$$WBB_2=a_{G,2}/a_{B,2}\approx G_2/B_2$$

the white balancing must consider an additional offset for values in region 2

$$b'(k)=WBB_2 b(k)+WBOB_2$$

with $$WBOB_2=(WBB_1-WBB_2)x_1$$

For the third region the calculation is basically the same, except that no explicit $WBB_3$ can be specified, but the amplification is determined by the maximum value $x_{max}$.

$$b'(k)=WBB_3 b(k)+WBOB_3$$

with $$WBB_3 = (x_{max} - (WBB_2 x_2 + WBOB_2))/(x_{max} - x_2)$$

$$WBOB_3 = (1 - a_{B,3}) x_{max}$$

For an implementation, the system must determine appropriate white balancing multipliers $WBB_i$ for N−1 regions. Based on these values, the remaining offset values WBOB and the multiplier for the last regions are calculated. The locations of the transition points are specified a priori. The white balancing itself selects the region based on the intensity value of the input pixel and applies the appropriate gain and offset to that value $$b'(k) = \begin{cases} WBB_1^* b(k) & b(k) \leq x_1 \\ WBB_2^* b(k) + WBOB_2 & x_1 < b(k) \leq x_2 \\ WBB_3^* b'(k) + WBOB_3 & x_2 < b(k) \end{cases}$$

Plus a similar multiplier for the red channel.

The total dynamic range of the CCD output signal is independent of aperture, and shutter, since they affect the number of photons captured in the CCD. An analog gain however, or any digital gain prior to processing shifts the signal and should be avoided. In case a gain (digital) α needs to be applied, this gain can be included into the white balancing method. A gain maps the maximum input value $x_{max}$ to the output value $\alpha^* x_{max}$.

The scaled response curves behave identical to the non-scaled one, meaning that the scaled signal saturates at $\alpha^* x_{max}$. Substituting $$WBB_1 := \alpha^* WBB_1$$

$$WBB_2 := \alpha^* WBB_2$$

In that way the equation in the previous section remain unchanged, except $$WBOB_3 = (\alpha - a_{B,3}) x_{max}$$

After linearization the signal can undergo an adjustment reflecting the light source. This is also known as white point adjustment. Here the input signal is transformed such that it looks like as if it has been captured under a different light source. For example, an image has been captured in bright sunlight (D65), but the color characteristics should be as if it has been captured under indoor conditions ($D_{50}$ tungsten).

$$[R,G,B]D_{65}^T = I_{D65}^T * \beta * [f_R, f_G, f_B]^T$$

$$[R,G,B]D_{50}^T = I_{D50}^T * \beta * [f_R, f_G, f_B]^T$$

Here, $I_{Dxx}$ denotes a vector sampling the light spectrum, β is a diagonal matrix describing the reflectance of the objects, and $f_R$, $f_G$, and $f_B$ denote the spectral response of the CCD light filters. Based on these equations a 3×3 transformation matrix can be calculated relating the signal under D65 to D50:

$$[R,G,B]D_{50}^T = I_{D50}^T * I_{D65}^{-T} * [R,G,B]D_{65}^T$$

The 3×3 transformation matrix $$M_D = I_{D50}^T * I_{D65}^{-T}$$

can be calculated offline.

In real systems it is almost impossible to determine averages for the different response regions. Therefore a simple solution is to calculate overall values as in the foregoing ratio of integrals, and modify them with fixed values based on predetermined sensor measurements $$WBB_1 = \alpha_1 * WBB$$

$$WBB_2 = \alpha_2 * WBB$$

And similarly for WBR.

Figure 40:
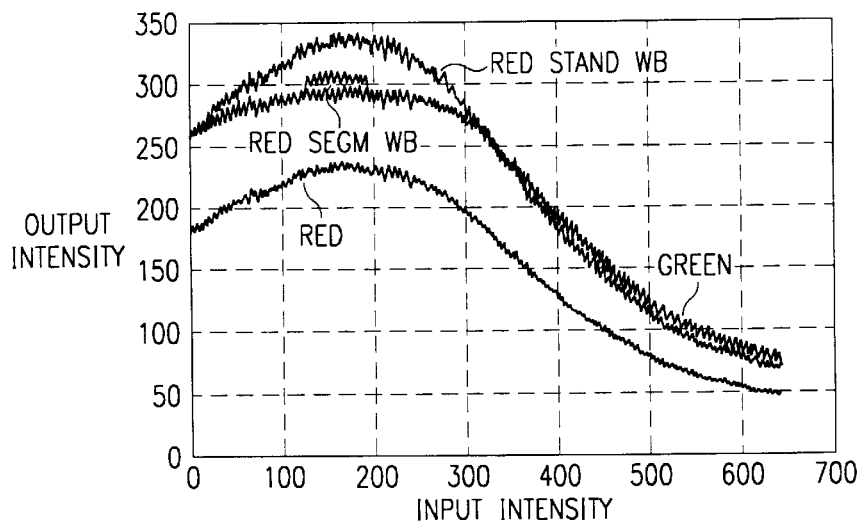

The transition points can be fixed in advance, too. There is just one exception for the transition point $x_2$. In rare situations the WBR-value may be so large that it exceeds the maximum output value at the transition point $x_2$. In that situation, either the WBR needs to be decreased or the transition point is reduced. The diagram in FIG. 40 shows an example of the effectiveness of this technique. The red components is adjusted with respect to the green component. Using a single multiplier exceeds the green signal in bright areas, and is less effective in low light areas, whereas the segmented white balancing matches the green curve for all intensities.

Resizing Preferred Embodiments

Frequently images captured in one size (e.g., 320×240 pixels) have to be converted to another size (e.g., about 288×216) to match various storage or input/output formats. In general this requires a fractional up-sampling or down-sampling by a rational factor, N/M; for example, a resizing from 320×240 to 288×216 would be a 9/10 resizing. Theoretically, resizing amounts to cascaded interpolation by N, anti-aliasing filter, and decimation by M. In practice the resizing may be achieved with an M-phase, K-tap filtering plus selection of N outputs per M inputs.

For example, preliminarily consider a resizing by a ratio of 63/64 using a 3-tap filter as illustrated in FIG. 41*a* in which the top horizontal line represents pixel inputs and the horizontal length-three braces represent the 3-tap filter kernel applied to the indicated three inputs and producing the indicated outputs. Indeed, presume the filter kernel is a continuous function f(t) with support of length 3−1/63 so that at most three inputs can be involved; see FIG. 41*b*. Note the slight shifting to the right of successive braces in FIG. 41*a*: this represents the resizing from 64 inputs down to 63 outputs because the center of the filter kernel (and thus the non-rounded-off output position) must increment 1+1/63 (=64/63) pixel positions for each output in order for the 63 outputs to match the 64 inputs. Output[0] (represented by the farthest left brace in FIG. 41*a*) is centered at the position of input, and the non-rounded-off output position j, denoted outp_pos[j], thus equals 1+j*64/63.

The filter kernel is represented as a symmetrical continuous function f(t) centered at time 0. Output[0] for example, needs three kernel values: f(−1), f(0), and f(1). Each output point is computed as the inner product of three kernel coefficient values with three input pixel values. The center input point for the output[j] is positioned at round(outp_pos[j]) where round( ) is the round off function. The other two input points are offset from this center point by ±1. The center filter kernel coefficient value is f(round(outp_pos[j])−outp_pos[j]) and the other are f( ) at the ±1 offsets of this center value point. Thus the following table shows the output position, coefficient kernel values, and input points needed for each output:

| output j | outp_pos | center coeff position | input points |
|---|---|---|---|
| 0 | 1 | 0 | 0,1,2 |
| 1 | 2 1/63 | −1/63 | 1,2,3 |
| 2 | 3 2/63 | −2/63 | 2,3,4 |
| ... | ... | ... | ... |
| 31 | 32 31/63 | −31/63 | 31,32,33 |
| 32 | 33 32/63 | 31/63 | 33,34,35 |
| 33 | 34 33/63 | 30/63 | 34,35,36 |
| ... | ... | ... | ... |
| 61 | 62 61/63 | 2/63 | 62,63,64 |
| 62 | 63 62/63 | 1/63 | 63,64,65 |
| 63 | 65 | 0 | 64,65,66 |
| ... | ... | ... | ... |

The table shows the desired coefficient position as well as the inputs involved in each output. Note the j=63 case is similar to the j=0 case in that the kernel center aligns with the input, but with the output position and input indices shifted by 64. Notice that at j=32 there is a change in the input pattern: for j≦31, output[j] uses input j, j+1, and j+2; whereas for j≧32, output[j] uses inputs j+1, j+2, and j+3.

The preferred embodiments partition the filtering computations for resizing a two-dimensional array (image) between iMX 124 and DSP 122 and limit memory use as follows. First iMX 124 performs the 3-tap row filtering with 64 banks of coefficients and then 3-tap column filtering with 64 banks of coefficients. First consider the row filtering. 3-tap row filtering on iMX 124 has the input/output relationship:

| IMX output j | input points |
|---|---|
| 0 | 0,1,2 |
| 1 | 1,2,3 |
| 2 | 2,3,4 |
| ... | ... |
| 31 | 31,32,33 |
| 32 | 32,33,34 |
| 33 | 33,34,35 |
| ... | ... |
| 61 | 61,62,63 |
| 62 | 62,63,64 |
| 63 | 63,64,65 |
| 64 | 64,65,66 |
| ... | ... |

Comparing this table with the prior 63/64 resizing table shows that the only difference is the iMX produces one extra point, namely, IPP_output[32]. Thus the preferred embodiments produce the 64 output points with iMX 124, and then use DSP 122 to pick the 63 valid points:

$$\text{output}[j] = \text{IPP\_output}[j] \quad \text{for } j = 1, 2, \ldots 31$$

$$\text{IPP\_output}[j + 1] \quad \text{for } j = 32, 33, \ldots, 62$$

In general, N/M is less than 1 involves deleting M−N outputs of every M outputs. Thus the preferred embodiments generally perform the filter operations of the M input points in an accelerator such as the iMX and then use a processor such as the DSP to discard the unneeded outputs. (iMX can also handle larger-than-unity resizing up to N/M 3.)

iMX con produce 8 outputs of 3-tap row filter in 3 cycles. Basically, 8 adjacent outputs are computed in parallel using the 8 MAC units. At time 0, pull out input points 0,1,2,3, . . . 7, with appropriate coefficients (each can be different), and accumulate into 8 accumulators. At time 1 pull out input points 1,2, . . . 8, do the same, and at time 2, pull out input points 2,3, . . . 9, accumulate the products, and write out 8 outputs, j=0,1 , . . . 7. Next, shift over 8 input points to compute j=8,9, . . . 15.

For the vertical direction, iMX computes 8 outputs in parallel as well. These are 8 horizontally adjacent output points, and every fetch of input array also bundles 8 horizontally adjacent points. Therefore, all 8 MAC units share the same coefficient values for each cycle. For vertical direction there is less data reuse in iMX, so input/output memory conflicts slow down the computation to 4 cycles/8 outputs. Total filtering time is 7 cycles/8 outputs, or ⅞ cycle per output. Input data is of size 320×240×3. Thus, the filtering of iMX takes 320×240×3.7/8 201,600 cycles, or 1.7 msec with iMX running at 120 MHz.

After filtering, DSP picks correct outputs. Basically, one row out of every 64 rows and one column out of every 64 columns should be discarded. A DSP assembly loop moves the valid iMX output points to a separate output area. iMX and DSP may run in parallel if there is sufficient local memory for both. An entire input image likely is too large to fit into local memory; even the natural choice, 63×63 output points, may be too large. In such a case partition the image, such as 63 wide×16 tall, and deal with extra bookkeeping in the vertical direction. With just 3×64=192 coefficients, it would be economical to pre-compute and store them. DSP should keep track of the phase of each processing block, and point iMX to the correct starting address of coefficients. If the colors are interleaved, this allows interleaved filtering as well. iMX deals with strides in getting input points. The following table shows interleaved 3-tap filtering.

| j | input points |
|---|---|
| 0 | 0,3,6 |
| 1 | 1,4,7 |
| 2 | 2,5,8 |
| ... | ... |

However, interleaving consumes three times more memory for the same output block size for each color. Thus it si possible to partition the task into smaller size, such as 63×5 on each color plane, and eal with extra overhead in the vertical direction. If the color format is not 4;4:4 (say, 4:2:2), and input is color-interleaved, the DSP will need to spend some additional time separating color planes.

Performing resizing totally in DSP 122 is time-consuming if implemented with straightforward fractional addressing. The preferred embodiments streamline the computation by requiring filter coefficients to be reordered and padded with dummy words. iMX 124 performs the main processing concurrently with DSP 122 computing the coefficients. This efficiently realizes high throughput resizing.

In more detail, the preferred embodiments perform an N/M resizing of an image by using iMX 124 to perform M-phase, K-tap filtering (which produces redundant output points) and DSP 122 to select the correct output points. Further, DSP 122 computes needed coefficients from a fewer-subsample coefficient template to reduce memory usage to 8*K; otherwise memory usage up to 2*M*K coefficient words would be needed. DSP 122 can compute the rounded position for the coefficients, and build up the coefficient memory for iMX 124.

For processing wide and short blocks of pixels (i.e., 16×64) the horizontal direction requires more computation in that horizontal coefficients are updated more often than vertical coefficients. However, the coefficients constructed by DSP 122 can be reused many times within the short block, so the load on DSP 122 should not be excessive.

Figure 42C:
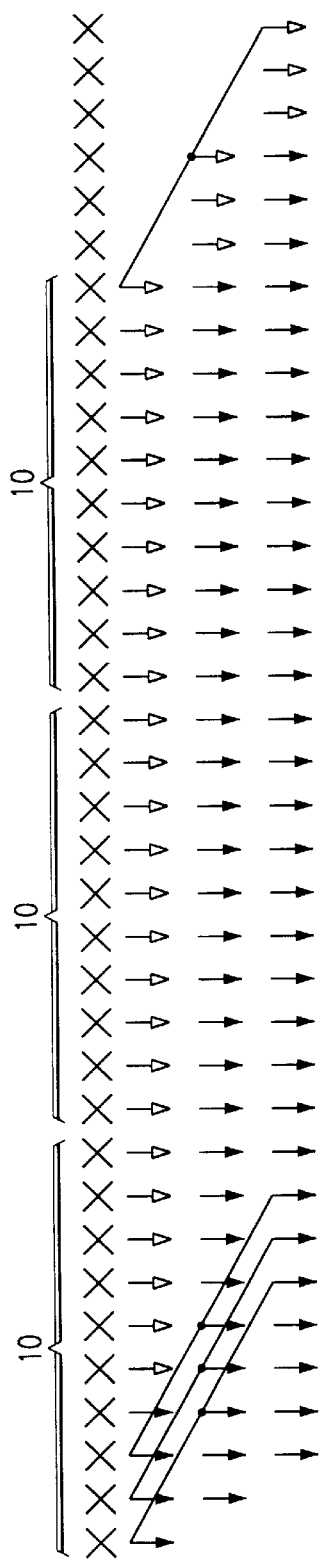
Figure 42D:
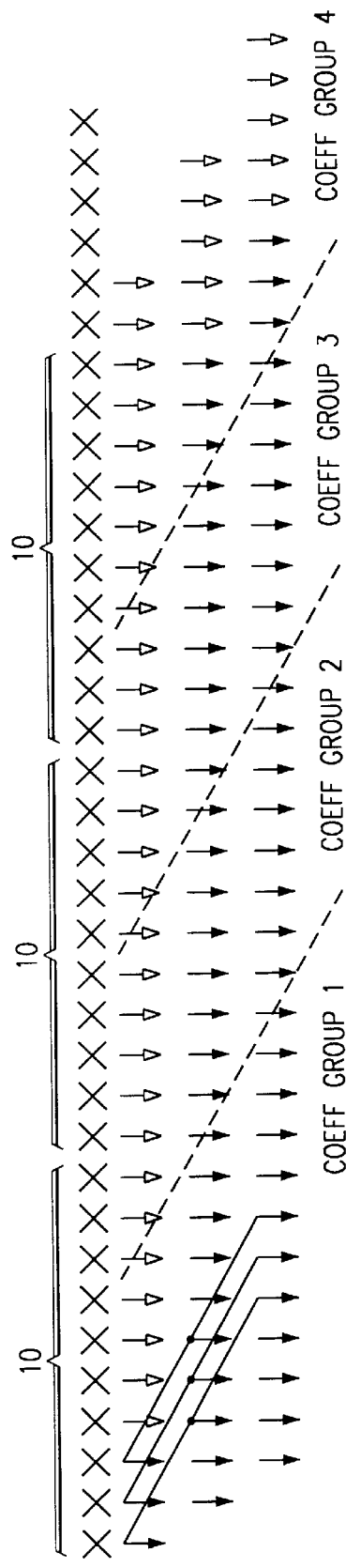

In particular, preferred embodiments proceed with the following steps which are illustrated in FIGS. 42a–42e for a 3-tap filter and a 10-to-9 resizing (e.g., resizing from 320×240 to 288×216 in 30 frames/sec)(presume 4:4:4 interleaved, for 4:2:2 or 4:1;1 do subsampling after resizing):

1. select input/output pattern: every 10 inputs leads to 9 outputs as per FIG. 42a.
2. draw coefficient pattern for a processing unit, one color first. Arrows in FIG. 42b indicate which input points are used: connected arrows form the same output point, and gray (open head) arrows indicate zero coefficients. Thus three input points determine the first output point, only two input points determine each of the next eight output points, and then a tenth ignored output (no non-zero input points); and this repeats every ten. This pattern suggests use of a polyphase 3-tap filter, and drop the last output in every group of 10 outputs.
3. consider interleaved input/output. See FIG. 42c which shows a set of three groups of ten input points interleaved so that the three input points determining the first output point from the original first group of ten input points are now at locations 1, 4, and 7; the three input points determining the first output point from the original second group of ten input points are now at locations 2, 5, and 8; and the three input points determining the first output point from the original third group of ten input points are now at locations 3, 6, and 9; and so forth. This interleave implies that sets of three adjacent output points use all different input points and do not require simultaneous memory accesses.
4. Consider 8-way parallelism and iMX, add more dummy outputs if necessary. See FIG. 42d which shows the output points partitioned into four groups of 8 for parallel computations.
5. Compute coefficients and order as grouped. iMX will process one group at a time, using coefficient order from left-to-right, then up-to-down, then next group. Coefficients need to be arranged to the same order. If the iMX coefficient memory and the flash memory can accommodate all these coefficients, these coefficients can be included in the DSP code as constant data, and this step is done once in the software development. If the iMX coefficient memory can hold these coefficients all the time, but these take up too much room in the flash memory, this step can be performed once during system initialization. Likely the SDRAM can hold all these coefficients, but iMX coefficient memory cannot hold them all the time. this step should be performed once in the system initialization, an the coefficient image should be stored in SDRAM. When needed, these coefficients are swapped in from the SDRAM. If it is not desirable to store all these coefficients at any time, especially when M is very large (100+), compute needed "window" of coefficients with DSP concurrently with iMX processing. Just make sure the iMX coefficient memory can hold the necessary coefficients for a computation block.
6. Start computation on iMX. In this case, it takes about 12 cycles in the inner loop to produce the 27 valid output points. Each iMX command can produce a 2-D output block, so producing 16×27 output points will take about 10+16*12=202 cycles.
7. When iMX is done, have DSP pick the correct output points. In this example, 276 points are picked out of every group of 32 output points. This task will be easier to code if the width of output matches or is a multiple of 3*M. DSP only has to touch each valid outaput once, so the loading of the DSP should not be significant.

In vertical resizing, iMX works in SIMD mode. Every group of 8 adjacent data input are processed in parallel. Coefficient are used one value per cycle, and this value should apply to all color components. Even if resizing factors are the same for horizontal and vertical, how iMX uses coefficients is different, so there needs to be a separate vertical resizing coefficient storage (which takes ⅓ of horizontal coefficients). See FIG. 42e. Again, there is the option to keep all vertical coefficients in iMX, swap in and out, or have DSP compute on the fly. DSP may need to pick valid output rows after iMX completes processing.

Tone-scaling Preferred Embodiments

Tone-scaling operates on the dynamic range of the luminance signal (or the color signals) of an image to make details more clear. For example, a picture taken against the light or in a very bright environment typically has high brightness levels. Tone-scaling commonly relies on luminance (or color) histogram equalization as illustrated in block form by FIG. 43. Indeed, converter block 430 converts the input luminance levels (in the range 0 to 255 for 8-bit or 0 to 4095 for 12-bit) to output luminance levels in the same range using a look-up table. The look-up table consists of the pairs that are the input level and the corresponding output level with the output levels calculated in histogram equalization block 432 as follows. First, find the cumulative distribution function of the input luminance levels of the image to which the tone-scaling will apply; that is, find F(r) such that F(r)=(the number of pixels with level$\leq$r)/(total number of pixels in the image). Next, create the look-up table function T(r) through multiplication of F(r) by the maximum pixel level and round-off to the nearest integer. Then the look-up table is just the pairs of levels (r,s) where s=T(r). FIG. 45 illustrates T(r) for an under-developed image (the majority of pixels have a low level as reflected by the large slope of T(r) for small r) in which fine details in dark parts are difficult to perceive. Also as FIG. 45 shows for this under-developed image, the tone-scaling converts the level r=500 to s=2000; and thus in the tone-scaled image the differences of the luminance levels will be emphasized for the low levels and de-emphasized for the high levels. Thus the tone-scaling enhances detail in dark portions.

However, the tone-scaled image may look unnatural in that the colors are too clear, as if the tone-scaled image were painted in oil paints. Thus this tone-scaling is sometimes too strong for consumer use because of the unnatural character even if the fine details are clearer; although other applications such as medical and night vision demand the fine detail despite unnaturalness.

The preferred embodiments provide tone-scaling by using a linear combination of the histogram equalization function T(r) and the original image level r. That is, for a parameter $\alpha$ with $0 \leq \alpha \leq 1$ define a tone-scaling function by $$s=\text{Round}(\alpha T(r)+(1-\alpha)r)$$

where T(r) is as previously described except that the round off to the nearest integer is not needed in the definition of T(r) because of the subsequent multiplication by $\alpha$ plus addition of $(1-\alpha)r$ and round off. FIG. 45 illustrates the preferred embodiment for $\alpha$=0.3 between the curve s=T(r) and the identity line s=r.

FIG. 44 shows preferred embodiment tone-scaling in functional block form: again define a histogram equalization function T( ) for the luminance (or color) levels in block 442, and then define the rounded-off linear combination with weight α of T( ) and the identity in block 444 to yield the final look-up table for the tone-scaling in converter 440. When the weight α equals 0, then there is no tone-scaling and a natural look, but when the weight α equals 1, the tone-scaling is with T( ) and fine details are enhanced. The value of weight α can be selected according to the application. All of the computations are programmable.

Implementation Details

Preferred embodiment hardware structures supporting the foregoing functions include the following.

SDRAM Controller

SDRAM controller block 110 acts as the main interface between SDRAM 160 and all the function blocks such as processors (ARM 130, DSP 122), CCD controller 102, TV encoder 106, preview engine 104, etc. It supports up to 80 MHz SDRAM timing. It also provides low overhead for continuous data accesses. It also has the ability to prioritize the access units to support the real-time data stream of CCD data in and TV display data out. It also provides power down control for external SDRAM. DSP 122 can inhibit CKE signal of SDRAM 160 during no data access.

Figure 12A:
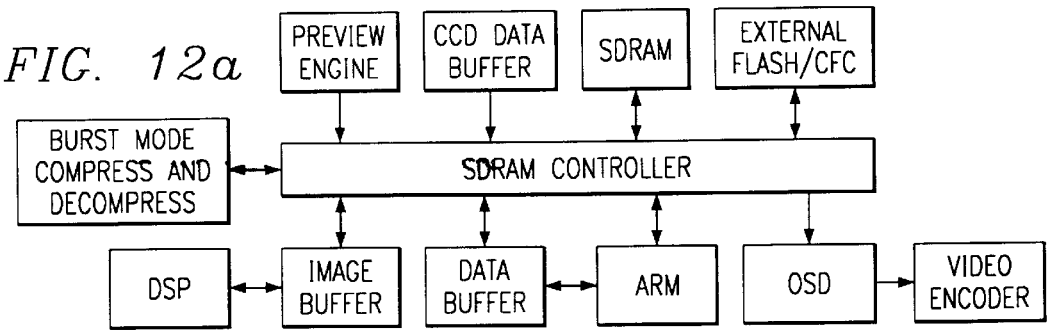
FIGS. 12a–12b show a memory controller data flow.
Figure 12B:
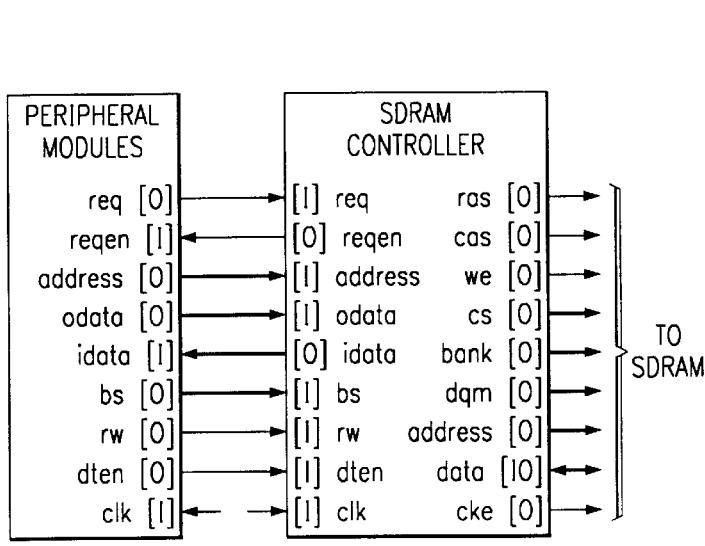

SDRAM controller block 110 supports 16/64/128/256 MB SDRAMs, 32-bit width or 2×16-bit width SDRAMs, maximum 80 MHz (e.g., 10–80 MHz) operation, availability of word, half-word, or byte access (ARM), commands: mode setting, power down and self refresh, programmable refresh interval, 2 or 3 CAS latency can be selectable, 2 Chip Select Output (maximum SDRAM size is 1 G bit), authorizes and manages DMA transfers, manages the data flow between processors SDRAM, CCD data buffer to SDRAM, preview engine to SDRAM, burst compression to/from SDRAM, video encoder from SDRAM, OSD from SDRAM, ARM to/from SDRAM, DSP image buffer to/from SDRAM. FIG. 12a shows the data flow managed by the SDRAM controller. The signals and priorities are:

| Signal Name | Signal Description |
|---|---|
| Clk | SDRAM clock (10–80 MHz) |
| Req | Data read/write request signal |
| req_en | Request enable (acknowledge) signal from SDRAM Controller When the peripheral modules require a data IN/OUT, the req signal shall be asserted and when the req_en signal is asserted, the req signal shall be negated |
| Address | Start address of read or write CCDC, PREVIEW, BURSTC, ENC, OSD, DSP: 22-bit width ARM: 25-bit width |
| Odata | output data to SDRAM (32-bit) |
| Idata | Input data from SDRAM (32-bit) |
| Rw | Read or Write signal 0: Write / 1:Read |
| Dten | Data write enable signal for DSP IF |
| Ds | Bus Select (4-bit) for ARM IF |

The Priority list of access units is as follows,

| Priority | Access Unit |
|---|---|
| 1(highest) | ENC out |
| 2 | CCD in |
| 3 | OSD out |
| 4 | PRVW in |
| 5 | BURST in |

-continued

| Priority | Access Unit |
|---|---|
| 6 | DSP I/O |
| 7 | ARM I/O |

Preview Engine

Figure 14:
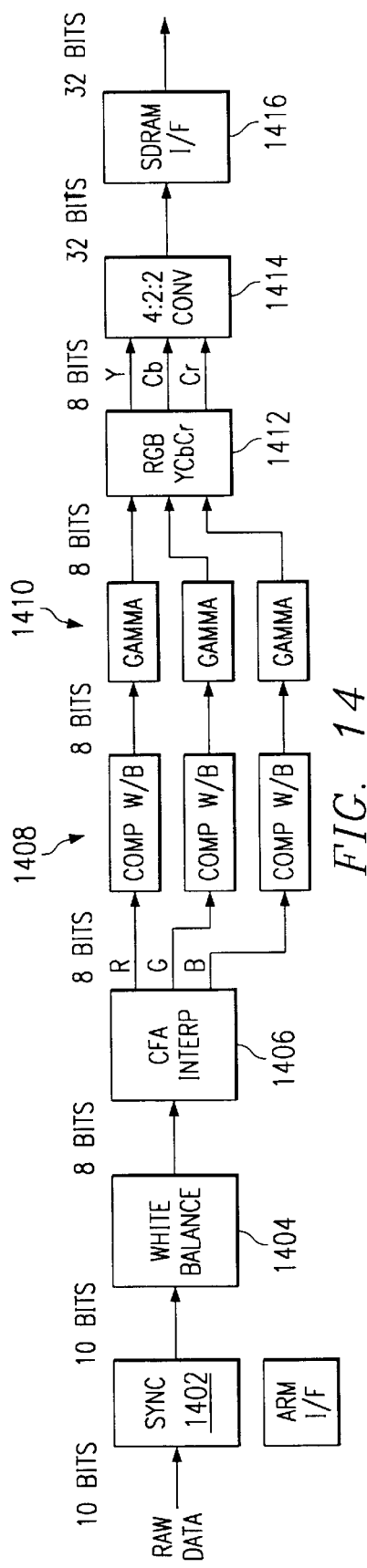
FIG. 14 is a functional block diagram of a preview engine.

FIG. 14 is a block diagram of preferred embodiment preview engine 104 which provides image data with YCbCr in 4:2:2 format from CCD raw data from CCD-controller 102 and has the following main functions.
_ Available for both RGB CCDs and complementary (YeCyMgG) CCDs (FIGS. 7a–7b show these CCD patterns)
_ Digital gain adjustment
_ White balance
_ Vertical and horizontal noise filter
_ RGB gain adjustment for complementary CCDs
_ Independent gamma correction for RGB colors
_ YCbCr-4:2:2 formatted data output Sync module 1402 generates control signals for other modules such as a sync signal for a starting point of an image and an enable signal for down sampling. In this module, no image processing is executed. White balance module 1404 executes digital gain adjustment and white balance for CCD raw data. CFA interpolation module 1406 has many important sub-modules such as a horizontal noise filter, a horizontal interpolation, a vertical noise filter, a vertical interpolation, a down sampling, etc. This module outputs RGB formatted data irrespective of CCD mode (RGB CCD or complementary CCD). RGB gain modules 1408 for complementary CCD allow adjustment to white balance by RGB color format for complementary CCD. Gamma correction modules 1410 execute gamma correction with an approximated gamma curve having 4 linear segments. This module exists for each color to permit the independent adjustment to RGB. RGB2YCbCr conversion module 1412 converts RGB formatted data into YCbCr formatted data and adjusts offsets of Cb and Cr. 4:2:2 conversion module 1414 converts YCbCr-4:4:4 formatted data into 4:2:2 format and outputs them on a 32-bit data bus. SDRAM interface module 1416 communicates with SDRAM controller 110 (FIG. 1b) and requests it to store YCbCr-4:2:2 formatted image data.

The following describes the modules.

White balance module 1404 executes digital gain adjustment and white balance for CCD raw data. Digital gain adjusts for total brightness of the image and white balance adjusts the ratio of colors existing in a CFA pattern.

FIG. 8 is a block diagram of white balance module 1404. There are two multipliers for the two gain adjustments and clip circuits to reduce the size of circuits. A gain value for digital gain named PVGAIN in this figure uses data in a PVGAIN register, and white balance is selected automatically by setting the CFA pattern register.

Figure 10A:
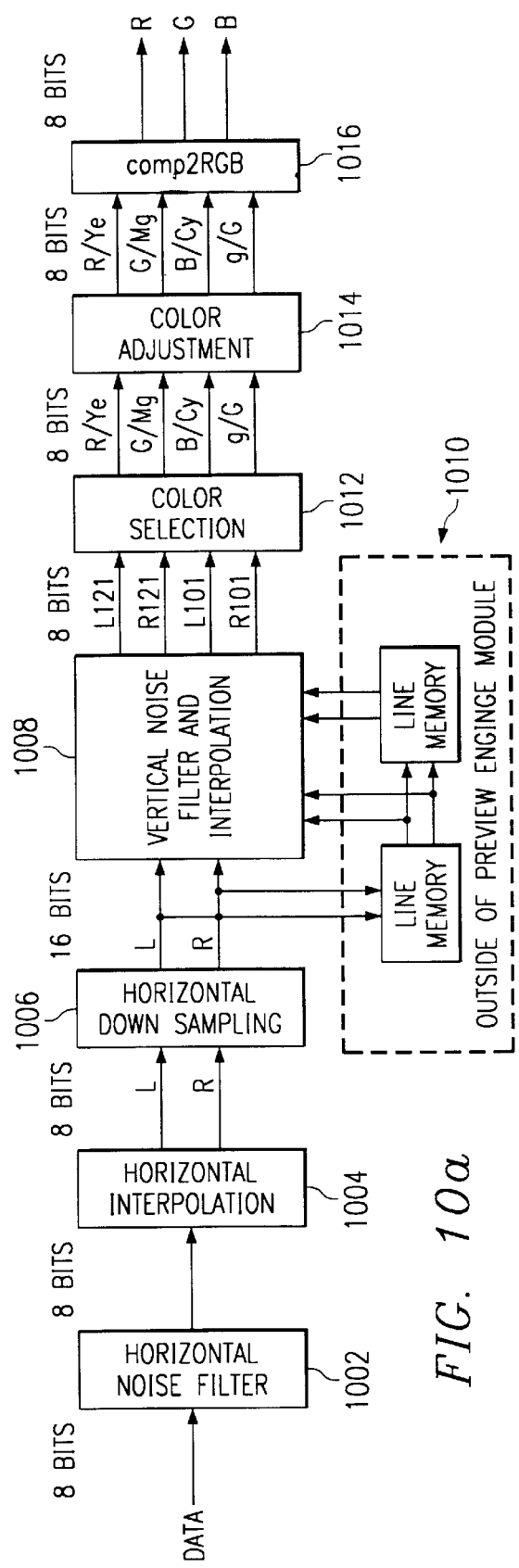
FIGS. 10a–10e illustrates CFA interpolation.

CFA interpolation module 1406 include both sub-modules for horizontal and vertical interpolation and for horizontal and vertical noise filtering, down sampling, color adjustment and complementary color to RGB color conversion. FIG. 10a is a block diagram of CFA interpolation module 1406. Horizontal noise filter sub-module 1002 executes a three-tap low pass filter horizontal filter; see FIG. 10b.

Horizontal interpolation filter sub-module 1004 prepares two types of filters and interpolates horizontally using one of them. The outputs signal "L" and "R" means a left data and a right data on the line. For example, a processed line starts the following CFA pattern, GBGBGBGBGB . . . , the output signal "L" is G and "R" is B. Therefore, these two outputs change the colors each line. Horizontal down-sampling sub-module 1006 outputs only data on valid pixels based on register settings of horizontal decimation pattern. Vertical interpolation sub-module 1008 processes a three-tap vertical interpolation filter using two line-memories 1010 outside the preview engine module and outputs data of all colors existing in the CFA pattern. And this sub-module also executes a vertical noise filter. Color selection sub-module 1012 extracts data by each color in the CFA pattern and outputs RGB color formatted data in RGB CCD mode or complementary color formatted data in complementary CCD mode. In this figure, "g" signal is temporal data regarding G and used for recalculating R and B in the next color adjustment sub-module 1014. The color formatted data is processed color adjustment in color adjustment sub-module 1014 and the processing is different depending on CCD mode. This image processing from vertical interpolation sub-module 1008 to color adjustment sub-module 1014 has a strong correlation depending on CCD mode and vertical interpolation mode. Therefore, the processing should be considered as a sequence of vertical interpolation processing as described below. Comp2RGB conversion sub-module 1016 converts complementary color format into RGB color format in complementary CCD mode. In RGB CCD mode, the data bypass this sub-module.

The following sections describe these sub-modules.

Horizontal noise filter 1002 executes three-tap horizontal low pass filter and can reduce random noise effectively. Actually, when the center of data is set to $X_0$, the following calculation is executed depending on the CFA pattern and its processed line.

$$X_0 = \begin{cases} (X_{-2} + 2X_0 + X_2)/4 & \text{(two colors in processed line)} \\ (X_{-1} + 2X_0 + X_1)/4 & \text{(one color in processed line)} \end{cases}$$

An on/off switching of this filter can be controlled by a register setting.

Figure 10B:
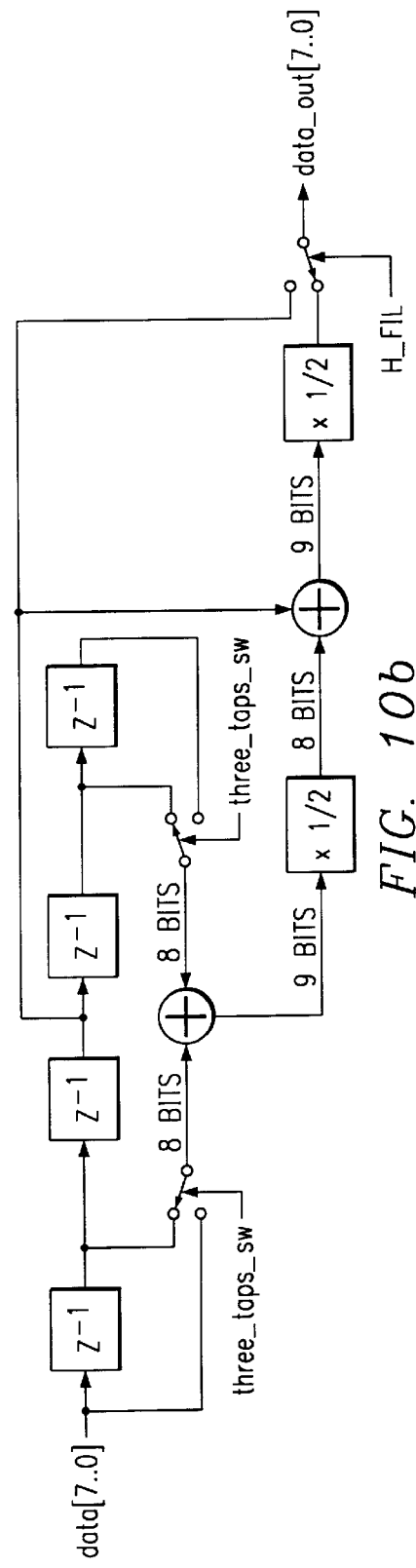

FIG. 10b is a block diagram of horizontal noise filter sub-module 1002. The two types of filter are implemented by using two adders and a switch named "three_taps_sw" in this figure. If there is one color in the processed line, the switch is set to on (High in the figure). This switch is automatically controlled depending on a register setting of the CFA pattern and a position of the line in the processed image. Before the output, noise-filtered data or bypassed data is selected by a register setting.

In horizontal interpolation sub-module 1004, there are two modes of filtering and the data from horizontal noise filter 1002 is interpolated horizontally by either a two-tap or five-tap interpolation filter. The two-tap filter utilizes the average the two data at the adjacent pixels on the left and right to interpolate the center data. This mode is called "simple mode". The five-tap horizontal interpolation filter utilizes the information of another color on the processed line so that a false color around an edge in processed image can be reduced effectively. This mode is called "normal mode". These modes are selectable by a register setting. Actually, when the center of data is set to $X_0$, the following calculation is executed depending upon the interpolation mode.

$$x_0 = \begin{cases} (-X_{-2} + 2X_{-1} + 2X_0 + 2X_1 - X_2)/4 & \text{(normal mode)} \\ (X_{-1} + X_1)/2 & \text{(simple mode)} \end{cases}$$

Figure 10C:
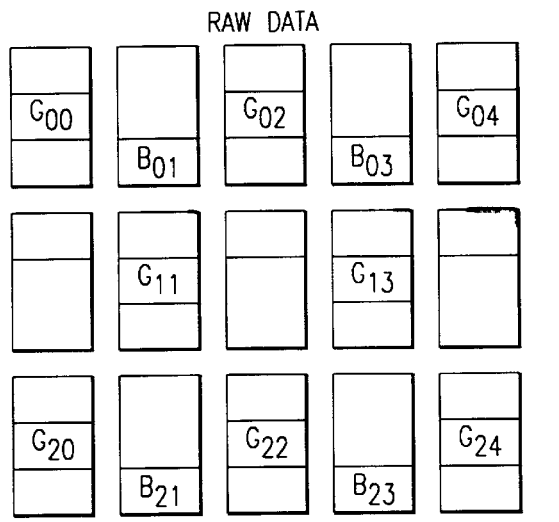
Figure 10C:
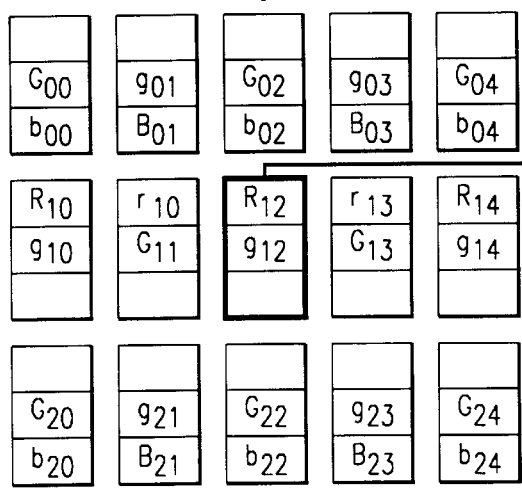

FIG. 10c shows an example of this horizontal interpolation processing in RGB Bayer CCD mode. In this figure, interpolated data is represented by small letters.

Figure 10D:
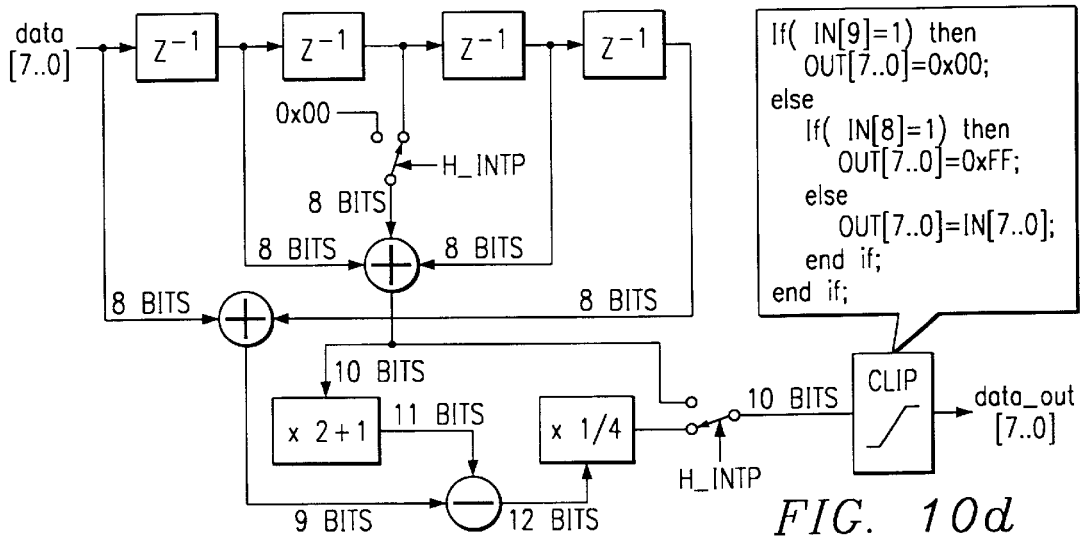

FIG. 10d is a block diagram of horizontal interpolation module 1004. Two adders, one subtracter and a filter mode switch are implemented for executing one of these two types of filters. The filter mode switch is controlled by setting a register.

Vertical interpolation sub-module 1008 processes either a two-tap or three-tap vertical interpolation filter using two line-memories outside the preview engine module and outputs the information of all colors existing in the CFA pattern. And this sub-module also executes a vertical noise filter. An image processing in this module is a little complicated and the outputs from this sub-module is varied depending on a processed line, CCD mode, CFA pattern, filter mode and noise filter on/off. As explained in the following, the image processing from vertical interpolation sub-module 1008 to color adjustment sub-module 1014 has a strong correlation and this processing flow of them should be considered as a sequence of vertical interpolation processing. Therefore, this sequence of the vertical interpolation processing is explained first. The sequence may be called "vertical interpolation sequence".

As with horizontal interpolation, vertical interpolation processing also has two types of interpolation mode, that is "simple mode" and "normal mode". An interpolation filter in simple mode utilizes the average two data at the next pixels on the upper and lower to interpolate the center of data. In normal mode, the processing differs between RGB CCD mode and complementary CCD mode. The interpolation filter in normal mode in RGB CCD mode utilizes the data of one of the others color same as horizontal interpolation filter. Actually, when the data of a certain color to be interpolated is set to X (mainly R,B) and the data of a color utilized as a reference is set to Y (mainly G), the following calculation is executed depending on the interpolation mode through this vertical interpolation sequence and it is the output from color adjustment sub-module.

$$x_0 = \begin{cases} (X_{-1} - Y_{-1} + X_1 - Y_1)/2 + Y_0 & \text{(normal mode)} \\ (X_{-1} + X_1)/2 & \text{(simple mode)} \end{cases}$$

Figure 10E:
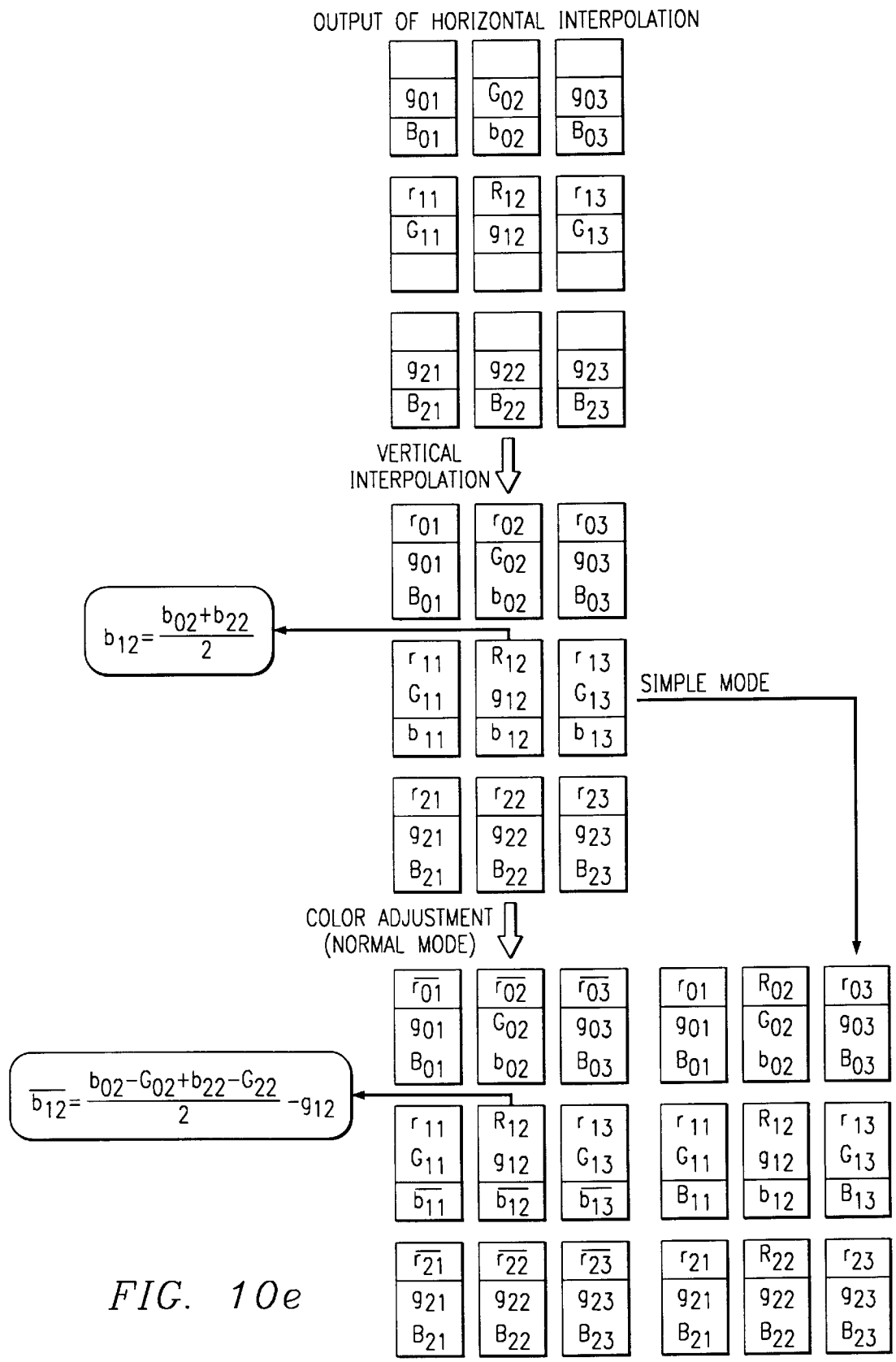

FIG. 10e shows an example of this vertical interpolation sequence for the RGB Bayer CCD pattern.

In complementary CCD mode, normal mode means "simple interpolation with color adjustment". That is, data of all colors which is processed by simple vertical interpolation is adjusted based on the formula in complementary color space. Actually, when the data of a certain color to be interpolated is set to X and the data of the others color is set to W, Y, and Z, the following calculations are executed in normal mode in complementary CCD mode.

$$x_0 = \begin{cases} (X_{-1} + X_1)/2 \pm a(w_0, x_0, y_0, z_0) & \text{(normal mode)} \\ (X_{-1} + X_1)/2 & \text{(simple mode)} \end{cases}$$

As to the calculation of $a=a(w_0, x_0, y_0, z_0)$, see below.

In this vertical interpolation sequence, main roles of vertical interpolation sub-module 1008 are to execute a part of vertical interpolation sequence and vertical noise filter.

The part of vertical interpolation sequence means preparing data for normal vertical interpolation mode. As shown in FIGS. 10*e* and 10*b* (for RGB and complementary CCD patterns, respectively), in simple mode, an output data of this vertical interpolation sub-module bypasses color adjustment sub-module. Therefore, in simple mode, the output from this sub-module is used as the output of vertical interpolation sequence. In any case of interpolation mode, this sub-module calculates the following equation for vertical interpolation sequence.

$$x_0 = (X_{-1} - X_1)/2$$

Vertical noise filter . . . which executes the following 3 taps vertical low pass filter is also processed in this sub-module depending on the CFA pattern.

$$x_0 = (X_{-1} - 2X_0 X_1)4$$

Figure 10G:
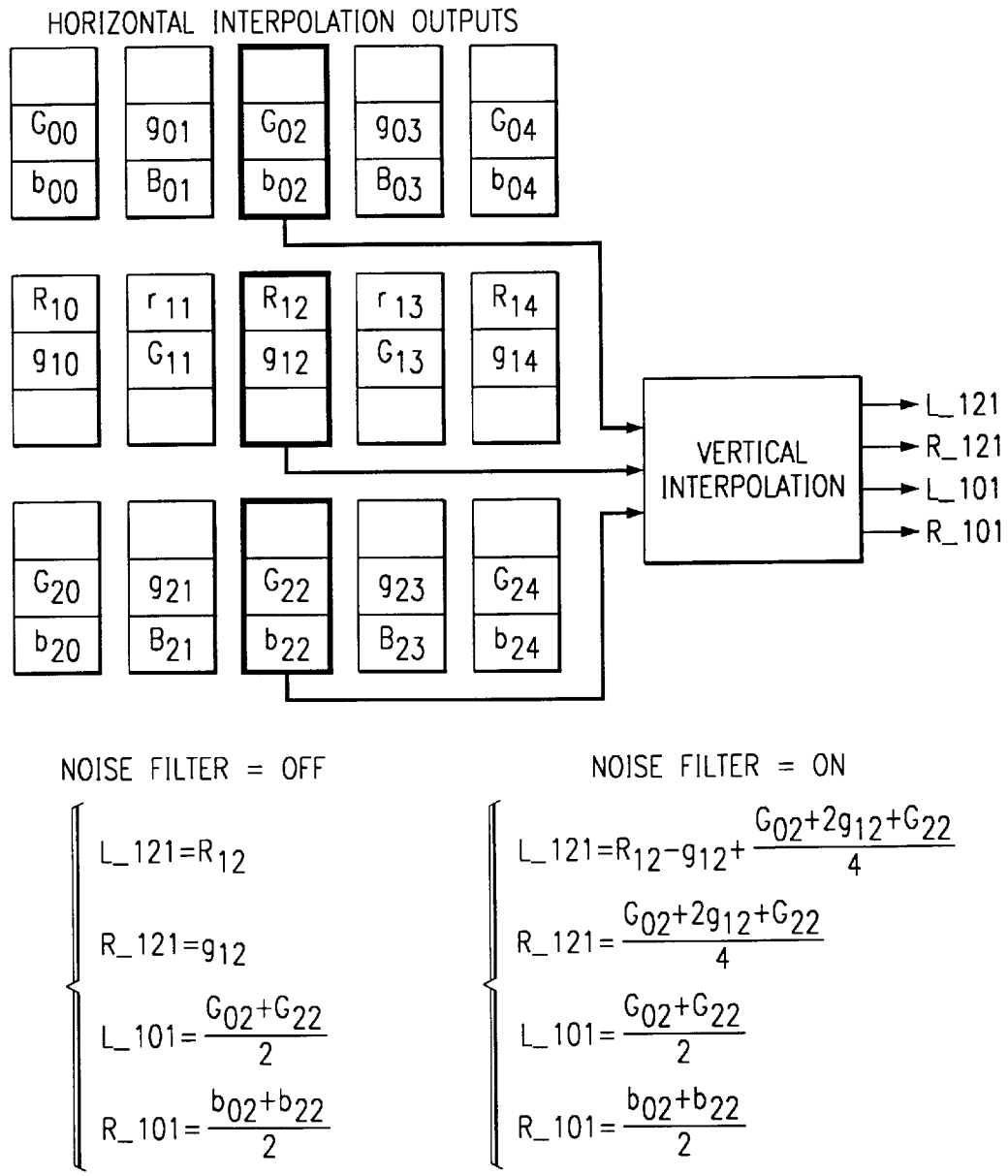

However, for this filtering, data of same color on processed 3 lines must be prepared. Therefore, a function of the vertical noise filter mainly executes only G in RGB Bayer CCD. FIG. 10*g* shows an example of the output of this vertical interpolation sub-module for a RGB Bayer CCD. When the vertical noise filter can be applied and it is set on, original data (R in this figure) is also adjusted in order to keep a correlation to the others color (G in this figure).

Figure 10H:
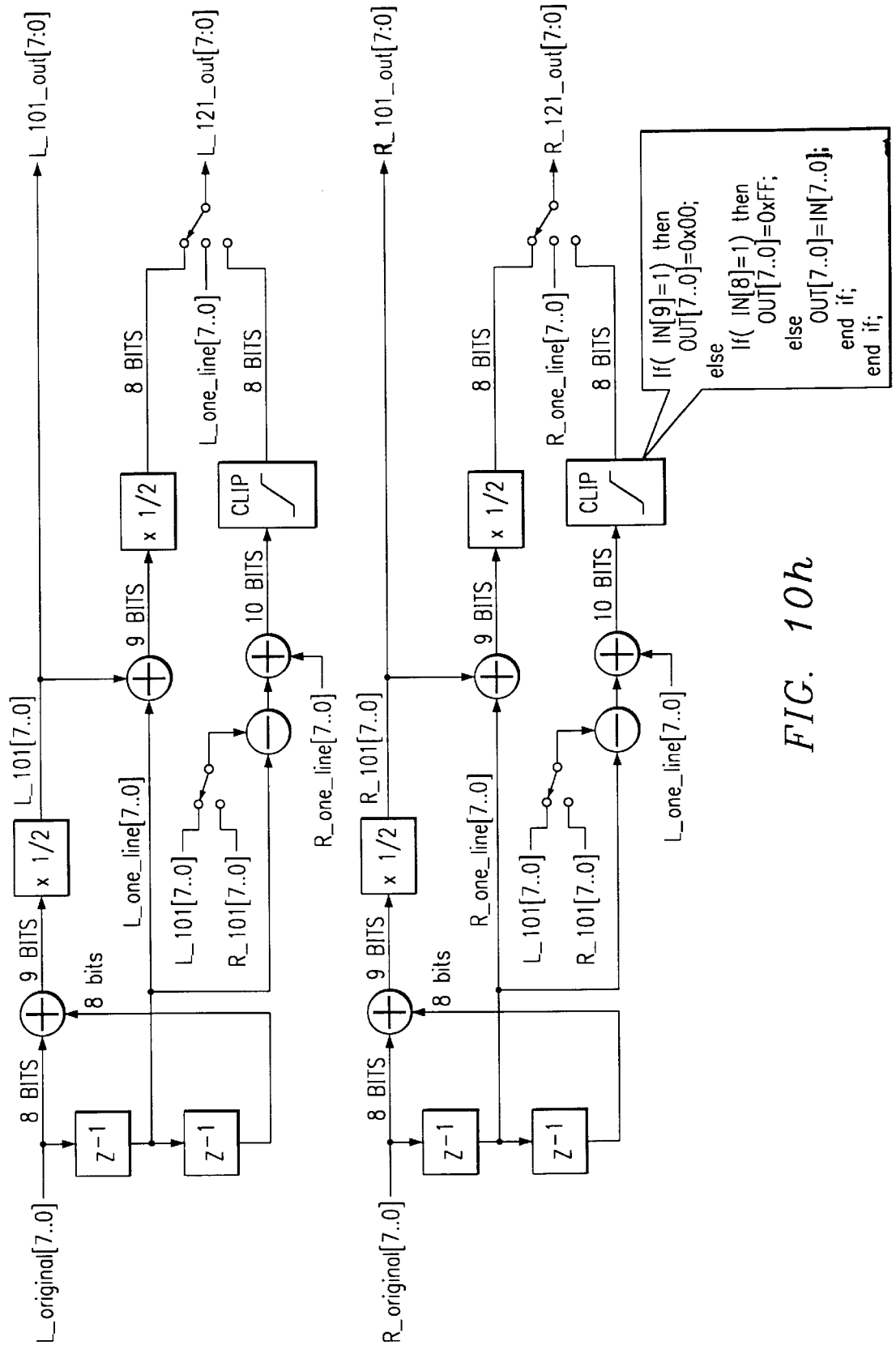

FIG. 10*h* is a block diagram of vertical interpolation sub-module 1008. Six adders and two subtracters are implemented for executing vertical interpolation and noise filtering. Especially, a calculation process of L__121 and R__121 is so complicated that switching operation for L__121 and R__121 is not shown to simplify this figure.

Figure 10I:
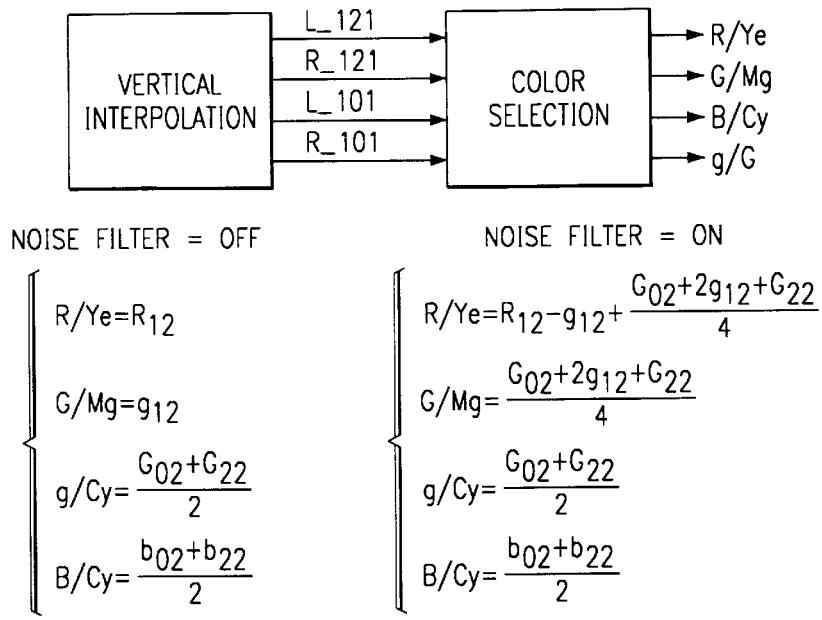

Color selection sub-module 1012 arranges the inputs from vertical interpolation sub-modules in order of color format, that is R, G and B in RGB CCD mode or Ye, Cy, Mg, G in complementary CCD mode. This arrangement is executed automatically by setting register of the CFA pattern. FIG. 10*i* shows an example of this color selection processing in RGB Bayer CCD of FIG. 10*g*. The outputs named "g" in this figure is a temporal data of G and is used for recalculation of R or B in RGB CCD mode in color adjustment sub-module.

Figure 10J:
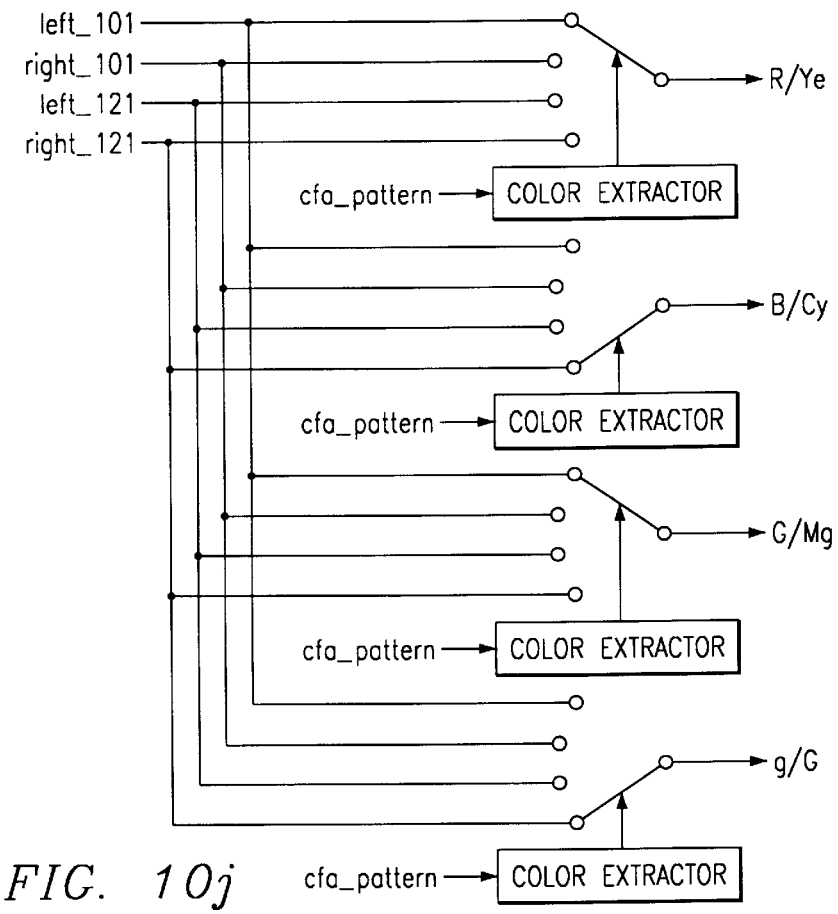

FIG. 10*j* is a block diagram of color selection sub-module 1012. Four color extractors switch and select independently correct colors from four inputs from vertical interpolation sub-module 1008.

Color adjustment sub-module 1014 executes the rest of calculation for vertical interpolation sequence. In RGB CCD mode such as RGB Bayer CCD, R or B is recalculated using the temporal data of G. When data of R or B from color selection sub-module is set to X, the following calculation is executed in RGB CCD mode.

$$x = X - G_{temp} + G$$

In the example of FIG. 10*i*, when noise filter is off, $$X = (b_{02} - b_{22})/2$$

$$G_{temp} = (G_{02} + G_{22})/2$$

$$G = g_{12}$$

Therefore, $$x = B$$
$$= (b_{02} - b_{22})/2 - (G_{02} + G_{22})/2 + g_{12}$$
$$= ((b_{02} - G_{02}) + (b_{22} - G_{22}))/2 + g_{12}$$

This is the output B of the color adjustment module and also the output of vertical interpolation sequence. That is, vertical interpolation sequence in RGB CCD mode utilizes the average of differences between data of color to be interpolated and reference data of the others color.

In complementary CCD mode, color adjustment is processed to data of all colors from color selection sub-module. First, value a is calculated at each pixel based on a formula in complementary color space Ye+Cy=G+Mg.

$$a = G + Mg - Ye - Cy$$

That is, the value a can be considered as the amount of an error value of four colors. Therefore, in complementary CCD mode, to data of all colors, Ye, Cy, Mg and G, the following adjustment is processed to satisfy the above formula.

$$ye = Ye + a/4$$

$$cy = Cy + a/4$$

$$g = G - a/4$$

$$mg = Mg - a/4$$

Figure 10K:
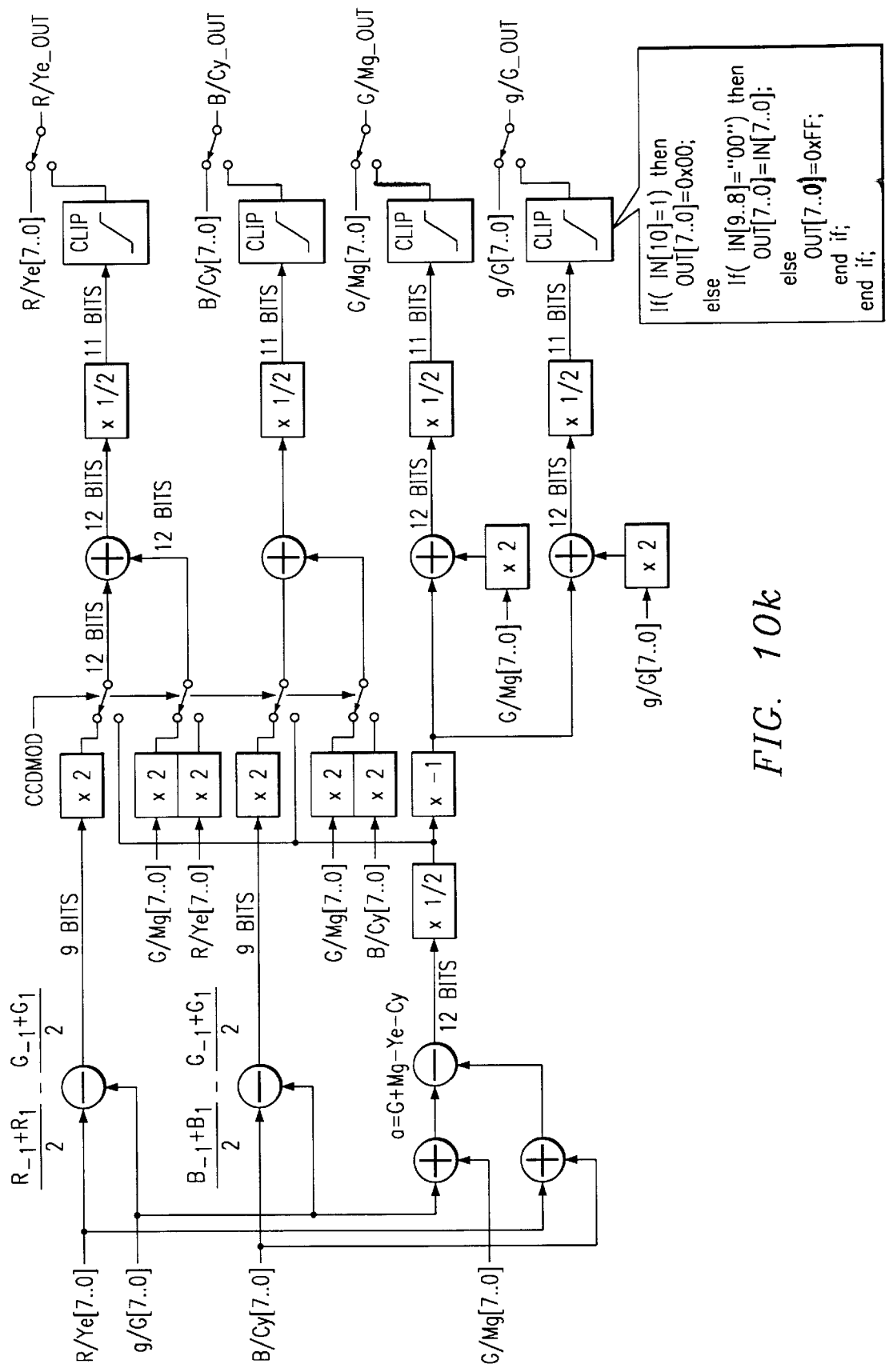

FIG. 10*k* is a block diagram of color adjustment sub-module 1014. Six adders and three subtracters are implemented for executing the two types of calculations described above. A switcher named CCDMOD in this figure selects correct outputs depending on CCD mode and is controlled by setting a register.

Comp2RGB conversion sub-modules 1016 converts complementary color formatted data to RGB formatted data in complementary CCD mode. Especially for G, data from color adjustment and data calculated by conversion formula can be blended by 5 types of blending ratio. Actually, the following calculation is executed based on the conversion formula:

$$R = Ye - Cy + Mg$$

$$G = rG_{input} + (1 - r)(Ye + Cy - Mg)(r = 0, 1/4, 2/4, 3/4, 1)$$

$$B = Mg - Ye + Cy$$

In RGB CCD mode, data from color adjustment sub-module bypass this sub-module.

Figure 10L:
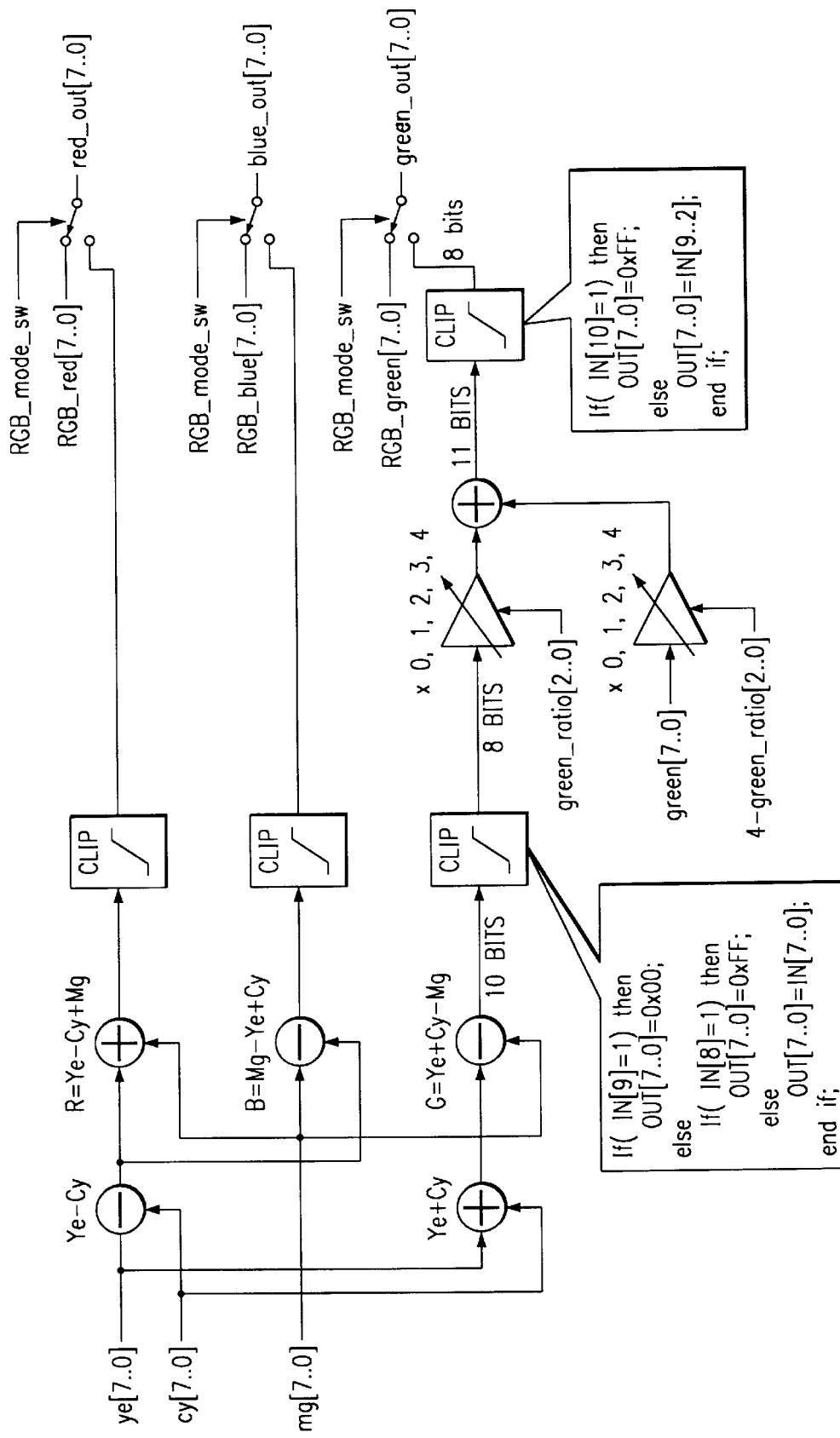

FIG. 10*l* is a block diagram of comp2RGB conversion sub-module 1016. Three adders, three subtractors, and two multipliers are implemented for executing the calculations above. A gain adjuster for G named "green_ratio" in this figure is adjustable by setting a register. In RGB CCD mode, a CCDMOD switcher selects off (high in this figure) for bypassing this module.

RGB gain for complementary CCD module allows adjustment of white balance by RGB color format even for complementary CCD module. This module is also available in RGB CCD mode.

Figure 9A:
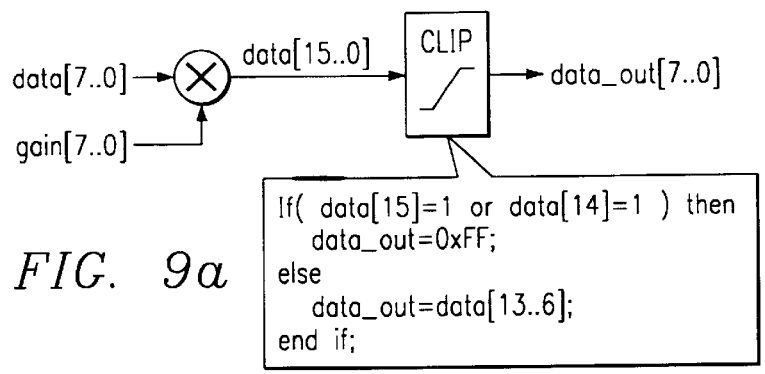
FIGS. 9a–9c show gamma correction.
Figure 9B:
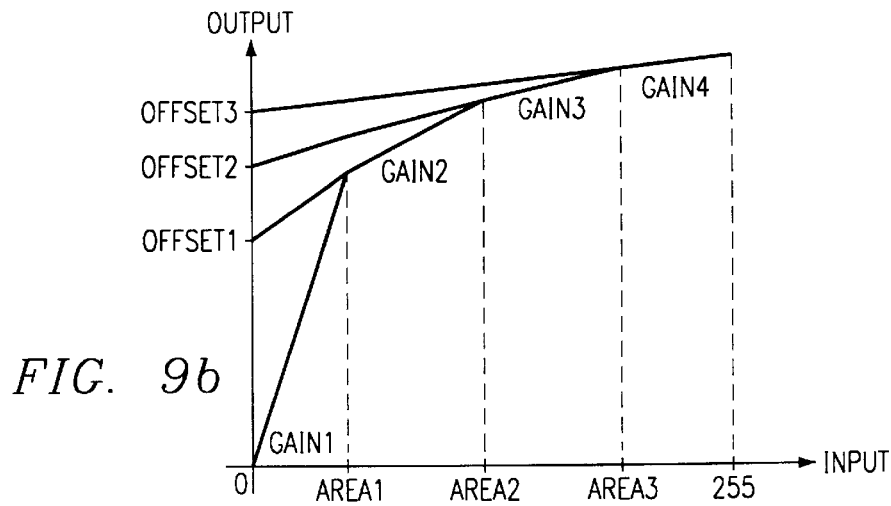

FIG. 9*a* is a block diagram of complementary white balance module 1408. One multiplier and clip circuit is implemented for this operation. Each gain for RGB is set by a register.

Gamma correction modules 1410 execute gamma correction for each color data in RGB color format. For this operation, prepare in advance three types of data for approximating the gamma curve by four linear segments. Those are area, offset and gain shown in FIG. 9b. As shown in FIG. 14, this module exists for each color so that the independent adjustment to RGB may be made.

Figure 9C:
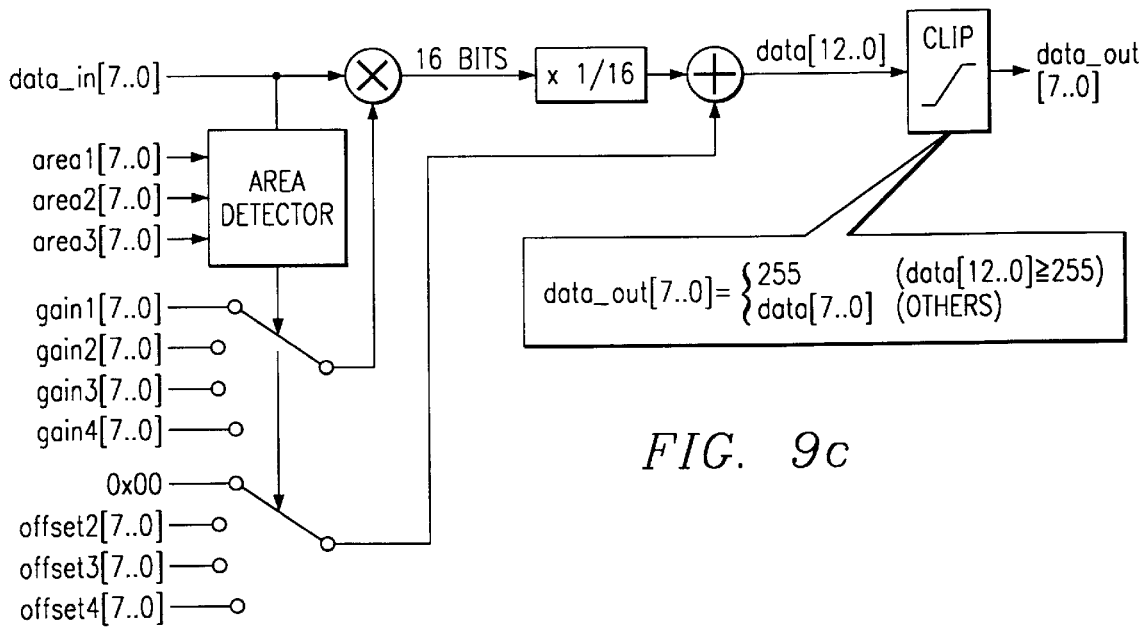

FIG. 9c is a block diagram of gamma correction module 1410. Area detector selects correct gain and offset for input data based on area data. The data regarding gain, offset, and area are set in three registers.

RGB2YCbCr conversion module 1412 converts RGB formatted data to YCbCr formatted data and adjusts offsets to Cb and Cr based on the following matrix calculation.

$$\begin{bmatrix} Y \\ Cb \\ Cr \end{bmatrix} = \begin{bmatrix} COEF1 & COEF2 & COEF3 \\ COEF4 & COEF5 & COEF6 \\ COEF7 & COEF8 & COEF9 \end{bmatrix} \begin{bmatrix} R \\ G \\ B \end{bmatrix} + \begin{bmatrix} 0 \\ OFFSET\_Cb \\ OFFSET\_Cr \end{bmatrix}$$

Each coefficient in this matrix is set by a register so that variable setting for this conversion is available.

FIG. 11a is a block diagram of this RGB2YCbCr conversion module 1412. Nine multipliers and five adders are implemented for the foregoing matrix calculation. After multiplying RGB data with coefficients, the six least significant bits of each data from the multipliers is cut in order to reduce size of circuits. As to Cb and Cr, additional circuit for offset adjustment is followed by YCbCr conversion circuit. Clip circuits for Cb and Cr includes conversion circuits from two's complement to offset binary.

Burst Mode Compression/decompression Engine

The preferred embodiment DSC engine includes an improved Burst Capture function with real-time processing, without compromise in the image resolution as compared to the regular capture mode. The Burst Capture Mode is the use of dedicated compression and decompression engine 108 for an increased burst capture sequence length. A sequence of CCD raw image frames is first stored in SDRAM 160 by using Compression engine 108. Then, as an off-line process, the image pipeline of regular capture mode retrieves the CCD raw images from SDRAM 160, processes them sequentially, and finally stores them back as JPEG files in the SDRAM. The Animated Playback Mode can display these JPEG files.

Figure 13B:
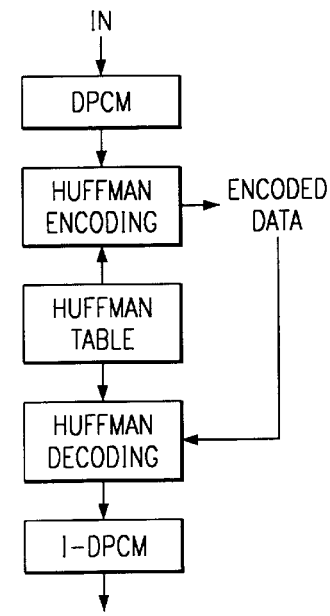
FIGS. 13a–13b show burst compression/decompression.
Figure 13A:
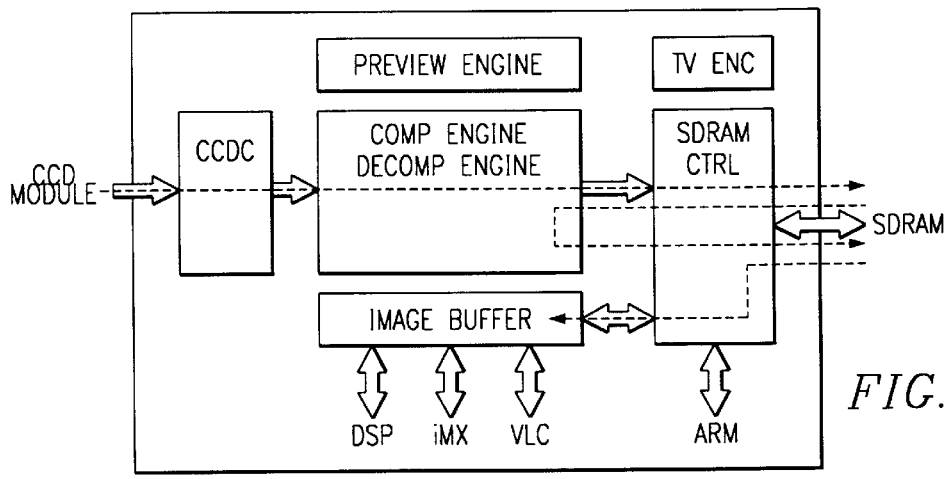

Burst mode compression/decompression engine 108 includes differential pulse code modulation (DPCM) and Huffman coding using the same tables as the intropy-coding of DC coefficients in baseline JPEG compression. Engine 108 uses the sample Huffman table in the JPEG standard for chrominance DC differential data. Engine 108 also provides the inverse transforms as illustrated in FIG. 13. Fixed Huffman Table (JPEG Huffman table for Chrominance DC coefficients).

| Category (SSSS) | $\hat{D}_i$ | Code Length | Codeword |
|---|---|---|---|
| 0 | 0 | 2 | 00 |
| 1 | −1,1 | 2 | 01 |
| 2 | −3,−2,2,3 | 2 | 10 |
| 3 | −7,...,−4,4,...,7 | 3 | 110 |
| 4 | −15,...,−8,8,...,15 | 4 | 1110 |
| 5 | −31,...,−16,16,...,31 | 5 | 11110 |
| 6 | −63,...,−32,32,...,63 | 6 | 111110 |

-continued

| Category (SSSS) | $\hat{D}_i$ | Code Length | Codeword |
|---|---|---|---|
| 7 | −127,...,−64,64,...,127 | 7 | 1111110 |
| 8 | −255,...,−128,128,...,128 | 8 | 11111110 |
| 9 | −511,...,−256,256,...,511 | 9 | 111111110 |
| 10 | −1023,...,−512,512,...,1023 | 10 | 1111111110 |
| 11 | −2047,...,−1024,1024,...,2047 | 11 | 11111111110 |
| 12 | −4095,...,−2048,2048,...,4095 | 12 | 111111111110 |

The encoder has four look-up tables: Huffman code (13×2-byte entries), Huffman code length table (13×1-byte entries), low bit mask to generate variable-length bit stream (32×4-byte entries), nad log table (256×1-byte entries). The Huffman tables are not programmable for simplicity, although alternative embodiments could include programmable Huffman tables.

The Huffman decoder performs the inverse function of the Huffman encoder and has five look-up tables: max code comparison table (13×2-byte entries), Min code comparison table (13×2-byte entries), decoded Huffman symbol pointer (13×1-byte entries), decoded Huffman symbol table (13×1-byte entries), and bit position mask (32×4-byte entries).

The lossy mode compression just discards the least significant bit (LSB) or The two least significant bits of each coefficient.

Playback Synchronization

A problem involved in playback of audio-visual bitstreams is how to synchroneze audio with video signal. The preferred embodiments play the audio bitstream seamlessly in the background in real-time with the audio encoded by using the simple coding standards like ITU-T G.711 and Microsoft 16-bit PCM. By using an interrupt service routine, about 0.1% of the DSP resources is enough to output audio in real time through (multichannel) buffered serial ports; see FIG. 1b. Therefore, the preferred embodiment must realize the video decoding in synchronization to the audio playback.

For clarity, assume that both audio and video are captured in full speed (real-time with 8 K sample/s for audio and 30 frame/s for video). Audio is played back as samples. However, video is displayed in the granularity of frames. Thus the synchronization problem is caused by the fact that the video decoding could be faster or slower than the real-time requirement. If the video decoding is too fast, a certain amount of delay slots has to be inserted to slow down the decoding. Contrarily, if the video decoding is too slow, some video frames must be skipped to catch up with the real-time audio playback.

The preferred embodiments handle both cases. Especially in the case of slow video decoding, the preferred embodiments can properly select and skip the frames in an optimal manner. Note that the preferred embodiment is described for video bitstreams without bidirectional coded frames (B-frames).

FIG. 46a depicts the synchronization between audio and video. The first video frame is pre-decoded before beginning audio-video playback. Since the video is displayed in the granularity of frames, the synchronization points are located at the video frame boundaries, i.e. {t=0,ΔT,2ΔT,3ΔT ... }. Here ΔT is the duration of a frame, which is defined as:

$$\Delta T = 1/fp \qquad (1)$$

where fp is the frame-rate used for the video sequence.

Audio and video could lose synchronization when the video decoding speed is not fast enough. As illustrated in FIG. 46a, when the decoding of video frame 2 has not finished in time (Td2>ΔT), the audio-video playback loses synchronization after displaying video frame 1. Here {Tdm m=0, 1, 2 . . . } denotes the decoding time used for decoding video frame m.

With insufficient video playback speed, the only way to maintain a reasonable synchronization between audio and video is to skip video frames properly. In FIG. 46b, video frame 2 is skipped (and frame 1 repeated) so that synchronization can be reacquired at frame 3.

Figure 47:
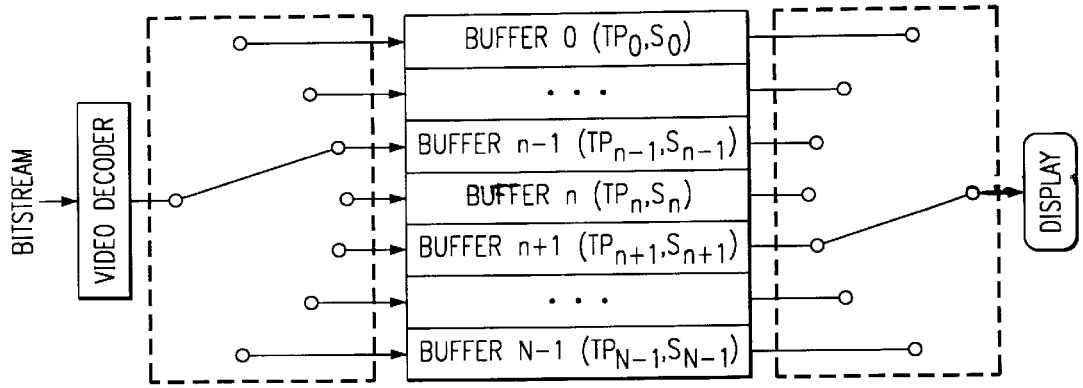

A preferred embodiment circular buffer scheme is illustrated in FIG. 47. The video decoder is connected to one side of the circular buffer, the display is connected to the other side. The circular buffer has a size of N video frames. There are two registers associated with each frame buffer of the circular buffer: the first register contains $TP_n$, n=0, 1, 2, 3, . . . , N−1 which indicates the presumptive presentation time of the video frame stored in buffer n, and the second register contains $S_n$, n=0, 1, 2, 3 . . . , N−1 which signals whether the frame in buffer n is ready for display (1 for ready, 0 for not ready). Of course, the value of $TP_n$ is a multiple of ΔT. Buffer switching for display also occurs at frame boundaries (i.e. at time t=mΔT, m=0, 1, 2 , . . . ). Because the preferred embodiments use a circular buffer containing N frames, all the indices ( . . . , n−1, n, n+1, . . . ) should be regarded as modulo-N indices.

Suppose the time after decoding the current video frame is T. The decoded current frame is stored in buffer n−1 in FIG. 47. Therefore, the buffer to be used for storing the next frame in FIG. 47 is buffer n.

Determine the current position in the bitstream: the frame index m of the current decoded frame is defined as $$m = TP_{n-1}/\Delta T \quad (2)$$

Determe the decoding starting time of the next frame: since the frame in the buffer n is to be displayed during the time interval of $\{TP_n \leq t < TP_{n+1}\}$, buffer n is not available for decoding the next frame until $TP_{n+1}$. Therefore, the decoding starting time of the next frame Ts is:

$$Ts = \max\{T, TP_{n+1}\} \quad (3)$$

Determine the next frame to be decoded: let $\hat{T}d$ be the estimated time for decoding the next frame, the presentation time of the next frame must satisfy:

$$\begin{cases} TP_n > Ts + \hat{T}d \\ TP_n \geq TP_{n-1} + \Delta T \end{cases}$$

The above conditions imply that the decoding of the next frame is finished before its presentation time, and the next frame is located at least a frame after the current frame in the bitstream. Because $TP_n$ must be a multiple of ΔT, the next frame that can be synchronized to audio satisfies the conditions:

$$\begin{cases} TP_n = \Delta T \left[ \frac{Ts + \hat{T}d}{\Delta T} + 0.5 \right] \\ TP_n \geq TP_{n-1} + \Delta T \end{cases}$$

where [•] denotes integer part by truncation.

Therefore, the presentation time of the next frame is determined by:

$$TP_n = \max\left\{ \Delta T \left[ \frac{Ts + \hat{T}d}{\Delta T} + 0.5 \right], TP_{n-1} + \Delta T \right\} \quad (4)$$

There are different methods to estimate $\hat{T}d$, such as using statistical estimation based on prior decodings or frame parameters. One preferred embodiment simply uses the actual decoding time of the most recently decoded frame of the same picture coding type (I-frame or P-frame) plus a certain amount of safety margin as the estimated decoding time for the next frame.

The frame index m' of the next frame to be decoded can thus be computed as:

$$m' = TP_n/\Delta T \quad (5)$$

Then the number of frames Δm to be skipped from the current position is determined by:

$$\Delta m = m' - m - 1 \quad (6)$$

Equation (2) to (6) make up of the basic control operations for updating the circular buffer.

Figure 48:
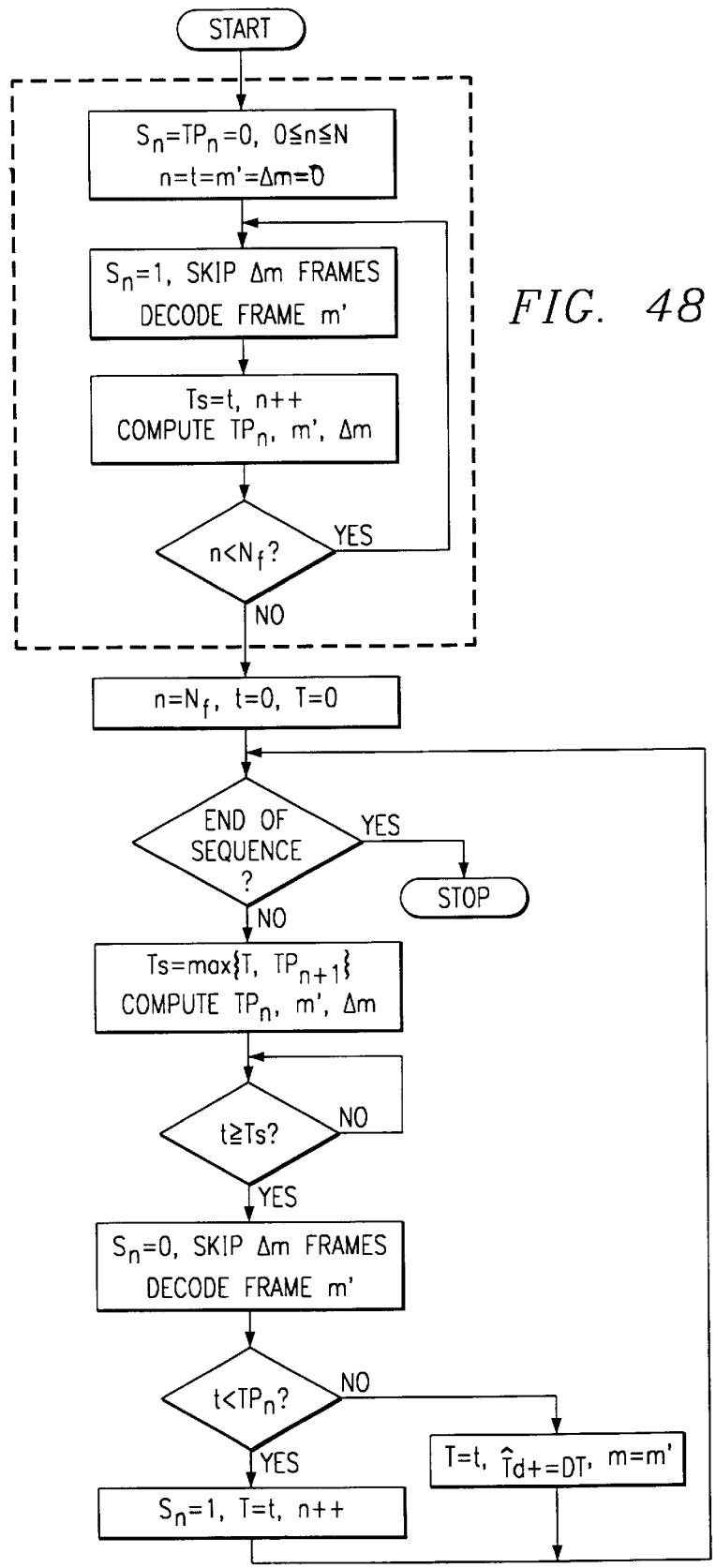

The preferred embodiments use the circular buffer scheme to realize synchronization. There are two parts: the video decoder buffer switch control and the display buffer switch control. FIG. 48 demonstrates the flowchart of the video decoder buffer switch control, which contains two stages: initialization and playback. Initialization: in the circular buffer initialization, $N_f (1 \leq N_f \leq N)$ video frames are decoded before starting playback. As shown in the dashed box in FIG. 48, there are four steps for the initialization:

step 0: set all the presentation time registers $\{TP_n$, n=0, 1, 2, 3, . . . , N−1$\}$ and the status registers $\{S_n$, n=0, 1, 2, 3, . . . , N−1$\}$ to zero, switch the video decoder to buffer 0 (i.e. n=0), point to the beginning of the video bitstream (i.e. m'=Δm=0), set time to zero (i.e. t=0)

step 1: set the related status register $S_n$ to 1, skip Δm video frames, decode frame m', store the decoded frame in buffer n. (Recall on the first pass through the loop, n=0, m'=0, so the first frame is decoded and stored in buffer 0.)

step 2: set the decoding start time Ts to t, switch to the next buffer (i.e. n++), update $TP_n$, m', Δm according to equations (4), (5), and (6).

step 3: check whether the number of decoded frames reaches the pre-set frame number $N_f$. If true, go to playback, otherwise, loop to step 1.

Playback: there are six steps involved in updating the circular buffer during the playback.

step 0: switch display to buffer 0, enable display, reset time to zero (i.e. t=T=0), switch the video decoder to buffer $N_f$ (i.e. n=$N_f$)

step 1: if the whole video sequence is decoded, stop decoding, otherwise, go to step 2.

step 2: update Ts, $TP_n$, m' and Δm according to equations (3), (4), (5); and (6).

step 3: wait until time reaches Ts (i.e. t≧Ts), go to step 4.

step 4: set the related status register $S_n$ to 0, skip Δm video frames, decode frame m', store the decoded frame in buffer n.

step 5: if the frame decoding finishes in time (i.e. t<$TP_n$), set $S_n$ to 1 to indicate the decoded frame is ready for display, set T to t, switch the video decoder to the next buffer (i.e. n++). Otherwise, set T to t, add DT to the estimated $\hat{T}d$ (i.e. $\hat{T}d+=DT$ with $DT=N_d\Delta T$, intentionally skip $N_d$ ($0 \leq N_d$) more frames in the next stage), set the current frame index m to m'. Go to step 1. Note that $N_d$ is a parameter to control the screen freezing time before resuming the synchronization.

Users can freely decide the circular buffer size (N), the initial time delay ($N_f$) for the playback as well as the screen freezing time ($N_d$). Obviously, the minimum buffer size is 3 video frames (i.e. N=3), the least time delay is one video frame (i.e. $N_f=1$). However, in the case of insufficient video decoding speed, it is strongly recommended to decode N−1 frames (i.e. $N_f=N-1$) during the circular buffer initialization, so that the video decoder can gain the maximal room to catch up with the audio real time playback.

Display buffer switch control: the display buffer switch control is carried out in parallel to the video decoder buffer switch. The preferred embodiment checks the display buffer switch at video frame boundaries: t=mΔT, m=0, 1, 2, . . . Suppose the display is currently showing the video frame in buffer n−1, it switches to the next buffer, i.e. buffer n, if and only if the current time ($t \geq TP_n$) and ($S_n=1$) holds. Otherwise, it is connected to buffer n−1. Here, if ($t \geq TP_n$) and ($S_n=0$), it means the decoder has not finished decoding of the frame in time. In this case, the video frame in buffer n has been discarded, the decoder is decoding the conservatively selected next frame to update buffer n again, the display should keep displaying the frame in buffer n−1 until ($t \geq TP_n$) and ($S_{n=1}$) holds.

In summary, the preferred embodiment provides a way to realize the synchronization between audio and video when playing back by using software or firmware.

Variable Length Decoding

Variable Length Decoding (VLD) is involved in decoding bitstreams which are generated by using Variable Length Encoding (VLC) at encoder; see FIG. 1b item 126. Because of VLC, the number of bits used for coding units varies from unit to unit. Therefore, a decoder does not know the number of bits used for a coding unit before having decoded it. This makes it essential for a decoder to use a bitstream buffer during the decoding process.

Figure 49:
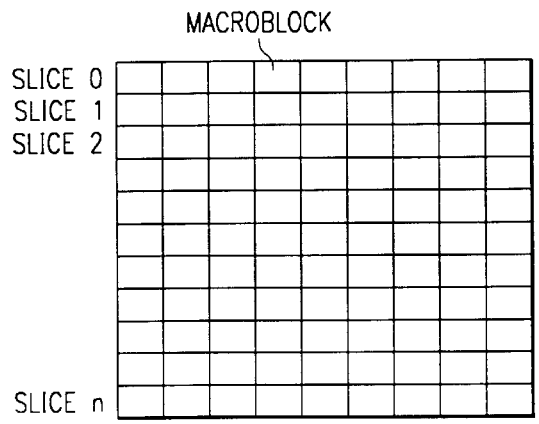
FIGS. 49–52 show decoding buffering.

In video coding, for example, a frame to be encoded is decomposed into a set of macroblocks (see FIG. 49). Under the consideration of the smallest memory requirement, a coding unit here is normally defined as macroblock, which consists of a 16×16 pixel luminance area and the corresponding chrominance areas depending on the chroma format (4:2:0, 4:2:2:, or 4:4:4). Certainly, a slice (a row of macroblocks in a frame) or even the frame itself can be treated a coding unit if there is enough memory.

Figure 50:
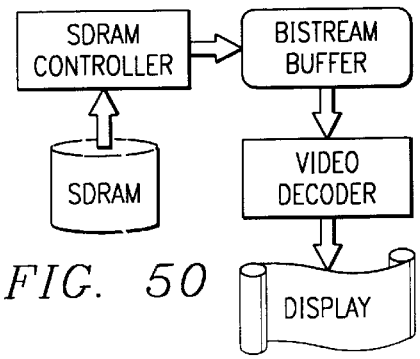

FIG. 50 depicts the video playback on a preferred embodiment digital still camera (DSC). In DSC applications, the video bitstream is pre-captured and stored on the high-capacity SDRAM, and the video decoder is built on the DSP. Since it is extremely expensive for the decoder to directly access the SDRAM, an on-chip bitstream buffer is opened on the DSP internal memory. The bitstream is first loaded from SDRAM to the bitstream buffer through the SDRAM, then the decoder uses the bitstream in the bitstream buffer to reconstruct video. Since the bitstream loading is achieved by using DMA (Direct Memory Access), which can run in the background without intervention of a CPU, the bitstream loading overhead is mainly due to time used for setting up registers for the DMA transfer.

There are two basic requirements in terms of bitstream buffer management. First of all, the buffer size should be big enough to cover the worst case. For example, in video coding, the theoretically maximal number of bits for encoding a macroblock could be 256 words (one word here is defined as two bytes). Although this worst case is very rare, the bitstream buffer size has to be 256 words in order to be at the safe side. Secondly, the bitstream buffer should never underflow, that is, the buffer management should guarantee that the bitstream for a coding unit is available when it is being decoded.

There are different schemes to satisfy the second requirement. The simplest one would be to check the decoding position in the bitstream buffer at each buffer access. The bitstream buffer is re-filled whenever the decoding position is out of the valid buffer range. Because the decoding is a bit by bit operation, this scheme is not realistic: it spends too much overhead in deciding when to re-fill the buffer.

Figure 51A:
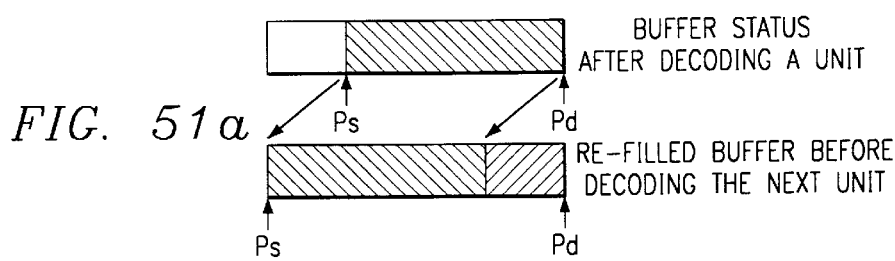

A realistic scheme is the linear shifting buffer scheme as shown in FIG. 51a. In this scheme, the bitstream buffer is linearly accessed by the decoder from left to right, after decoding a unit the rest of the bitstream is shifted forward to the beginning of the buffer, then the buffer is re-filled to "full" before decoding the next unit. In FIG. 51a, Ps and Pd denote the current decoding position and the bitstream end position in the bitstream buffer, respectively.

This buffer scheme has two disadvantages. First, since the buffer size is much larger than the average number of bits of the decoding units, a lot of time will be spent on the bitstream shifting. For instance, in video decoding the buffer size is 256 words to cover the worst case, but on average a unit may only use 16 words, this means about 240 words of shifting for each unit. The second disadvantage is that it requires a bitstream loading after decoding each unit; this costs additional overhead because time has to spent on issuing the DMA transfers.

Figure 51B:
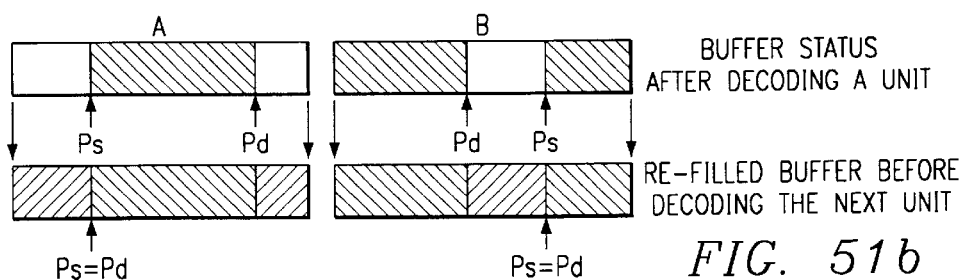

A better buffer management scheme is so-called quasi-circular buffer scheme as shown in FIG. 51b. In this scheme, the decoder accesses the bitstream buffer in a circular manner. This avoids the bitstream shifting required by the linear buffer scheme. There are two cases after decoding a unit. This first case is in the lefthand portion of FIG. 51b: the rest of bitstream is located in the middle of the buffer. In this case, the buffer is filled by loading the bitstream twice, one for the right end followed by the other one for loading the left end. (Note: if the bitstream loading can write the bitstream into the bitstream buffer in a circular manner, only one load is needed; however, this is not always the case.) The second case is shown in the righthand portion of FIG. 51b, in which only the middle of the buffer needs to be filled.

The quasi-circular buffer scheme is much more efficient than the linear shifting buffer because it avoids bitstream shifting, but it still suffers from a disadvantage that one or two bitstream loads are needed after decoding each unit. The following preferred embodiment hybrid circular-double buffer scheme solves this problem.

Figure 52:
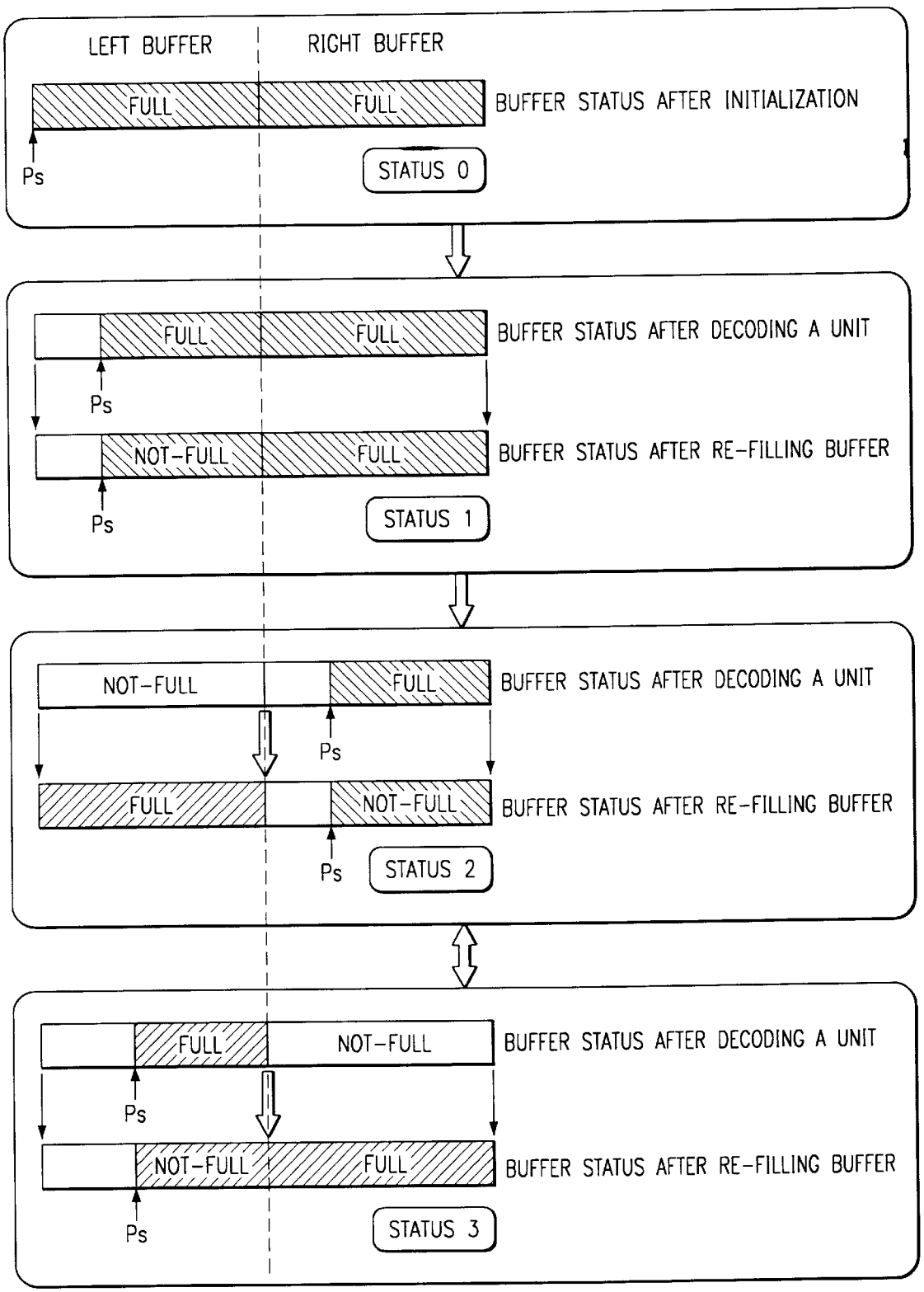

FIG. 52 status 0 shows a hybrid circular-double buffer containing two buffers of equal size; namely, the left buffer and the right buffer. There is a flag for each buffer to indicate the buffer fullness ("full"/"not-full"). Ps points to the current decoding position after decoding a unit. In terms of buffer size, each buffer covers the worst case of decoding coding units, this makes the hybrid buffer size twice of a linear shifting buffer or a quasi-circular buffer. Unlike a traditional double buffer, the two buffers here have a continual memory allocation, i.e. the left buffer is directly followed by the right buffer in the memory map. The decoder accesses the hybrid buffer in a circular manner.

The preferred embodiment hybrid buffer operates through the following four statuses:

Status 0: the initialization status, both the left and right buffers are fully loaded and set to "full", Ps points to the beginning of the hybrid buffer.

Status 1: after decoding the first unit, change the left buffer flag to "not-full".

Status 2: after decoding a unit, if the current decoding position Ps is in the right buffer and the left buffer flag is "not-full", fully load the left buffer and set the left buffer flag to "full". In addition, if the right buffer flag is "full", change it to "not-full". Otherwise, no action is taken.

Status 3: after decoding a unit, if the current decoding position Ps is in the left buffer and the right buffer flag is "not-full", fully load the right buffer and set the right buffer flag to "full". If the left buffer flag is "full", change it to "not-full". Otherwise, no action is taken.

Taking the preferred embodiment platform (e.g., FIG. 1b) as an example (where data is in 16-bit units), define the following data type:

```
typedef struct bitstream {
    SInt bit_ptr;       /* current bit position (0 ~ 16) */
    SInt Ps;            /* current decoding position in bitstream buffer */
    SInt left_flag;     /* left buffer flag "full / not-full" */
    SInt right_flag;    /* right buffer flag "full / not-full" */
    USInt *databuf;     /* bitstream buffer */
    Long Addr_SDRAM;    /* bitstream address in SDRAM */
} Bitstream;
```

The pseudo code shown in Table 1. describes the hybrid circular-double buffer scheme. Function BufferInitialization( ) is called only once at the beginning of decoding, while function BitstreamBufferUpdate( ) is called after decoding each coding unit, it automatically updates the buffer flags and re-loads the buffers if the conditions become true. In Table 1 BUFSIZE stands for the buffer size of the hybrid circular-double buffer.

TABLE 1

Pseudo code for the hybrid circular-double buffer scheme

```
Void BufferInitialization(
    Bitstream *stream,      /* pointer of bitstream  */
    )
{
    /*====================================================*/
    /* Initialization of the hybrid circular-double buffer */
    /*====================================================*/
    LoadBuffer(&stream->databuf[0], stream->Addr_SDRAM,
        BUFSIZE);
    stream->Addr_SDARM +=BUFSIZE;
    stream->left_flag = "full";
    stream->right_flag = "full"
    stream->Ps = 0;
    stream->bit_ptr = 16;
}
Void BitstreamBufferUpdate(
    Bitstream *stream,      /* pointer of bitstream  */
    )
{
    /*====================================================*/
    /* Update the left buffer if necessary                */
    /*====================================================*/
    if (stream->left_flag =="not-full" && stream->Ps >=BUFSIZE/2)
    {
        LoadBuffer(&stream->databuf[0],
            stream->Addr_SDRAM, BUFSIZE/2);
        stream->Addr_SDARM +=BUFSIZE/2;
```

TABLE 1-continued

Pseudo code for the hybrid circular-double buffer scheme

```
        stream->left_flag = "full";
    }
    /*====================================================*/
    /* Update the right buffer if necessary               */
    /*====================================================*/
    if (stream->right_flag =="not-full" && stream->Ps <BUFSIZE/2)
    {
        LoadBuffer(&stream->databuf[BUFSIZE/2],
            stream->Addr_SDRAM, BUFSIZE/2);
        stream->Addr_SDARM +=BUFSIZE/2;
        stream->right_flag ="full";
    }
    /*====================================================*/
    /* Update the left buffer flag                        */
    /*====================================================*/
    if (stream->left_flag =="full" && stream->Ps <BUFSIZE/2)
        stream->left_flag ="not-full";
    /*====================================================*/
    /* Update the right buffer flag                       */
    /*====================================================*/
    if (stream->right_flag =="full" && stream->Ps >=BUFSIZE/2)
        stream->right_flag ="not-full";
}
```

As it can be seen in BitstreamBufferUpdate( ) in Table 1, the left buffer or right buffer is not reloaded after decoding each unit, but is loaded only if the opposite buffer (left/right) is in use and its buffer flag is "not-full". This greatly reduces the number of buffer loads. Consider the video coding as an example. This needs BUFSIZE of 512 words if a macroblock is the unit, the average bitstream size of a unit is assumed to be 16 words. Because the linear shifting buffer and the quasi-circular buffer re-fill the buffer after decoding each unit, the average loading length for those two schemes is also 16 words. Compared with the fixed loading length of 256 words in the hybrid circular-double buffer scheme, the preferred embodiment reduces the loading overhead by a factor about 16 (i.e. 256/16).

Mini-experiments compared the three buffer schemes discussed above. The video sequence used was coastguard (352×288, 300 frames, 4:2:0). The bitstream is generated by using a MPEG1 video encoder. The target bit-rate is 3 Mbit/s, I-frame only. The same decoder with three different buffer schemes are used to decode the same bitstream, the buffer loading count and word shifting count are recorded during the decoding. The performance comparison among the three buffer schemes is listed in Table 2. As shown in Table 2, for each macroblock the linear shifting buffer scheme requires one buffer load, and on average about 240 words of shifting. The quasi-circular buffer scheme needs slightly more buffer loads (1.06 load/macroblock) but no shifting. The preferred embodiment hybrid circular-double buffer scheme used only about 0.0619 buffer load per macroblock. On the preferred embodiment platform of FIG. 1b in particular, the preferred embodiment scheme provides a cycle count reduction ratio of about 113 and 17 in comparison to the linear shifting buffer scheme and the quasi-circular buffer scheme, respectively.

TABLE 2

Performance comparison among three buffer schemes on TMS320DSC21 platform

| | Linear shifting buffer | Quasi-circular buffer | Hybrid circular-double buffer |
|---|---|---|---|
| Buffer size (words) | 256 | 256 | 512 |
| Number of loads per macroblock | 1.00 | 1.06 | 0.0619 |
| Number of word shifting per macroblock | 240.15 | 0 | 0 |
| Overhead per load (cycles) | 80 | 80 | 80 |
| Cycle count per word shifting | 2 | 2 | 2 |
| Total cycles used for bitstream buffer per macroblock | 560.30 | 84.72 | 4.95 |
| Cycle count ratio vs. the hybrid circular-double buffer scheme | 113.19 | 17.12 | 1.00 |

Onscreen Display and Graphics Acceleration

Figure 15:
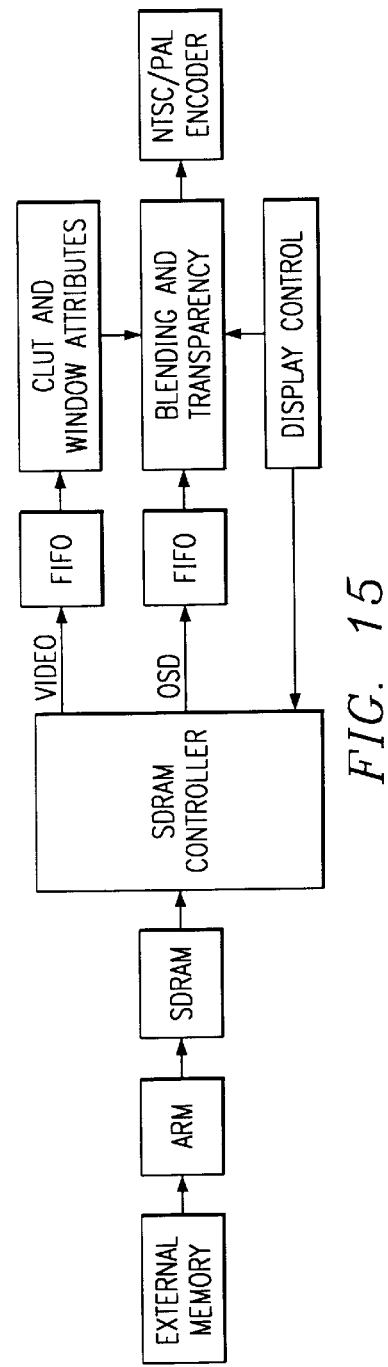
FIG. 15 is an on screen display block diagram.

The Onscreen display (OSD) module 105 is responsible for managing OSD data from different OSD windows and blending it with the video. It reads OSD data from SDRAM 160, and outputs to NTSC/PAL encoder 106. The OSD module defaults to standby mode, in which it simply sends video to NTSC/PAL encoder 106. After being configured and activated by ARM CPU 130, the OSD module reads OSD data and mixes it with the video output. ARM CPU 130 is responsible for turning on and off OSD operations and writing the OSD data to the SDRAM. FIG. 15 shows the block diagram of the OSD module and affiliated other items. The various functions of the OSD are described in the following paragraphs.

OSD data storage. The OSD data has variable size. In the bitmap window, each pixel can be 1, 2, 4, or 8 bits wide. In the YCrCb 4:2:2 window, it takes 8-bit per components, and the components are arranged according to 4:2:2 (Cb/N/CrY . . . ) format. In the case where RGB graphics data needs to be used as OSD, the application should perform software conversion to Y/Cr/Cb before storing it. The OSD data is always packed into 32-bit words and left justified. Starting from the upper left corner of the OSD window, all data will be packed into adjacent 32-bit words.

Setting up an OSD window. An OSD window is defined by its attributes. Besides storing OSD data for a window into SDRAM by ARM CPU 130, the application program also needs to update window attributes and other setup in the OSD module as described in the following subsections.

Location register. The Location register contains X and Y locations of the upper left and lower right corners of each window. The application program needs to set up the CAM and enable selected OSD windows; see FIG. 16.

Color look up tables. The OSD has the fixed 256-entry color look up table (CLUT). The CLUT is used to convert bitmap data into Y/Cr/Cb components. In the case of 1,2 or 4 bitmap pixels, the CLUT can be determined by CLUT registers.

Blending and transparency. Color blending on the pixel level is also supported. This feature is available for the bitmap displays only (Window1,2). If the window color blending is enabled, the amount of blending of each pixel is determined by the blinding factor. As shown in the following table, the window blending supports 5 different levels, according to the selected blending factor. The hardware also supports a transparency mode with bitmap. If transparency is enabled, then any pixel on the bitmap display that has a value of 0 will allow video to be displayed. Esentially, 0-valued pixels are considered the transparent color, i.e. the background color will show through the bitmap. The Table shows the connection between transparency and blending on the same window.

| Transparency | Blend Factor | OSD window contribution | Video contribution |
|---|---|---|---|
| OFF | 0 | 0 | 1 |
| | 1 | ¼ | ¾ |
| | 2 | ½ | ½ |
| | 3 | ¾ | ¼ |
| | 4 | 1 | 0 |
| ON | | if pixel value = 0 | if pixel value = 0 |
| | 0 | 0 | 1 |
| | 1 | ¼ | ¾ |
| | 2 | ½ | ½ |
| | 3 | ¾ | ¼ |
| | 4 | 1 | 0 |

Hardware cursor. A rectangular shape is provided using hardware window1. With window1, the cursor always appears on top of other OSD Windows1. The user can specify the size, color of the shape. When hardware window1 is designated as the cursor, only two windows are available for the OSD application. If a hardware cursor is not used, then the application can use window1 as a regular hardware window. FIG. 17 shows an example of the hardware cursor.

DSP Subsystem

The DSP subsystem consists of C54x DSP, local memory blocks, iMX and VLC accelerators, shared image buffers, and the multiplexers implementing the sharing.

C54x is a high performance, low power, and market proven DSP. cDSP hardware and software development tools for C54x are also very mature.

The DSP carries out auto exposure, auto focus, auto white-balancing (AE/AF/AWB) and part of the image pipeline tasks. It also handles SDRAM transfer and drives the accelerators to implement the rest of image processing and image compression tasks. Flexibility and ease of programming in the DSP enables camera makers to refine the image processing flow, adjust quality-performance tradeoffs, and introduce additional features to the camera.

The configurable DSP (cDSP) design flow is adopted to allow flexibility and design reuse. The memory blocks time-shared among DSP and accelerators are large enough for one processing unit (16×16 pixels) and provide zero-wait state access to DSP.

Features
Fixed-point Digital Signal Processor
100 MIPs LEAD2.0 CPU
On-module RAM 32 K×16 bit
(4 blocks of 8 K×16 bit dual access program/data RAM)
Multi-Channel Buffered Serial Ports (McBSPs)
ARM can access RAM via Enhanced 8-bit Host Port Interface
One hardware timer
On-chip Programmable PLL
Software Programmable Wait-State Generator
Scan-based emulation and JTAG boundary scan logic FIG. 18a shows more details on the DSP subsystem and in particular the details of the connection between the DSP and the iMX and VLC. FIG. 18b is the memory map.

The shared memory blocks A and B occupy two 2 K word banks on the DSP's data memory space. Each block can be accessed by DSP, iMX, VLC, and SDRAM controller depending on static switching controlled by DSP. No dynamic, cycle-by-cycle, memory arbitration is planned. DSP's program should get seamless access of these memory blocks through zero-wait-state external memory interface.

The configuration memory blocks, for iMX coefficient, iMX command, VLC Q-matrix, and VLC Huffman table, also connect to DSP's external memory interface. They are also statically switched between the specific module and DSP. Typically at power-up or at initial stage of camera operation mode, these memory blocks are switched to DSP side so DSP can set up the appropriate configuration information for the operation. Then, they are switched over to iMX and VLC for the duration of operation.

Imaging Extension (iMX)

iMX, imaging extension, is a parallel MAC engine with flexible control and memory interface for extending image processing performance of programmable DSPs. iMX is conceived to work well in a shared memory configuration with a DSP processor, such that flexibility, memory utilization, and ease of programming are achieved. The architecture covers generic 1-D and 2-D FIR filtering, array scaling/addition, matrix multiplications (for color space transform), clipping, and thresholding operations.

Figure 19:
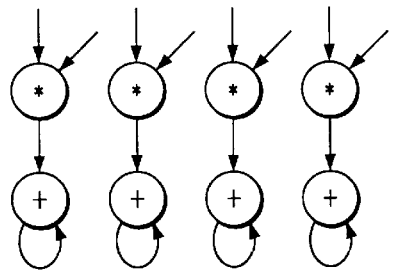
FIG. 19 shows parallel multiply-accumulate datapath.

For digital still cameras, iMX can be used to speed up
CFA interpolation,
color space conversion,
chroma down-sampling,
edge enhancement,
color suppression,
DCT and IDCT,
Table lookup.

iMX methodology originates from the discipline of parallel processing and high performance computer architecture. The design comprehends the need for a scalable MAC engine. iMX in the first preferred embodiment incorporates 4 MAC units; see FIG. 19. Alternative preferred embodiments upgrade to 8 MAC units or more. Software can be structured so that the hardware upgrade will not incur substantial software changes.

Much flexibility of iMX is due to parameter-driven address generation and looping control. Overall efficiency comes from efficient pipelining control inside iMX as well as the system-level memory buffering scheme. iMX works best for block-based processing. To facilitate this, the datapath needs to connect to data input/output and coefficient memory. iMX contains data input, data output, and coefficient memory ports, and allows arbitration among these ports. This eliminates the need for dedicated memory blocks, and brings more flexibility and better memory utilization on the system level. These memory blocks are accessible as DSP data memory to facilitate data exchange.

Figure 20:
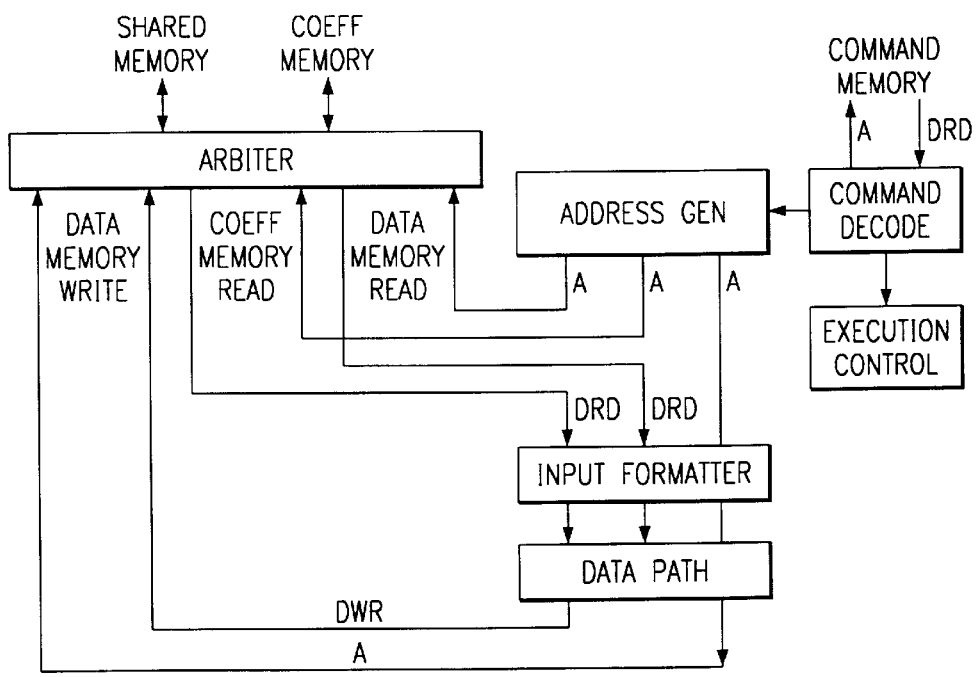
FIG. 20 shows a coprocessor architecture.

There is a separate command memory that feeds a command decode unit in iMX. The command memory should be specified to fit all the accelerated steps in our reference image pipeline algorithm, so that this sequence of commands can be executed with little intervention from DSP.

iMX block diagram appears in FIG. 20. A command decode subblock reads and decodes commands, and drives static parameters, one set per command, to the address generator. Address generator then computes looping variables and data/coefficient/output pointers, and coordinates with execution control, which handles cycle-by-cycle pipelining control. Address generator sends data and coefficient read requests to the arbiter. Arbiter forwards the requests to the data/coefficient memory. Data read back from memory go to the input formatter, which takes care of data alignment and replication. Formatted data and coefficients are then provided to the datapath, which mainly consists of the 4 MAC units. Output from datapath is routed to arbiter for memory write.

iMX communicates to DSP via shared memory (for data input, coefficient, data output, command) and via memory-mapped registers (start command, completion status). All data buffers and memory blocks are single-ported, and are switched to one party or another via static control, rather than on-line arbitration.

In a typical application, DSP would place filter coefficients, DCT/IDCT cosine constants, and lookup tables in the coefficient memory, and put iMX commands in the command memory. DSP then turns over access to these memory blocks to iMX. These memory blocks are sized adequately for our reference design to fit all needed coefficients and commands for a major camera operation mode (e.g., image capture). Any update/reload should occur very infrequently. In case either or both memory blocks run out of space, paging can be performed.

DSP manages the switch network so that, to iMX, there is only one data buffer. During run time, DSP switched the A/B buffers among itself, iMX. VLC, and SDRAM controller to implement data passing.

Figure 21:
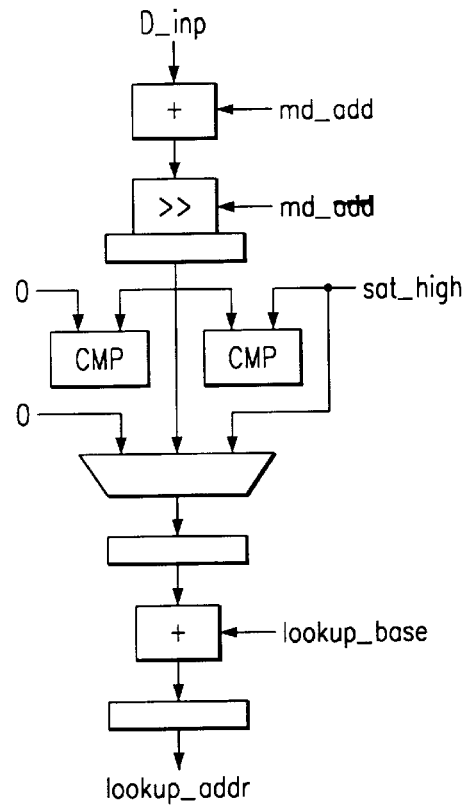
FIG. 21 illustrates a look-up table accelerator.

FIG. 21 illustrates a simple table lookup accelerator with input rounding/clipping capability used to speed up the image pipeline on the DSP. This is carried out with a very simple control structure and datapath.

VLC Engine

VLC accelerator is a coprocessor optimized for quantization and Huffman encode in the context of JPEG compression and MPEG compression. It operates with quantizer matrices and Huffman tables preloaded by DSP, via shared memory blocks. Aggressive pipelining in the design achieves very high throughput rate, above 30 million DCT coefficients for compression.

VLC's working memory, including quantizer matrices, Huffman tables, and data input/output memory, are all shared memory blocks.

VLC Functionality

Basically, VLC covers Quantization, zigzag scan, and Huffman encode for JPEG encode (baseline DCT, 8-bit sample), with up to 4 quantizer matrices (stored as invq[i, j]=$2^{16}$/q[i,j]) and 2 encode Huffman tables all loadable. Can process one MCU that contains up to 10 blocks. Each block consists of 8×8=64 samples.

Quantization, zigzag scan, and Huffman encode for MPEG-1 video encode. One macroblock, with up to six 8×8 blocks, can be processed. Number of blocks and within them, number of luminance blocks, can be specified. Huffman encode can be bypassed to produce quantized and zigzag-ordered levels.

The accelerator requires memory blocks for input/output buffer, quantization matrices and Huffman encode tables. The memory configuration should be sufficient to support normal encode operations, one JPEG MCU (minimum coding unit), or MPEG macroblock per call.

Both input and output must fit the 2 K words (1word= 16-bit) shared memory buffer (A or B). MCU or macroblock has maximally ten 8×8 blocks, or 640 input words. Compressed output data is typically smaller than input size.

JPEG Huffman encode table takes up (12×176)×32-bit, or 384 words per table. JPEG standard allows 2 tables, so taking totally 768 memory words. MPEG tables are hardwired into VLC and do not take up memory. We have allocated 2 K words for the Huffman tables.

The quantizer matrix memory, 512 words by 16-bit, allow for 8 quantizer matrices to coexist, each taking 64×16-bit. JPEG allows for 4 matrices, and MPEG encode requires 2 matrices.

Figure 22:
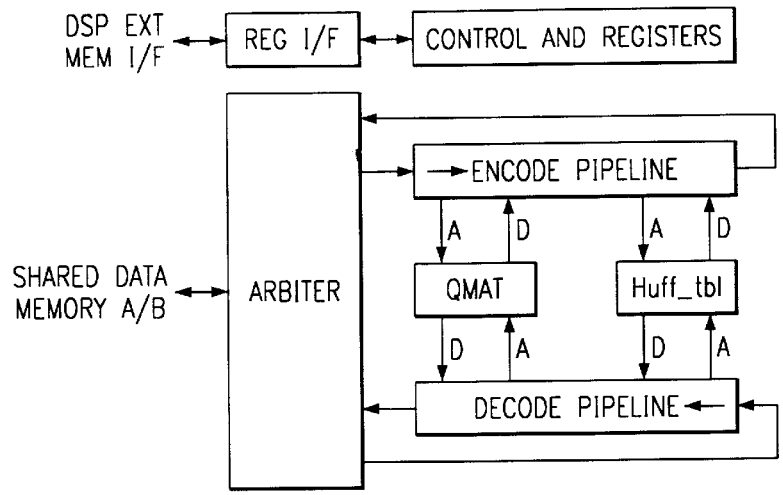
FIG. 22 is a block diagram of a variable length coder.

FIG. 22 shows the major subblocks of VLC. Only the encode path is implemented in one preferred embodiment VLC module; alternative preferred embodiments incorporate the decode path into the module.

ARM Subsystem

ARM microprocessor 130 handles system-level initialization, configuration, user interface, user command execution, connectivity functions, and overall system control. ARM 130 has a larger memory space, better context switching capability, and is thus more suitable for complex, multi-tasking, and general processing than DSP 122. Preferred embodiments integrate an ARM7 cTDMI core; see FIG. 1b. ARM7 core is specified up to at least 40 MHz. The ARM subsystem will also have a 32 Kbytes local static RAM 132.

ARM processor 130 is connected to all the DSC peripherals including CCD Controller, TV encoder, preview engine, IrDA, USB, Compact Flash/Smart Media, UART, etc.

ARM processor 130 is involved with the management of CCD incoming raw data and intermediate data to the SDRAM and LCD. Connected to all I/O devices, the ARM manages and is responsible for the smart devices such as USB, IrDA, Compact Flash/Smart Media, and UARTS. The four basic operation modes of PREVIEW, CAPTURE, PLAYBACK, and BURST are initiated by requests from the ARM. The ARM will then monitor the device for completion of the request and in some cases will manage data after the request is completed.

After RESET and before any of the camera operations can occur, the ARM must perform several housekeeping tasks. The intial task is known as the BOOT operation task. This function not only initializes the I/O and peripherals to a known state, it also must prepare, load and start DSP 122. This sequence begins by reading the DSP boot code from the flash, loading the DSP code memory and then releasing the DSP from its HOLD state. Additional DSP code is loaded into the SDRAM in a format the DSP can then read and overlay into its code space without ARM intervention.

ARM SDRAM Interface

ARM has two types of access to the SDRAM (1) through SDRAM buffer (burst read/write) and (2) direct access to the SDRAM with a higher latency—4 cycle READ, 6 cycle WRITE. The direct access to memory can be word, half word or byte access.

The ARM/SDRAM controller interface also has a 32 byte buffer. The SDRAM burst request first fills this buffer and ARM reads and writes from/to this buffer.

ARM External Memory Interface

ARM 130 connects to the external memory through the External memory interface module. ARM 130 connects to the Compact Flash/Smart media through this interface. ARM 130 also connects to the off chip flash memory through this interface. DMA block (FIG. 1b) enhances the ARM to CF/Smart media transfer.

ARM/DSP BOOT Sequence

The DSP BOOT sequence begins after a power up or after a COLD START. In this state, DSP 122 is in a HOLD condition waiting on initialization from ARM 130. The ARM checks DSP status registers to assure the DSP is in a HOLD state. The ARM programs the DSP boot code data to the DSP code memory from the FLASH. The code is organized in logical overlays that allow the ARM to select the proper code for the function needed, in this case BOOT code.

The ARM loads the DSP code using the HPI Bridge (HPIB) interface. This interface can be programmed to access in either 8-or 16-bit width. For BOOT purposes, this will always be a 16-bit access.

After the code is loaded, the ARM signals the DSP to begin by releasing the HOLD. The DSP then begins its reset sequence from an address of DSP 7F80h which is in the DSP RESET vector area. Upon completion of the RESET sequence, the DSP then branches to DSP FF80h, which is the beginning of the BOOT program loaded by the ARM.

Figure 23A:
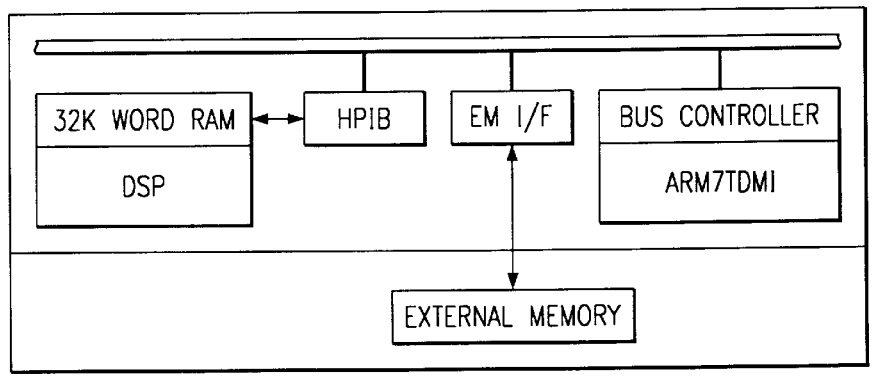
FIGS. 23a–23c show a bridge.

FIG. 23a shows the data paths used in the ARM/DSP boot sequence as well as data, request and command exchanges discussed later.

Capture Mode

ARM 130 programs CCD controller 102 to capture an image. The CCD controller auto transfers the image data to SDRAM and interrupts the ARM using IRQ1 when the transfer is complete. The ARM then notifies the DSP the RAW picture data is available to crunch. When the processing of the raw data is complete, the DSP signals the ARM the task is finished.

Preview Mode

The CCD will be programmed for a 30 fps high frame rate but reduced resolution vertically. The reconfiguration of the CCD and TG (timing generator) will cause the raw picture data to go to preview engine 104. The DSP will post process the data in SDRAM and prepare parameters for FOCUS, EXPOSURE and WHITE BALANCE. The ARM is signaled by the DSP when new adjustment parameters are ready and those corrections are applied by the ARM. The transferring of the correction parameters use the same communication interrupt architecture as previously mentioned and are expected to be at the current frame rate.

Burst Mode

The burst mode timing is based on the ARM clocking the picture rate from application parameters. Similar to a cross between Capture and Preview modes, the ARM programs the CCD for a capture that stores a compressed image into SDRAM through the compression engine. As in Preview mode, the ARM receives adjustment parameters from the DSP to make corrections of FOCUS, EXPOSURE and WHITE BALANCE.

Idle Mode

ARM may use an idle mode to receive correction parameters from the DSP during periods preceding other camera modes. If not in a power down situation, this time of 10–15 frames will allow the DSP-to-ARM correction loop to make auto corrections on FOCUS, EXPOSURE and WHITE BALANCE. This idle mode will simulate Preview mode for the purposes of obtaining a stable correction.

ARM/DSP Communication

The communication between ARM 130 and DSP 122 is via the HPIB (Host Port Interface Bridge). The HPIB physically connects the DSP (a C5409 type DSP) ports and BUSC (BUS Controller) 134. The ARM accesses the DSP memory by programming the HPIB, opening a 32 k-word window into the DSP memory map. The map contains the data structures shared by the ARM and DSP for command request's, acknowledgements and datagrams.

The HPIB contains five sub-blocks. They are the interface, timing generator, DSP control registers, and interrupt hold sections.

The interface section receives and stores data from BUSC 134 and transfers it to and from the C5409. This interface can be an 8- or 16-bit data path to the C5409 and is 16-bit to the BUSC. An added feature is the ability to exchange the upper and lower byte if programmed to do so.

The timing generator makes signals HBIL and HDS and detects signal HRDY. HBIL is the HPI byte identification signal to the C5409. The HDS is the data strobe signal to the C5409 and the HRDY is the ready signal read from the C5409.

The interrupt hold section will detect the HINT level and make the INTC pulse synchronized with the ARM clock. The module will also set the HOLD port of the C5409 and detect HOLDA.

In 8-bit mode, address data from the ARM will not reach the C5409. The address is used only if the C5409 internal memory is selected. Therefore, the ARM must set the address in the HPIA register before sending or receiving data to the 32 Kword DARAM. The 8-bit mode may also be used for ARM<->DSP handshaking. The ARM will use the HINT bit in the HPIC register to interrupt the C5409.

In 16-bit mode, the HPIA/HPIC/HPID are not used. The ARM can access the C5409 internal memory as if it exists in the HPIB module. This mode will deliver faster performance, but does not support the HANDSHAKE signals because of these are routed in the HPIC register.

Figure 23B:
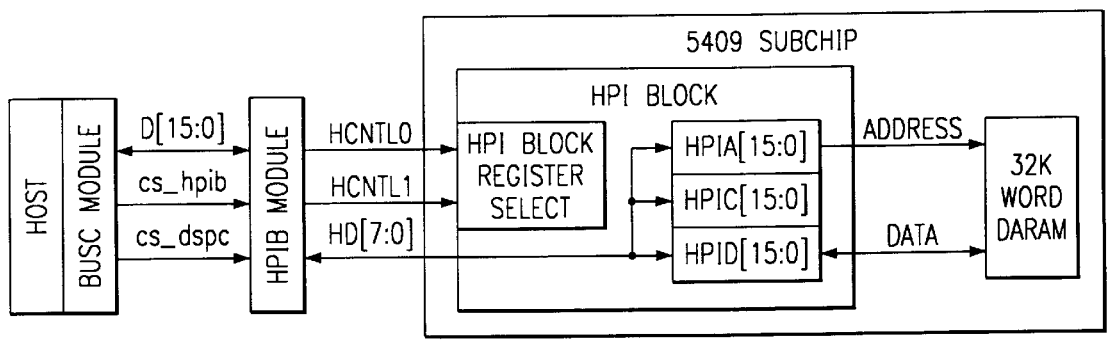

FIG. 23b shows the signals and paths for the ARM to reach the C5409 DARAM.

Figure 23C:
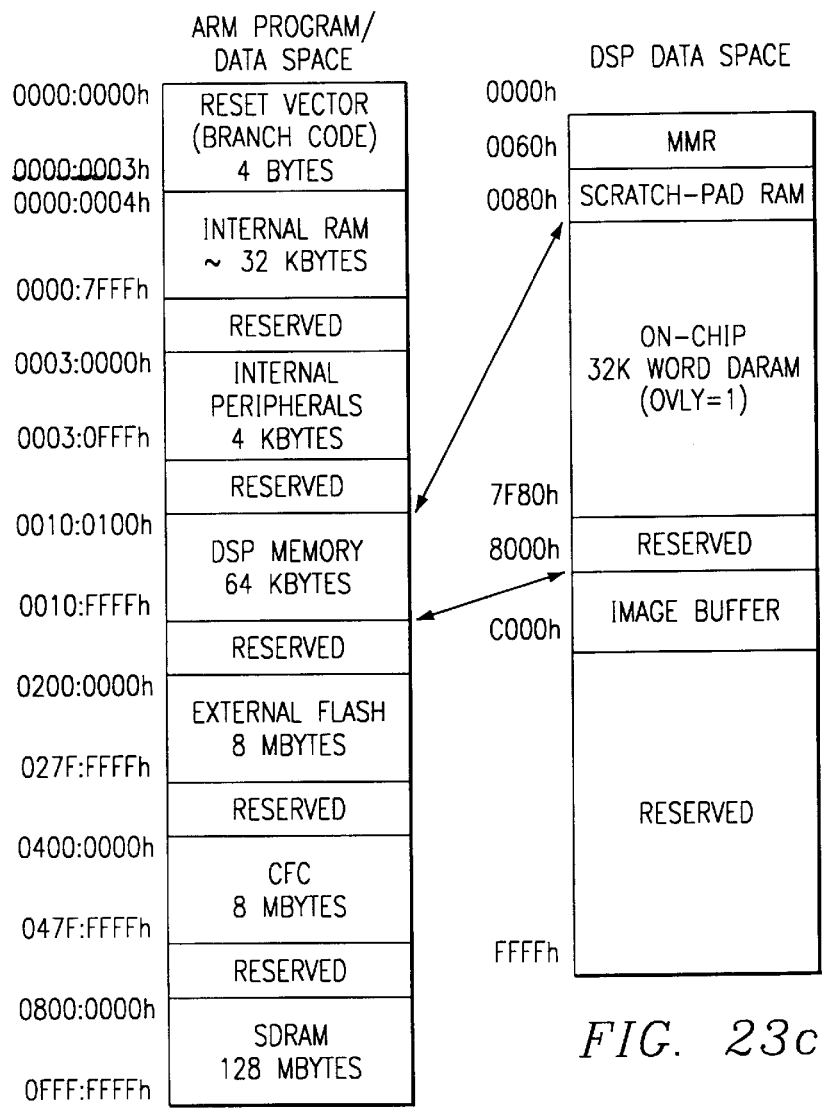

FIG. 23c indicates the shared memory map between the ARM (HOST) and the C5409 processor. When the ARM selects the memory area, "DSP Memory", BUSC takes cs_hpib signal active. The ARM can now access the DSP internal memory (32 kword DARAM+HPIA+HPIC+HPID).

When the ARM selects the "DSP Controller" area, BUSC takes cs_dspc signal active. The ARM is now accessing registers related to the C5409.

Multi-processing Debugging Environment

Figure 24:
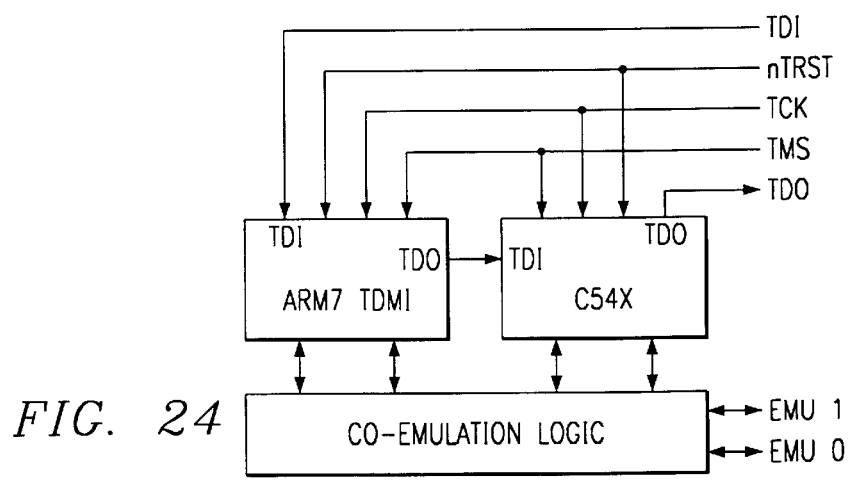
FIG. 24 shows multiprocessor debugging support.

The preferred embodiment integrates ARM 130 and DSP 122 and thus multi-processing and thus requires debugging and development support. The preferred embodiment accomplishes this with a single JTAG connector 170 with additional emulation logic as illustrated in FIG. 24.

Input/Output Modules

The input/output module provides the different interfaces with the DSC peripherals as follows.

TV encoder 106 produces NTSC/PAL and RGB outputs for the LCD display and TV.

CCD/CMOS controller 102 generates timing signals VD/HD, can synchronize on externally generated HDND signals (#0 of MODESET register, #0 of SYNCEN register), supports progressive scan and interlaced CCDs, generates black clamping ontrol signals, programmable culing pattern 9CULH, CULV registers), 1 line/2 line alternating fields, MCLK (generated by CCD module), WEN (WRQ on TG, active-high) indicates CCD controller writing data to SDRAM, TG serial port interface (clk, data, TG chip select) is controlled by GIO pins, Iris, mechanical shutter, focus and zoom are controlled by GIO pins.

USB 142 from programmer's perspective consists of three main parts: FIFO controllers, UDC controller, and UDC core. USB configuration: INTERFACED0 ALT0 END-POINT0: CONTROL; INTERFACE0 ALT0 ENDPOINT1: BULKIN; INTERFACE0 ALT0 ENDPOINT1: BULKOUT; INTERFACE1 ALT0 ENDPOINT2: ISOIN; INTERFACE2 ALT0 ENDPOINT3: INTERRUPT IN. Buffer configuration: SUB module has six FIFOs inside; each FIFO is of the same construction, except for direction and buffer size; USB module has only one unified memory for all endpoints; buffer sizes are programmable as long as all buffers fit inside the memory.

Figure 25:
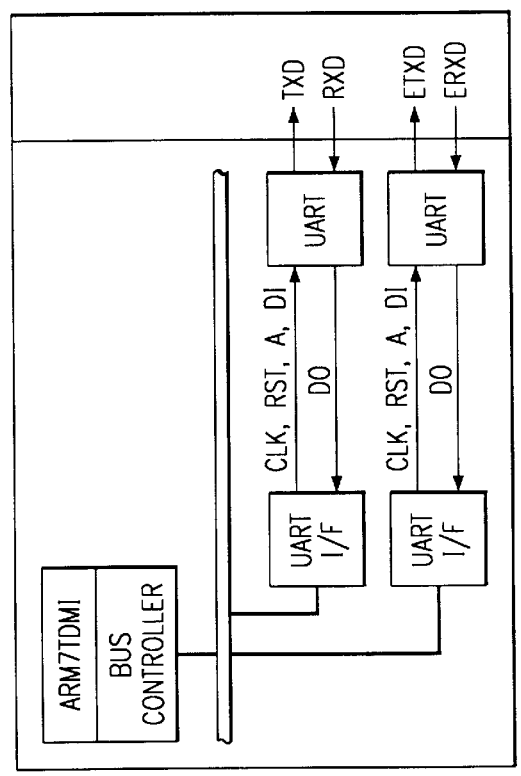
FIG. 25 illustrates UART connections.

UART part of I/O block 140, supports start/stop communication protocol, detects parity errors (supporting dta length of 7 or 8 bits with even, odd, or no parity and 1 or 2 stop bits), has 32 bytes of FIFO for both transmitter and receiver, generates interrupts for a FIFO overflow or a time-out is detected on data receiving. ARM 130 control UART modules. There are seven 16-bit width registers which are accessible from ARM 130: data transmitter/receiver register (FIFO), bit rate register, mode register, FIFO control register for receiver, FIFO control register for transmitter, line control register, and status register. FIG. 25 is a block diagram.

Figure 26:
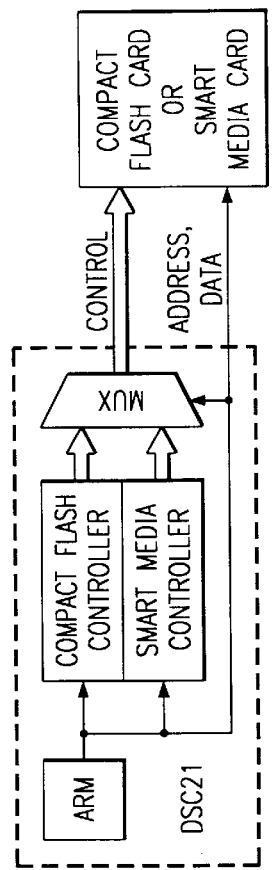
FIG. 26 is a block diagram of flash card/smart card interface.

Compact Flash/Smart Media interface 180 is used to save/store image or user's data to a compact flash card or smart media; see FIG. 26. The interface supports two kinds of operation modes for register setting and data transfer: memory mapped mode and I/O mode. An ARM 130 interrupt is generated for card detection while a compact flash card is being plugged or unplugged. The pins for both the smart media and the compact flash control interfaces are overlapped and can be switched by ARM 130 depending on product needs; see FIG. 26.

In particular, the compact flash controller has registers mapped to the ARM memory space. The compact flash controller is responsible for generating the related control signals to the interface pins, and writes at 420 KB/s and reads at 2.0 MB/s. SDRAM can be utilized for storing at least one picture and an attempt to write to the compact flash with a big sector count, as done in a DOS machine, will invoke the fast write performance.

In contrast, the smart media controller has five register settings: command register, address1 register, address2 register, address3 register, and data port register. These five registers are mapped to the ARM memory space, and smart media controller wil generate the related signals for different register access automatically.

Audio input/output may be through the serial port of I/O block 140 with DSP buffering.

Infrared data access (IrDA) is supported by a fast FIR core and part of I/O block 140.

Block 140 also contains general purpose input/output which can support items such as CCD/CMOS imager module control for tuning AGC gain and electronic shutter, RTC control, battery power detection which can generate inner interrupt to the ARM for appropriate system response, camera lens motor control for focus and zoom, a user keypad input, LED indicators, flash light control, and power management control.

iMX Programming

DSP 122 instructs iMX 124 to perform tasks by sending iMX commands. These commands can be complex jto understand and contain many parameters that are fixed in the inner loops. The dieal model is to provide separate command building and command-transfer routines to the DSP progrmmer, so that the commands can be pre-constructed outside the loop, and transferred to iMX as generaic data memory moves inside the loop. Commonly used iMX commands are prepackaged in C code to ease the programming.

ARM/DSP Task Allocation

ARM 130 runs an operating system such as Windows CE, controls low frequency, synchronous input/output (such as to a compact flash card (CFC), and controls user interactions which also are slow and all the peripheral modules control preview engine, burst mode compression, TV encoder, CCD controller, USB, CF, IrDA, etc.

DSP 122 runs an operating system such as SPOX, controls all real-time functions (auto focus, auto exposure, auto white balance), real-time input/output (audio IO, modem IO), real-time applications (e.g., audio player), computational expensive signal processing tasks (image pipeline, JPEG 2000, image stitching).

Pin Description of Integrated Circuit Chip

The preferred embodiment pins are as follows

CCD SENSOR
Pin Count: 16

| | | |
|---|---|---|
| 1.C_PCLK | (I) | Pixel clock |
| 2.C_VSYNC | (I/O) | Vertical sync |
| 3.C_HSYNC | (I/O) | Horizontal sync |
| 4.C_FIELD | (I/O) | Field indicator |
| 5.C_WEN | (I) | CCDC write enable |
| 6:17.C_DATA | (I) | Image data 12 Bit |

SDRAM Interface
Pin Count: 58

| | | |
|---|---|---|
| 1.SDR_CLK | (O) | Master clock |
| 2.SDR_CKE | (O) | Clock enable |
| 3.SDR_WE | (O) | Write enable |
| 4.SDR_CAS | (O) | Column address strobe |
| 5.SDR_RAS | (O) | Raw address strobe |
| 6.SDR_CS0 | (O) | Support 2pc of RAM |
| 7.SDR_CS1 | (O) | Support 4pc of RAM |
| 8:39.DQ[31:0] | (I/O) | Data bus |
| 40:54.SDR_A[14:0] | (O) | Address bus |
| 55.SDR_DQMHH | (O) | DQMH for DQ[31:24] |
| 56.SDR_DQMHL | (O) | DQMH for DQ[23:16] |
| 57.SDR_DQMLH | (O) | DQMH for DQ[15:8] |
| 58.SDR_DQMLL | (O) | DQMH for DQ[7:0] |

ARM BUS
Pin Count: 39

| | | |
|---|---|---|
| 1:23.ARM_A[22:0] | (O) | Address bus |
| 24:39.ARM_D[15:0] | (O) | Data bus |

Audio Interface
Pin Count: 6

| | | |
|---|---|---|
| 1.DSP_BDX | (O) | Serial port transmit |
| 2.DSP_BCLKX | (I/O) | Transmit clock |
| 3.DSP_BFSX | (I/O) | Frame synchronization pulse |
| 4.DSP_BDR | (I) | Serial data receive |
| 5.DSP_BCLKR | (I) | Receive clock |
| 6.DSP_BFSR | (I) | Frame synchronization pulse receive |

External Flash Interface
Pin Count: 5

| | | |
|---|---|---|
| 1.FLSH_WE | (O) | Write enable |
| 2.FLSH_CE | (O) | Chip select |
| 3.FLSH_OE | (O) | Output enable |
| 4.FLSH_SIZE | (I) | 8 Bit/16 Bit select |
| 5.FLSH_BSY | (I) | Busy input |

USB(T.B.D)
Pin Count: 10

| | | |
|---|---|---|
| 1.M48XO | (O) | 48 MHz clock output |
| 2.M48XI | (I) | 48 MHz clock input |
| 3.USB_DP | (I/O) | Differential data+ |
| 4.USB_DM | (I/O) | Differential data− |
| 5.ATTACH | (I) | Attach detect |

UART
Pin Count: 5

| | | |
|---|---|---|
| 1.RXD | (I) | UART RX |
| 2.TXD | (O) | UART TX |
| 3.ERXD | (I) | UART Rx for external CPU |
| 4.ETXD | (O) | UART Tx for external CPU |
| 5.SIFDO | (O) | Serial I/F data output |

IrDA
Pin Count: 2

| | | |
|---|---|---|
| 1.IRXD | (I) | IrDA RX |
| 2.ITXD | (O) | IrDA TX |

Compact Flash
Pin Count: 9

| | | |
|---|---|---|
| 1.CFE1 | (O) | Card enable #1 |
| 2.CFE2 | (O) | Card enable #2 |
| 3.IOIS16 | (O) | I/O select |
| 4.STSCHG | (I/O) | Status changed |
| 5.CFWAIT | (I) | Wait signal input |
| 6.CFRST | (O) | Reset |
| 7.CFD1 | (I) | Card Detect pin #1 |
| 8.CFD2 | (I) | Card Detect pin #2 |
| 9.CFRDY | (I) | Ready |

TV/RGB DAC
Analog output
Pin Count: 27

| | | |
|---|---|---|
| 1.IREF(R) | (I) | R-ch Current reference control |
| 2.DAOUT(R) | (O) | Analog output R-ch |
| 3.GNDA | | Analog GND |
| 4.VCCA | | Analog VCC |
| 5.BIAS | (I) | Phase compensation cap. R-ch |
| 6.VREF | (I) | RGB common reference voltage |
| 7.IREF(G) | (I) | G-ch Current reference control |
| 8.DAOUT(G) | (O) | Analog output G-ch |
| 9.GNDA | | Analog GND |
| 10.VCCA | | Analog VCC |
| 11.BIAS | (I) | Phase compensation cap. G-ch |
| 12.IREF(B) | (I) | B-ch Current reference control |
| 13.DAOUT(B) | (O) | Analog output B-ch |
| 14.GNDA | | Analog GND |
| 15.VOCA | | Analog VCC |
| 16.BIAS | (I) | Phase compensation cap. B-ch |
| 17.IREF(C) | (I) | Composite Current reference control |
| 18.DAOUT(C) | (O) | Analog output Composite |
| 19.GNDA | | Analog GND |
| 20.VOCA | | Analog VCC |
| 21.VREF | (I) | Composite reference voltage |
| 22.BIAS | (I) | Phase compensation cap. composite |
| 23.DVCC | | Digital VCC for DAC |
| 24.DGND | | Digital GND for DAC |
| 25.HSYNC | (O) | H-sync output for RGB output |
| 26.VCSYNC | (O) | V-sync/Composite-sync(select by register) |

GIO
Pin Count: 32[31:0]

| | | |
|---|---|---|
| 1:32.GIO | (I/O) | General Purpose I/O |

Miscellaneous
Pin Count: 15

| | | |
|---|---|---|
| 1.RESET | (I) | Power on reset |
| 2.M27XI | (I) | 27 MHz input |
| 3.M27XO | (O) | 27 MHz output |
| 4.TCK | (I) | JTAG clock |
| 5.TDI | (I) | JTAG data input |
| 6.TDO | (O) | JTAG data output |
| 7.TMS | (I) | JTAG test mode select |
| 8.TRST | (I) | JTAG test reset |
| 9.EMU0 | (I/O) | Emulator interrupt 0 pin |
| 10.EMU1 | (I/O) | Emulator interrupt 1 pin |
| 11.TEST0 | (I) | Test input 0 |
| 12.TEST1 | (I) | Test input 1 |
| 13.SCAN | (I) | Test input |
| 14.TESTSL0 | (I) | Test mode select 0 |
| 15.TESTSL1 | (I) | Test mode select 1 |

TOTAL PIN COUNT

| | |
|---|---|
| CCD SENSOR | 17 |
| SDRAM I/F | 58 |
| ARM BUS | 39 |
| Audio I/F | 6 |
| Flash memory I/F | 5 |
| USB | 5 |
| UART | 5 |
| IrDA | 2 |
| Compact Flash I/F | 9 |
| 4DAC | 26 |
| GIO | 32 |
| Miscellaneous | 15 |
| Sub Total | 219 pins |
| Power | 37 pins (14%) |
| TOTAL | 256 pins |

Audio Player

Portable digital audio players are expected to be one of the most popular consumer products. Currently the MP-3 player based on MPEG-1 Layer 3 ausio compression standard is growing rapidly in portable audio market while MPEG-2 AAC and Doby AC-3 are alternative digital audio coding formats to be considered as emerging standards. Thus the preferred embodiments's programmability permits inclusion of digital audio player functions. The audio can be input via flash memory, PC, etc. and the decoded can be output on the serial port. The decoding program can be loaded from flash memory, ROM, etc.

What is claimed is:

1. A method of interpolation for a Bayer color-filtered array, comprising the steps of:

(a) provide a Bayer color-filtered array of pixel values with red pixel values R(j,k) for the pixels located at the jth row and kth column when j and k are even integers, blue pixel values B(j,k) for pixels located at jth row and kth column when j and k are odd integers, and green pixel values G(j,k) for the pixels located at the jth row and kth column when one of j and k is an even integer and the other an odd integer;

(b) when j is even horizontally interpolate rows of pixel values to yield rows of red values R(j,k) and green values G(j,k) for all k;

(c) when j is odd horizontally interpolate rows of pixel values to yield green values G(j,k) and blue values B(j,k) for all k;

(d) when j is an even integer for each k vertically interpolate the horizontal interpolated red rows from step (b) to yield the red values R(j−1, k);

(e) when j is an odd integer for each k vertically interpolate the horizontal interpolated blue from step (c) to yield the blue values B(j−1, k);

(f) vertically filter the horizontal interpolated green pixel rows from step (c) to yield filtered green output values G"(j,k);

(g) define the difference values D(j,k) between the green values G(j,k) and the filtered green values G"(j,k);

(h) when j is even for each k subtract D(j,k) from R(j,k) to yield red output value R"(j,k)

(i) when j is odd for each k add D(j,k) to R(j,k) to yield red output values R"(j,k);

(j) when j is even for each k add D(j,k) to the blue values B(j,k) to yield blue output values B"(j,k); and (k) when j is odd for each k subtract D(j,k) from B(j,k) to yield blue output values B"(j,k);

(l) wherein G"(j,k), R"(j,k), B"(j,k) form an output image.

2. A Bayer color-filtered array interpolator, comprising;

a processor programmed to:

(a) receive a color-filtered array of pixel values with red pixel value R(j,k) for the pixel located at the jth row and kth column when j and k are even integers, blue pixel value B(j,k) for pixel located at jth row and kth column when j and k are odd integers, and green pixel value G(j,k) for the pixel located at the jth row and kth column when one of j and k is an even integer and the other an odd integer;

(b) horizontally interpolate rows of pixel values when j is even to yield rows of red values R(j,k) and green values G(j,k) for all k, and when j is odd to yield green values G(j,k) and blue values B(j,k) for all k;

(c) when j is an even integer vertically interpolate the horizontal interpolated red rows from step (b) to yield the red values R(j−1,k) and when j is an odd integer vertically interpolate the horizontal interpolated blue to yield the blue values B(j−1,k);

(d) vertically filter the horizontal interpolated green pixel rows from step (b) to yield filtered green output values G"(j,k);

(e) define the difference values D(j,k) between the green values G(j,k) and the filtered green values G"(j,k);

(f) when j is even subtract D(j,k) from the red values R(j,k) to yield red output values R"(j,k) and when m is odd add D(j,k) to the red values R(j,k) to yield red output values R"(j,k); and (g) when m is even add D(j,k) to the blue values B(j,k) to yield blue output values B"(j,k) and when m is odd subtract D(j,k) from the blue values B(j,k) to yield blue output values B"(j,k).

3. A Bayer pattern color-filtered array interpolation device, comprising:

(a) a horizontal interpolator for receiving a Bayer color-filtered array data as a sequence of rows of pixel values with red pixel value R(j,k) for the pixel located at the jth row and kth column when j and k are even integers, blue pixel value B(j,k) for pixel located at jth row and kth column when j and k are odd integers, and green pixel value G(j,k) for the pixel located at the jth row and kth column when one of j and k is an even integer and the other an odd integer, and outputting when j is even a first even row of red pixel values R'(j,k) plus a second even row of green pixel values G'(j,k) and when j is odd a first odd row of green pixel values G'(j,k) plus a second odd row of blue pixel values B'(j,k);

(b) a set of two sequential row memories for each of the outputs of the horizontal interpolator;

(c) a vertical interpolator coupled to the horizontal interpolator outputs and row memories, and outputting when j is even red values R'(j−1,k) and when j is odd blue values B'(j−1,k);

(d) a vertical filter coupled to the output of the vertical interpolator, and outputting filtered green values G"(j, k);

(e) a differencer coupled to the outputs of the vertical filter and the vertical interpolator, and outputting D(j,k) as the difference between the green values G(j,k) and the filtered green values G"(j,k);

(f) a combiner coupled to the outputs of the differencer and the filters and outputting when j is even R"(j,k)= R(j,k)−D(j,k) and B"(j,k)−B(j,k)+D(j,k) and when j is odd R"(j,k)=R(j,k)+D(j,k) and B"(j,k)=B(j,k)−D(j,k).

* * * * *